(12) United States Patent
Schultz et al.

(10) Patent No.: US 6,900,265 B2
(45) Date of Patent: May 31, 2005

(54) ANTIMICROBIAL POLYMER LATEXES DERIVED FROM UNSATURATED QUATERNARY AMMONIUM COMPOUNDS AND ANTIMICROBIAL COATINGS, SEALANTS, ADHESIVES AND ELASTOMERS PRODUCED FROM SUCH LATEXES

(75) Inventors: Alfred K. Schultz, Lake Villa, IL (US); Adnan Siddiqui, Vernon Hills, IL (US); Elaine R. Kleinfeld, Grayslake, IL (US)

(73) Assignee: Stepan Company, Northfield, IL (US)

( * ) Notice: Subject to any disclaimer, the term of this patent is extended or adjusted under 35 U.S.C. 154(b) by 0 days.

(21) Appl. No.: 10/120,027

(22) Filed: Apr. 10, 2002

(65) Prior Publication Data

US 2004/0092632 A1 May 13, 2004

Related U.S. Application Data

(63) Continuation-in-part of application No. PCT/US98/01492, filed on Jan. 28, 1998, which is a continuation of application No. 09/124,167, filed on Jul. 28, 1998, now abandoned.
(60) Provisional application No. 60/036,505, filed on Jan. 28, 1997.

(51) Int. Cl.$^7$ .............................. C08J 3/00; C08K 3/20; C08L 39/00
(52) U.S. Cl. ........................................ 524/555
(58) Field of Search ........................................ 524/555

(56) References Cited

U.S. PATENT DOCUMENTS

| | | | |
|---|---|---|---|
| 6,673,142 B2 | 6/1972 | Saunders et al. | 260/29.6 |
| 3,759,982 A | 9/1973 | Samour | 260/485 |
| 3,780,092 A | 12/1973 | Samour et al. | 260/482 |
| 3,925,442 A | 12/1975 | Samour et al. | 260/459 |
| 3,936,492 A | 2/1976 | Samour et al. | 260/482 |
| 3,941,857 A | 3/1976 | Wu | 260/837 |
| 3,983,166 A * | 9/1976 | Samour | 560/151 |
| 4,011,259 A | 3/1977 | Samour et al. | 260/485 |
| 4,049,608 A | 9/1977 | Steckler et al. | 260/29.6 |
| 4,060,679 A | 11/1977 | Naarmann et al. | 526/304 |
| 4,075,411 A | 2/1978 | Dickstein | 560/224 |
| 4,176,028 A | 11/1979 | Graham | 204/159.16 |
| 4,188,293 A | 2/1980 | Green et al. | 210/47 |
| 4,224,455 A | 9/1980 | Deutsch | 560/193 |
| 4,329,441 A | 5/1982 | Bergthaller | 526/193 |
| 4,336,361 A | 6/1982 | Tsuruta et al. | 526/180 |
| 4,377,185 A | 3/1983 | Katz | 138/90 |
| 4,380,601 A * | 4/1983 | Welsh et al. | 524/555 |
| 4,552,939 A | 11/1985 | Thaler et al. | 526/287 |
| 4,657,948 A | 4/1987 | Roark et al. | 523/130 |
| 4,912,157 A | 3/1990 | Clark et al. | 524/265 |
| 5,021,525 A | 6/1991 | Montague et al. | 526/210 |
| 5,039,339 A | 8/1991 | Phan et al. | 428/481 |
| 5,049,383 A | 9/1991 | Huth et al. | 424/405 |
| 5,162,475 A | 11/1992 | Tang et al. | 526/333 |
| 5,250,642 A | 10/1993 | Ahmed et al. | 526/240 |
| 5,296,627 A | 3/1994 | Tang et al. | 558/34 |
| 5,302,192 A | 4/1994 | McLearie et al. | 106/18.33 |
| 5,344,867 A | 9/1994 | Morgan et al. | 524/460 |
| 5,399,617 A | 3/1995 | Farwaha et al. | 524/815 |
| 5,478,883 A | 12/1995 | Anchor et al. | 524/812 |
| 5,536,811 A | 7/1996 | Wood | 528/482 |
| 5,679,732 A | 10/1997 | Van Rheenen | 524/21 |
| 5,717,015 A | 2/1998 | Dust et al. | 524/236 |
| 5,736,247 A * | 4/1998 | Takada et al. | 428/424.2 |
| 5,919,742 A | 7/1999 | Tsuzuki et al. | 510/112 |
| 5,928,783 A | 7/1999 | Phan et al. | 428/355 |
| 5,969,032 A | 10/1999 | Phan et al. | 524/460 |
| 6,017,561 A | 1/2000 | Zhou et al. | 424/486 |
| 6,239,240 B1 | 5/2001 | Schultz et al. | 526/277 |
| 6,407,162 B1 | 6/2002 | Schultz et al. | 524/815 |

FOREIGN PATENT DOCUMENTS

| | | | |
|---|---|---|---|
| DE | 2051479 | 5/1971 | C08F/1/13 |
| DE | 19646965 A1 | 6/1998 | C08F/220/34 |
| EP | 0221498 A2 | 5/1987 | C08F/246/00 |
| EP | 0747456 A2 | 12/1996 | C09D/5/02 |
| EP | 0770655 A2 | 6/1997 | C09J/157/04 |
| EP | 0822248 A2 | 2/1998 | C11D/3/00 |
| FR | 1282258 | 6/1962 | |
| WO | WO 89/12618 | 12/1989 | C07C/41/16 |
| WO | WO 97/45495 | 12/1997 | C09D/11/10 |
| WO | WO 98/21253 | 3/1998 | C08F/246/00 |

OTHER PUBLICATIONS

International Search Report for PCT/US99/17028.
International Search Report for PCT/US98/01492.

* cited by examiner

Primary Examiner—Patrick D. Niland
(74) Attorney, Agent, or Firm—McAndrews, Held & Malloy, Ltd.

(57) ABSTRACT

An improved method of making CASE materials is provided, wherein the method utilizes a polymer latex derived from at least one ethylenically unsaturated monomer and at least one polymerizable surface active agent. The polymerizable surface active agent is capable of co-polymerization with traditional monomers and is preferably substantially completely consumed during the course of the polymerization. Latex polymers produced by the method of the present invention are well suited for use in coatings, adhesives, sealants, elastomers. Additionally, the present invention relates to improved coating, adhesive, sealant and elastomer (CASE) materials utilizing polymer latexes derived from various monomers and ethylenically unsaturated amine salts of sulfonic, phosphoric and/or carboxylic acids.

17 Claims, No Drawings

ANTIMICROBIAL POLYMER LATEXES DERIVED FROM UNSATURATED QUATERNARY AMMONIUM COMPOUNDS AND ANTIMICROBIAL COATINGS, SEALANTS, ADHESIVES AND ELASTOMERS PRODUCED FROM SUCH LATEXES

CROSS-REFERENCE

This is a continuation of 09/124,167 filed Jul. 28, 1998 now abandon which is a continuation-in-part of International Application PCT/US98/01492, filed Jan. 28, 1998, which in turn is a continuation-in-part of U.S. Provisional Application Ser. No. 60/036,505, filed Jan. 28, 1997.

BACKGROUND OF THE INVENTION

1. Field of the Invention

The present invention relates to improved coating, adhesive, sealant and elastomer (CASE) materials utilizing polymer latexes derived from various monomers and ethylenically unsaturated amine salts of sulfonic, phosphoric and/or carboxylic acids. More specifically, the invention relates to improved CASE materials produced using emulsion polymerization processes which utilize ethylenically unsaturated amine salts of alkylbenzene sulfonic acids, alkyl olefin sulfonic acids, alkyl alcohol sulfuric acid esters, or alkoxylated alkyl alcohol sulfuric acid esters, fatty acids, and fatty phosphate acid esters, or mixtures thereof.

2. Description of the Related Art

The emulsion polymerization of ethylenically unsaturated monomers to form discrete solid polymeric particles for use in coating, adhesive, sealant, and/or elastomer (CASE) applications is well known to the art. Surfactants are commonly used materials in the manufacture of various CASE products, such as, for example paints, printing inks, adhesives and pressure-sensitive adhesives. These surfactants are often indispensable for the manufacture and/or stabilization of these products in terms of processability. However, after such CASE products are used for coating, printing, adhesion or pressure bonding, the surfactants are no longer necessary, nor desirable, because surfactant remaining in the CASE product tends to adversely affect the resistance of the CASE material to water and even oil in many instances.

Surfactants for use in emulsion polymerization to form latexes, which are then used to prepare CASE materials, include traditional anionic surfactants, such as sodium dodecylbenzenesulfonate, and nonionic surfactants such as polyoxyethylene nonylphenyl ether. However, films of CASE materials using polymer latex emulsions prepared using such surfactants have the drawbacks of poor resistance to water and poor bond strength, typically because the surfactant remains in free form in the polymer latex film and/or final CASE material.

CASE materials typically comprise, for example, paints (high-gloss, semi-gloss, and flat), caulks, and the like. CASE materials are typically applied to a variety of substrates, including for example, wood, metal, plastic, glass, ceramics, fiberglass, composite materials, cardboard, corrugated board, paper, textiles, non-woven materials, foam, tape or a combination thereof. Substrates can be virgin materials, i.e. materials that have not previously been treated or coated with a case material, or materials that have been previously coated or treated with a CASE material. Namely, the CASE materials of the instant invention can be applied on top of or applied to a previously applied CASE material.

Conventional emulsion polymerization of ethylenically unsaturated monomers employs one or more water-soluble surfactants to emulsify the monomers and stabilize the resulting polymer products, i.e., the latex. The monomers used in emulsion polymerization reactions are generally water-insoluble, but in some cases may be water-soluble. During a typical emulsion polymerization, a surfactant is used to suspend small portions of monomer in a continuous or semi-continuous aqueous phase. Typically, the monomer molecules are suspended as small spheres in the aqueous phase, and the polymerization takes place within the small spheres. The water-soluble surface active agents, i.e., surfactants, typically utilized in emulsion polymerization reactions are anionic, nonionic, and cationic surfactants or mixtures thereof.

The polymeric particles formed by the emulsion polymerization process are typically utilized to prepare coating, adhesive, sealant, and/or elastomer (CASE) materials. In a traditional emulsion polymerization reaction, the surfactant does not chemically bond to the polymeric particles by carbon-carbon bond formation, but rather remains in the polymeric particle product solution after the emulsion polymerization reaction is complete, i.e., after all monomer is reacted. Unreacted surfactant can detrimentally affect a polymer product solution and/or film, because unreacted surfactant can interfere with the performance of such polymerization products in CASE materials, potentially causing the suspension of polymeric particles to become destabilized over time and undergo unwanted coagulation. Unreacted surfactant may cause unwanted peeling of a latex paint coating on a substrate, and decreased moisture and scrub resistance in other various CASE applications. Residual surfactant can cause an undesirable "blooming" that leads to surface irregularities in a resulting CASE material that is applied to a substrate. Additionally, residual surfactant may lead to undesirable decreases in adhesion of a particular CASE material. The traditional surfactants act as colloidal stabilizers before, during, and after polymerization, but they typically have a detrimental effect on the properties of a dry latex film, for example, due to their tendency to migrate, i.e., to leave their original positions at the latex particle surfaces and form areas of higher concentration pockets both within the film and at the film/air and film/substrate interfaces.

Several proposals have been made in the prior art to employ a polymerizable surface active agent during an emulsion polymerization reaction. U.S. Pat. No. 5,478,883 (incorporated herein by reference in its entirety) describes the use of ethylenically unsaturated polymerizable water-soluble nonionic surfactants formed by the reaction of a diallylamine compound with ethylene oxide, propylene oxide or butylene oxide, in emulsion polymerization reactions. Similarly, U.S. Pat. No. 5,162,475 (incorporated herein by reference) provides alpha, beta-ethylenically unsaturated poly(alkylenoxy) polymerizble surface active compounds for use in emulsion polymerization. For additional examples of polymerizble surfactants for use in emulsion polymerization processes, see U.S. Pat. Nos. 4,377,185 and 4,049,608. Also see WO 89/12618, EP 747456 A2, and EP 770655 A2; all describing various approaches utilizing ethylenically unsaturated surfactant to produce CASE materials with reactive surfactants.

Non-polymerizble surfactant techniques to overcome the traditional problems encountered in performing an emulsion polymerization process are numerous. U.S. Pat. No. 3,941,857 describes the use of epoxy resins that react with the residual anionic, cationic or nonionic surfactant. Polymerizble compounds such as allyl alcohol (and esters thereof) have been found to be ineffective due to the formation of undesirable high levels of coagulum in the final emulsion polymerization product. Additionally, see U.S. Pat. Nos. 4,224,455; 5,399,617; 4,075,411; 5,344,867; 5,296,627; 5,679,732, 5,536,811; 4,912,157; and 5,039,339; and WO 97/45495.

Thus, there is a need for emulsion polymerization latexes comprising polymers and discrete polymeric particles that are well suited for use in CASE applications, as well as a need for processes to prepare such latexes. There is a specific need for CASE materials which comprise polymer latexes, wherein the final CASE materials possess low water sensitivity, improved scrub resistance and/or improved adhesion properties. Additionally, improved CASE materials with increased latex shear stability and lowered film yellowing tendencies are highly desirable.

SUMMARY OF THE INVENTION

The present invention relates to CASE materials prepared from latexes which are formed using a variety of monomers in combination with a novel group of compounds in the form of ethylenically unsaturated amine salts of sulfonic, phosphoric and/or carboxylic acids. These amine salts display surface activity, i.e., they are surfactants. It has been discovered that improved CASE materials can be prepared using latexes based on these compounds which function as reactive surfactants, i.e., surface active agents in polymerization processes, particularly emulsion polymerization processes. The CASE materials of the instant invention are based on surface active agents which are generally capable of co-polymerizing with other ethylenically unsaturated monomers of the type which are commonly employed in polymerization processes. The polymerizable surface active agents utilized in the present invention are prepared from readily available, economical raw materials, and their preparation generally does not require any special handling or equipment. These polymerizable surface active agents are particularly well suited for use in the formation of polymer particles which in turn may be used to prepare a variety of CASE materials. Surprisingly, these polymerizable surfactants contribute to improved properties in various CASE materials, such as for example, improved water sensitivity (i.e. they become more hydrophobic), improved scrub resistance, and improved adhesion. The polymerizable surfactants also contribute to improved latex product properties such as increased latex shear stability, lowered film yellowing tendencies, decreased paper discoloration, and improved wet strength in paper coatings.

Examples of CASE materials of the instant invention include interior and exterior coatings, e.g., latex paints; container, paper and paperboard coating, e.g., can coatings; adhesives, such as water-born adhesives and pressure sensitive adhesives; sealants; industrial coatings; automotive coatings; textile coatings and binders; floor finishes; water-based inks; films; and binders for non-woven materials such as carpet backing.

Accordingly, in one aspect the invention provides an improved method for forming CASE materials and/or polymers. This method utilizes the polymerizable surface active agents mentioned above. Generally, the improved method for preparing a CASE material comprises:

a) preparing a mixture comprising:
  i) at least one ethylenically unsaturated monomer;
  ii) at least one polymerizable, surface active agent wherein the polymerizable, surface active agent is an amine salt comprising:
    a) at least one acid, wherein the acid is a sulfonic acid, a carboxylic acid, or a phosphoric acid, or a mixture thereof; and
  b) at least one nitrogenous base, wherein the nitrogenous base contains at least one nitrogen atom and at least one ethylenically unsaturated moiety; and
  b) polymerizing the mixture to form a latex or mixture of polymer particles.

In these methods, it is important that the polymerizable, surface active agent be capable of polymerization with the ethylenically unsaturated monomer or co-polymerization with a partially polymerized polymer particle. Somewhat preferably, the nitrogen atom is linked covalently, directly or indirectly, to the ethylenically unsaturated moiety of the nitrogenous base. The methods optionally comprise the addition of other ingredients as detailed herein to produce final CASE products.

The polymers prepared utilizing the polymerizable surface active agents of the present invention may be used as the primary resin component or a minor resin component of a resin mixture. Such a resin mixture is suitable for preparing latex coatings, adhesives, sealants, elastomers, binders, inks, floor finishes and the like.

The term "polymer" as used herein means a product produced by polymerizing two or more monomers, which may be the same or different. Additionally, the polymer may have incorporated into it surface active agent monomers and/or homopolymeric surface active agents. The various final CASE materials, compositions, applications and polymer products described herein may contain optional ingredients such as fillers, pigments, colorants, solvents, plasticizers, antioxidants, curing agents, thickeners, non-polymerizable surface active agents (surfactants), preservatives, wet strength additives, and the like.

In another apsect, the present invention provides improved polymerization processes for forming polymers. In these processes, the surface active agent present and necessary for the polymerization reaction does not interfere with the quality of the CASE materials. In fact, in many instances, the quality of the CASE materials is improved by the use of the polymerizable surface active agent. Further, CASE materials formed using the polymers of the invention, after being applied to a substrate and allowed to dry under suitable conditions, remain uniform and stable over time and/or with exposure to moisture at ambient or elevated temperature.

Thus, the present invention provides polymers suitable for use in coating, adhesive, sealant and/or elastomer (CASE) materials. In another aspect, the invention encompasses substrates carrying at least one layer of a CASE material. The polymers may be provided in a variety of forms, such as, for example, solids, flakes, powders, semi-solids, thick pastes, flowable/pumpable pastes (i.e. G-phase pastes), liquids, gels, "ringing" gels, dilute or concentrated solutions and the like. The polymers may be spray dried, freeze-dried, flaked, extruded, or the like.

In yet another aspect, the invention provides homopolymeric surface active agents comprising polymerized, polymerizable surface active agents or blends of two or more polymerizable surface active agents. These homopolymeric surface active agents are useful in the polymerization processes and CASE materials detailed herein. In a related aspect, the present invention further provides homopolymeric surface active agent/polymerizable surface active agent blends comprising partially polymerized, polymerizable surface active agents and non-polymerized, polymerizable surface active agents. These homopolymeric/polymerizable surface active agent blends are also useful in the polymerization processes and CASE materials detailed herein.

The improved polymerization processes for forming CASE materials preferably do not require the use of a surfactant that contains residual formaldehyde or other low molecular weight volatile organic compounds. However, while not usually desirable, low molecular weight volatile organic compounds, solvents and/or residual formaldehyde may be present in the polymerization products of the present invention.

The polymerization processes of the present invention provide latexes useful in preparing CASE materials with improved shear stability, improved pH stability, improved shelf storage stability and improved ease of viscosity modification.

In the processes of the invention, the polymerizable surface active agent may be added to the emulsion polymerization mixture in a batch mode (i.e., all at once), a continuous mode (i.e., by addition of an amount of the polymerizable surface active agent throughout the polymerization), or in a semi-continuous mode (i.e. addition of portions of the polymerizable surface active agent at various times during the polymerization). The polymerizable surface active agent may be prepared in situ in the emulsion polymerization mixture by adding an ethylenically unsaturated amine, such as allyl amine, to the mixture, followed by concurrent or step-wise addition of a traditional surface active agent, wherein the polymerizable surface active agent is formed in the mixture by ion exchange of the traditional surfactant and the ethylenically unsaturated amine salt.

The polymerizable surface active agents utilized in the present invention are generally formed by combining at least one acid, wherein the acid is a sulfonic acid, a carboxylic acid, or a phosphoric acid, or a mixture thereof, with a nitrogenous base, wherein the nitrogenous base contains at least one nitrogen atom and at least one ethylenically unsaturated moiety. The polymerizable surface active agents of the present invention are preferably in the form of amine salts. The surface active agents of the present invention may be prepared from readily available, economical raw materials, and generally, their preparation does not require any special handling or equipment. The polymerizable surface active agents may be prepared in a batch mode or a continuous mode; they may be prepared by contacting the ethylenically unsaturated amine with the acid or contacting the acid with the ethylenically unsaturated amine. By contacting it is meant that the acid(s) is added to the ethylenically unsaturated amine(s) and the components are mixed, or the ethylenically unsaturated amine(s) is added to the acid(s) and the components are mixed. Typically, upon mixing, the acid and the base combine to form an amine salt. As known by one skilled in the art, upon mixing the acid and nitrogenous base together, the nitrogenous base becomes a conjugate acid and the acid becomes a conjugate base.

The polymerizable surface active agents may alternatively be prepared by contacting the ethylenically unsaturated amine with an alkaline earth or ammonium salt of the acid (e.g., the sodium, potassium, magnesium, calcium, ammonium, or ethoxylated ammonium salts of the acid), whereby the polymerizable surface active agent is formed in situ, either in the presence or absence of monomer.

The polymerizable surface active agents and blends of these surface active agents may be prepared in a variety of forms, including but not limited to, liquids, solutions, solids, powders, flakes, semi-solids, gels, "ringing" gels, G-phase liquids, hexagonal phase solids, or thick pastes. The surface active agents may be spray dried, flaked, extruded, and the like. Although not critical to the present invention, the polymerizable, surface active agents may be prepared "neat" or in a conventional solvent such as water, low molecular weight alcohol or hydrocarbon, or a mixture thereof, to produce a solution of the surface active agent. The present invention encompasses surface active agents as salts in dry form and as aqueous solutions. Salts of the surface active agents may be isolated by drying a solution of the surface active agents. Conversely, a solution of a surface active agent may be prepared by dissolving the salt of the surface active agent in a suitable solvent, e.g., water, a low molecular weight alcohol or a hydrocarbon, or a mixture thereof.

Individual polymerizable surface active agents of the present invention may be prepared and mixed together to produce a surface active mixture comprising "neat" surface active agents or an aqueous surfactant blend. Additionally, neat or aqueous blends of the surface active agents may be prepared by contacting a blend of two or more ethylenically unsaturated amines with one acid, or by contacting a blend of two or more ethylenically unsaturated amines with a blend of 2 or more acids. Conversely, blends of the surface active agents may be prepared by contacting a blend of two or more acids with one ethylenically unsaturated amine, or by contacting a blend of two or more acids with a blend of two or more ethylenically unsaturated amines.

The polymerizable surface active agents useful in the present invention to form latexes, which are then used in a CASE material such as a paint, printing inks, adhesives or pressure-sensitive adhesives, generally act as surfactants in the course of manufacture, storage or even processing thereof, but then cease to function as surfactants in due course thereafter. Furthermore, the polymerizable surfactants of the invention can be used not only as emulsifiers for emulsion polymerizations, but also as dispersing agents for suspension polymerization, dispersing agents for dyes and pigments, emulsifiers for waxes, finishing agents for fibers, emulsifier-dispersants for agrochemicals, antistatic agents for synthetic resins, and so on. In these and other applications, the aforementioned adverse effect of a residual traditional surfactant can be drastically reduced and/or eliminated.

These and other objects and advantages, as well as the scope, nature, and utilization of the claimed invention will become apparent to those skilled in the art from the following detailed description and claims.

DETAILED DESCRIPTION OF THE INVENTION

Methods are provided for forming discrete polymer particles and/or latexes with polymerizable surface active agents. The resulting particles and latexes are useful in preparing CASE materials. The methods for forming the particles and/or latexes comprise:

(1) preparing a mixture comprising at least one ethylenically unsaturated monomer and at least one polymerizable surface active agent; and (2) polymerizing the mixture to form discrete polymer particles or a latex. The resulting particles and/or latexes can then be formulated into a CASE material.

Typically, the formulation of the CASE material requires various optional components. Representative optional components are discussed in more detail below. These optional components are normally added before, during, or preferably after the formation of the polymer particles or latex.

Generally, any ethylenically unsaturated monomer that is capable of undergoing polymerization may be utilized in the invention. The methods of the invention are particularly well suited to emulsion polymerization but may also be conducted as solution polymerizations, suspension polymerizations, microemulsion polymerizations or inverse emulsion polymerizations. The polymerization may be conducted in any manner known to the art, including but not limited to, free-radical initiated polymerization, thermally initiated polymerization and redox initiated polymerization using, for example, batch, continuous, or controlled monomer feed processes, known conditions of stirring time and temperature, and known kinds of additives such as initiators, surfactants, electrolytes, pH adjusting agents, buffering agents, protective colloids and the like. In general, the polymerization processes of the invention are carried out at from about 20° C. to about 120° C. (i.e., between about 50° C. and about 110° C.). The polymerization temperature selected will vary, depending on the reactivity and concentration of the polymerization initiator and monomer(s) being used. Batch polymerization times may vary depending on the method of polymerization and the monomer(s) being polymerized. Such times may vary from about 10 minutes to about 10 hours. In general, the polymerization mixture may be a solution, emulsion, suspension or dispersion of an ethylenically unsaturated monomer and the polymerizable surface active agent. Further, the polymerizable surface active agent may be provided to the mixture as a solution in water, low molecular weight alcohol, hydrocarbon, or mixtures thereof.

In accordance with the present invention, polymerization may occur simultaneously as the mixture is being formed (i.e. as the monomer and the polymerizable surface active agent come in contact, a self-initiating polymerization occurs). Accordingly, the present invention also encompasses a method for continuous polymerization utilizing at least one ethylenically unsaturated monomer and at least one polymerizable surface active agent.

The polymerizable, surface active agents utilized in the present invention are preferably amine salts or quaternary nitrogen compounds comprising:

a) at least one acid, wherein the acid is a sulfonic acid, a carboxylic acid, or a phosphoric acid, or a mixture thereof; and b) at least one nitrogenous base, wherein the nitrogenous base contains at least one nitrogen atom and at least one ethylenically unsaturated moiety.

The polymerizable surface active agents are generally capable of polymerizing with themselves, co-polymerizing with the ethylenically unsaturated monomer, or are capable of co-polymerizing with a partially polymerized polymer particle. In a somewhat preferred embodiment, the polymerizable surface active agent is partially (i.e. 1–50 percent by weight of the polymerizable surface active agent) consumed by polymerization with itself, co-polymerization with the monomer, and/or co-polymerization with a partially polymerized polymer particle. In a more preferred embodiment, the polymerizable, surface active agent is substantially (i.e. 50–90 percent by weight of the polymerizable surface active agent) consumed by polymerization with itself, co-polymerization with the monomer, and/or co-polymerization with a partially polymerized polymer particle. In a most preferred embodiment, the polymerizable, surface active agent is substantially completely (i.e. greater than 90 percent by weight of the polymerizable surface active agent) consumed by polymerization with itself, co-polymerization with the monomer, and/or co-polymerization with a partially polymerized polymer particle.

The polymerizable surface active agent and the ethylenically unsaturated monomer are in a ratio of about 0.01:1 to about 3:1 on a weight basis prior to polymerization. In a preferred embodiment, the polymerizable surface active agent is present in the prepolymerization mixture (i.e. an unpolymerized mixture of monomer, reactive surfactant and any initiator) in a concentration of about 1–100 weight percent, based on the total weight of the ethylenically unsaturated monomer present in the mixture. In a more preferred embodiment, the polymerizable surface active agent is present in the mixture in a concentration of about 1–20 weight percent, based on the total weight of the ethylenically unsaturated monomer present in the mixture. In another embodiment, the polymerizable surface active agent comprises about 0.1–10, more preferably 0.5–3.0, weight percent of the polymer based on the total weight of the ethylenically unsaturated monomer present prior to polymerization.

In general, the method of preparing polymers and CASE materials of the invention does not require the use of a non-polymerizable surfactant, i.e. the materials are substantially free of non-polymerizable, surface active agents. However, in a less preferred embodiment, the materials may further comprise a supplemental, non-polymerizable surfactant, wherein the supplemental surfactant is a sodium, potassium, calcium, magnesium, amine, or -ammonium salt, or mixture thereof, of a substantially saturated anionic surfactant, or a nonionic, cationic, or amphoteric surfactant, or mixtures thereof; and wherein the supplemental surfactant is provided in a concentration of about 0.01 to about 20.0 percent by weight, based on the total weight of polymerizable surface active agent and supplemental surfactant provided in the reaction zone.

The present invention provides pre-polymerization mixtures, useful in the preparation of CASE materials, comprising (1) at least one ethylenically unsaturated monomer; and (2) at least one polymerizable surface active agent; wherein the ethylenically unsaturated monomer and the polymerizable surface active agent are defined as above or below. This pre-polymerization mixture may be polymerized by a variety of initiation methods known in the art.

The present invention provides polymers useful in preparing CASE materials comprising: (1) at least one monomer unit; and (2) at least one surface active agent unit. In these polymers, the monomer unit is derived from an ethylenically unsaturated monomer and the surface active agent is derived from a polymerizable surface active agent. Further, these polymers are co-polymers produced by the polymerization of the ethylenically unsaturated monomer and the polymerizable surface active agent.

In another embodiment, the present invention provides methods for forming CASE materials. This method comprises (1) preparing a mixture comprising (a) at least one ethylenically unsaturated monomer, (b) at least one acid, wherein the acid is a sulfonic acid, a carboxylic acid, or a phosphoric acid, or a mixture thereof, and (c) at least one nitrogenous base, wherein the nitrogenous base contains at least one nitrogen atom and at least one ethylenically unsaturated moiety; (2) polymerizing the mixture to form discrete polymer particles or a latex; and (3) formulating the polymer particles or latex into a CASE material. Typically, the formulating step involves the addition of various optional ingredients as discussed in more detail below to produce a final CASE product. In this embodiment, the acid and the nitrogenous base may form a polymerizable, surface active agent in situ. In this situation, the polymerizable, surface active agent formed (1) is an amine salt capable of polymerization with itself, co-polymerization with the ethylenically unsaturated monomer, and/or co-polymerization with a partially polymerized polymer particle; and (2) is substantially completely consumed by polymerization with itself, polymerization with the monomer, and/or co-polymerization with a partially polymerized polymer particle. In one alternative, the nitrogenous base may partially or completely co-polymerize with the ethylenically unsaturated monomer, followed by formation of a surface active agent (i.e., complexation/salt formation with the acid). Without being bound by any particular theory, it is believed that the nitrogenous base is incorporated into the polymer backbone and the acid forms an ion pair, i.e. a salt, with the nitrogen atom of the nitrogenous base, thereby adhering to the polymer and forming a positively charged nitrogen atom. In another alternative within the purview of this embodiment, a portion of the nitrogenous base may polymerize with itself, co-polymerize with the ethylenically unsaturated monomer, or co-polymerize with a partially polymerized polymer, followed by complexation/salt formation with the acid. In another alternative, the nitrogenous base may partially or completely co-polymerize with a homopolymeric surfactant, followed by complexation/salt formation with the acid.

The present invention also provides CASE materials comprising: (1) at least one monomer unit; and (2) at least one acid, wherein the acid is a sulfonic acid, a carboxylic acid, a phosphoric acid, or a mixture thereof; and at least one nitrogenous base, wherein the nitrogenous base contains at least one nitrogen atom and at least one ethylenically unsaturated moiety; wherein the monomer unit is derived from an ethylenically unsaturated monomer; wherein the nitrogenous base is homopolymerized, co-polymerized with the monomer, and/or polymerized with a partially polymerized polymer; and wherein the acid complexes to the nitrogen atom(s), to form an amine salt-containing polymer.

In another embodiment, the present invention provides methods for forming CASE materials wherein the method comprises: (1) preparing a mixture comprising at least one ethylenically unsaturated monomer and at least one homopolymeric surface active agent, the homopolymeric surface active agent being a polymer formed by polymerizing at least one polymerizable, surface active agent; wherein the polymerizable, surface active agent is an amine salt or quaternary nitrogen compound comprising at least one acid, wherein the acid is a sulfonic acid, a carboxylic acid, or a phosphoric acid, or a mixture thereof, and at least one nitrogenous base, wherein the nitrogenous base contains at least one nitrogen atom and at least one ethylenically unsaturated moiety; (2) polymerizing the mixture to form discrete polymer particles or a latex; and (3) formulating the polymer particles or latex into a CASE material. Typically, the formulating step involves the addition of various optional ingredients as detailed herein, to produce a final CASE product.

The present invention relates to CASE materials comprising polymer latexes, wherein the polymer latex is based on polymers derived from at least one monomer and at least one polymerizable surface active agent as defined herein.

The present invention also provides homopolymeric surface active agents. These homopolymeric surface active agents are formed by polymerizing at least one polymerizable, surface active agent, wherein the polymerizable, surface active agent is an amine salt or quaternary nitrogen compound comprising at least one acid, wherein the acid is a sulfonic acid, a carboxylic acid, or a phosphoric acid, or a mixture thereof; and at least one nitrogenous base, wherein the nitrogenous base contains at least one nitrogen atom and at least one ethylenically unsaturated moiety. Optionally, the homopolymeric surface active agents may be formed by partially or completely polymerizing the nitrogenous base, followed by complexation of the resulting polymer with the acid, wherein the acid complexes to the nitrogen atom(s), to form an amine salt- or a quaternary nitrogen-containing homopolymeric surface active agent.

The homopolymeric surface active agents of the invention are generally capable of polymerization with themselves, co-polymerization with the monomer, or co-polymerization with a partially polymerized polymer.

In another embodiment, the present invention provides methods for preparing CASE materials, wherein the method comprises: (1) partially polymerizing at least one ethylenically unsaturated monomer to form a partially polymerized polymer/monomer mixture; (2) adding to the partially polymerized polymer/monomer mixture at least one polymerizable surface active agent and/or at least one homopolymeric surface active agent, to form a partially polymerized polymer/monomer/surface active agent mixture; (3) polymerizing the partially polymerized polymer/monomer/surface active agent mixture to form discrete polymer particles or a latex; and (4) formulating the polymer particles or latex into a CASE material; wherein the homopolymeric surface active agent is a polymer formed by polymerizing at least one polymerizable, surface active agent; wherein the polymerizable, surface active agent is an amine salt or quaternary nitrogen compound comprising at least one acid, wherein the acid is a sulfonic acid, a carboxylic acid, or a phosphoric acid, or a mixture thereof and at least one nitrogenous base, wherein the nitrogenous base contains at least one nitrogen atom and at least one ethylenically unsaturated moiety. Typically, the formulating step involves the addition of various optional ingredients as detailed herein, to produce a final CASE product.

In another embodiment, the present invention provides a method for forming CASE materials, wherein the method comprises: (1) preparing a mixture comprising at least one ethylenically unsaturated monomer and at least one non-polymerizable, supplemental surface active agent; (2) partially polymerizing the mixture to form a partially polymerized polymer/monomer/supplemental surface active agent mixture; (3) adding to the partially polymerized polymer/monomer/supplemental surface active mixture at least one polymerizable surface active agent and/or at least one homopolymeric surface active agent, to form a partially polymerized polymer/monomer/supplemental surface active agent/polymerizable surface active agent mixture; and (4) polymerizing the partially polymerized polymer/monomer/surface active agent/polymerizable surface active agent mixture to form discrete polymer particle or a latex; and (5) formulating the polymer particles or latex into a CASE material; wherein the homopolymeric surface active agent is a polymer formed by polymerizing at least one polymerizable, surface active agent; wherein the polymerizable, surface active agent is an amine salt or quaternary nitrogen compound comprising at least one acid, wherein the acid is a sulfonic acid, a carboxylic acid, or a phosphoric acid, or a mixture thereof, and at least one nitrogenous base, wherein the nitrogenous base contains at least one nitrogen atom and at least one ethylenically unsaturated moiety; and wherein the supplemental surface active agent is generally non-polymerizable and is defined herein. Typically, the formulating step involves the addition of various optional ingredients as detailed herein, to produce a final CASE product.

In another embodiment, the present invention provides a method for forming CASE materials, wherein the method comprises: (1) preparing a mixture comprising at least one ethylenically unsaturated monomer and at least one non-polymerizable, supplemental surface active agent; (2) partially polymerizing the mixture to form a polymer mixture; and (3) adding at least one polymerizable surface active agent and/or at least one homopolymeric surface active agent to the polymer mixture; (4) polymerizing the mixture to substantial completion to form discrete polymer particles or a latex; (5) formulating the polymer particles or latex into a CASE material; wherein the homopolymeric surface active agent is a polymer formed by polymerizing at least one polymerizable, surface active agent; wherein the polymerizable, surface active agent is an amine salt or quaternary nitrogen compound comprising at least one acid, wherein the acid is a sulfonic acid, a carboxylic acid, or a phosphoric acid, or a mixture thereof, and at least one nitrogenous base, wherein the nitrogenous base contains at least one nitrogen atom and at least one ethylenically unsaturated moiety. Typically, the formulating step involves the addition of various optional ingredients as detailed herein, to produce a final CASE product.

The present invention encompasses polymers prepared by any of the methods or processes described herein. Generally, the methods of the present invention encompass emulsions, suspensions or dispersions of polymers obtained therefrom.

The present invention includes articles of manufacture comprising a substrate; and a coating, adhesive, sealant or elastomer.

In these articles, the substrate is selected from the group consisting essentially of wood, metal, plastic, glass, ceramics, fiberglass, composite materials, cardboard, corrugated board, paper, textiles, non-woven materials, foam, tape or a combination thereof; and the coating, adhesive, sealant or elastomeric material comprises a polymer latex comprising:

a) at least one monomer unit; and b) at least one surface active agent unit; where the monomer unit is derived from an ethylenically unsaturated monomer; the surface active agent is derived from a polymerizable surface active agent in the form of an amine salt comprising:

i) at least one acid, wherein the acid is a sulfonic acid, a sulfuric acid ester, a carboxylic acid, or a phosphoric acid, or a mixture thereof; and ii) at least one nitrogenous base, wherein the nitrogenous base contains at least one nitrogen atom and at least one ethylenically unsaturated moiety;

and wherein the ethylenically unsaturated monomer and the polymerizable surface active agent have polymerized to form the polymer. The monomers, acids, and nitrogenous bases may generally be any of those described herein. Additionally, the coating, adhesive, sealant or elastomeric material comprises optional formulation ingredients described herein.

This invention also relates to methods for providing waterborne coating compositions. A "waterborne coating composition" herein is defined as a composition, with or without pigment, containing at least one polymer latex dispersed in an evaporable medium that is predominantly composed of water. The polymer latex comprises a) at least one monomer unit; and b) at least one surface active agent unit;

wherein the monomer unit is derived from an ethylenically unsaturated monomer; the surface active agent is derived from a polymerizable surface active agent in the form of an amine salt comprising:

i) at least one acid, wherein the acid is a sulfonic acid, a sulfuric acid ester, a carboxylic acid, or a phosphoric acid, or a mixture thereof; and ii) at least one nitrogenous base, wherein the nitrogenous base contains at least one nitrogen atom and at least one ethylenically unsaturated moiety;

and wherein the ethylenically unsaturated monomer and the polymerizable surface active agent have polymerized to form the polymer.

The monomers, acids, and nitrogenous bases may generally be any of those described herein. The evaporable medium may contain, in addition to water, at least one water-miscible solvent such as, for example, isopropanol, propylene glycol, ethylene glycol methyl ether, ethylene glycol butyl ether, or propylene glycol propyl ether. The evaporable medium may also optionally contain a water-immiscible solvent such as Texanol or butyl carbitol and the like. The waterborne coating compositions contain from about 0.5% to about 70%, by volume based on the volume of the coating composition, of at least one optional pigment. The pigment is selected from inorganic and organic pigments such as, for example, titanium dioxide, calcium carbonate, polystyrene particles, and void-containing polymeric particles on the basis of color and opacity. Included in the term "pigment" herein are inorganic pigments sometimes referred to as fillers such as, for example, clay. A preferred predominant pigment is titanium dioxide.

The polymer latex of the waterborne coating may also be prepared by a multi-stage emulsion addition polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating polymer network (IPN) particles. In all of these cases the majority of the surface area of the particle will be occupied by at least one outer phase and the interior of the particle will be occupied by at least on inner phase. Each of the stages of the multi-staged emulsion-polymerized polymer may contain the same monomers, polymerizable surface active agents, chain transfer agents, etc. as disclosed herein. The emulsion polymerization techniques used to prepare such dispersions are well known in the art such as, for example, U.S. Pat. Nos. 4,325,856; 4,654,397; and 4,814,373.

The waterborne coating composition is prepared by any of a variety of techniques well known in the coatings art. First, for example, at least one pigment is well dispersed in a waterborne medium under high shear such as is afforded by a COWLES® mixer. Then the emulsion-polymerized addition polymer is added under low shear stirring along with other coatings adjuvants as desired. The waterborne coating composition may contain, in addition to the pigment(s) and the latex polymer, conventional coatings adjuvants such as, for example, emulsifiers, coalescing agents, curing agents, thickeners, humectants, wetting agents, biocides, plasticizers, antifoaming agents, colorants, waxes, and antioxidants.

The waterborne coating composition may be applied to a surface such as, for example, metal, wood, or plastic, using conventional coating application methods such as, for example, brush, roller, drawdown, dipping, curtain coater, and spraying methods such as, for example, air-assisted spray, airless spray, high volume low pressure spray, and air-assisted electrostatic spray.

The invention additionally encompasses paint compositions, caulk compositions, adhesive compositions and sealant compositions, and methods of preparing such compositions. A latex paint composition of the invention comprises water; a hydroxylated solvent, or a mixture of hydroxylated solvents; a dispersant; a thickener/rheology modifier; a pigment or mixture of pigments; a latex or mixture of latexes; and a defoaming agent. A latex caulk composition of the invention comprises a hydroxylated solvent, or a mixture of hydroxylated solvents; a plasticizer; a thickener/rheology modifier; a hydrocarbon; a latex or mixture of latexes; a fumed silica; and optionally a pigment or mixture of pigments. A latex adhesive composition of the invention comprises water; a surfactant; a latex or mixture of latexes; and optionally a pH basic neutralizing agent.

Ethylenically Unsaturated Monomers

The ethylenically unsaturated monomer or monomers that may be polymerized or co-polymerized according to the present invention are known to the art and are described below in a representative manner. Examples of suitable ethylenically unsaturated monomers are, for example, mono- and polyunsaturated hydrocarbon monomers, vinyl esters (e.g., vinyl esters of $C_1$ to $C_6$ saturated monocarboxylic acids), vinyl ethers, monoethylenically unsaturated mono- and polycarboxylic acids and there alkyl esters (e.g., acrylic acid esters and methacrylic acid esters, particularly the $C_1$ to $C_{12}$ alkyl, and more particularly the $C_1$ to $C_4$ alkyl esters), the nitriles, vinyl and vinylidene halides, and amides of unsaturated carboxylic acids and amino monomers.

Examples of suitable hydrocarbon monomers for use in the present invention include styrene compounds (e.g., styrene, carboxylated styrene, and alpha-methyl styrene), ethylene, propylene, butylene, and conjugated dienes (e.g., butadiene, isoprene and copolymers of butadiene and isoprene). Examples of vinyl and vinylidene halides include vinyl chloride, vinylidene chloride, vinyl fluoride and vinylidene fluoride.

Examples of acrylic esters and methacrylic esters suitable for use in the present invention include $C_1$–$C_{12}$ (e.g., $C_1$–$C_4$) alkyl acrylates and methacrylates. Typical alkyl esters and methacrylic esters include methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, hexyl acrylate, 2-ethylhexyl acrylate, 2-ethylhexyl methacrylate, t-butyl acrylate, t-butyl methacrylate, 3,3-dimethylbutyl acrylate, 3,3-dimethyl butyl methacrylate, and lauryl acrylate.

Suitable vinyl esters for use in the present invention include aliphatic vinyl esters, such as vinyl formate, vinyl acetate, vinyl propionate, vinyl butyrate, vinyl isobutyrate, vinyl valerate, and vinyl caproate, and allyl esters of saturated monocarboxylic acids, such as allyl acetate, allyl propionate and ally lactate.

Vinyl ethers suitable for use in the present invention include methylvinyl ether, ethylvinyl ether and n-butylvinyl ether. Typically vinyl ketones include methylvinyl ketone, ethylvinyl ketone and isobutylvinyl ketone. Suitable dialkyl esters of monoethylenically unsaturated dicarboxylic acids include dimethyl maleate, diethyl maleate, dibutyl maleate, dioctyl maleate, diisooctyl maleate, dinonyl maleate, diisodecyl maleate, ditridecyl maleate, dimethyl fumarate, diethyl fumarate, dipropyl fumarate, dibutyl fumarate, dioctyl fumarate, diisooctyl fumarate, didecyl fumarate, dimethyl itaconate, diethyl itaconate, dibutyl itaconate, and dioctyl itaconate.

Monoethylenically unsaturated monocarboxylic acids suitable for use in the present invention include acrylic acid, methacrylic acid, ethacrylic acid, and crotonic acid. Suitable monoethylenically unsaturated dicarboxylic acids include maleic acid, fumaric acid, itaconic acid and citraconic acid. Suitable monoethylenically unsaturated tricarboxylic acids include aconitic acid and the halogen-substituted derivatives (e.g., alphachloracylic acid), and the anhydrides of these acids (e.g., maleic anhydride and citraconic anhydride).

Nitriles of the above ethylenically unsaturated mono-, di- and tricarboxylic acids which are suitable monomers include acrylonitrile, alpha-chloroacrylonitrile and methacrylonitrile. Suitable amides of these carboxylic acids include unsubtituted amides such as acrylamide, methacrylamide and other alpha-substituted acrylamides and N-substituted amides obtained by the reaction of the amides of the aforementioned mono- and polycarboxylic acids with and aldehyde (e.g., formaldehyde). Typical N-substituted amides include N-methylolacrylamide, N-methylolmethacrylamide alkylated N-methylolacrylamides and N-methylolmethacrylamides (e.g., N-methyoxymethylacrylamide and N-methoxymethylmethacrylamide).

Amino monomers useful in the present invention include substituted and unsubstituted aminoalkyl acrylates, hydrochloride salts of amino monomers and methacrylates, such as beta-aminoethylacrylate, beta-amino-ethylmethacrylate, dimethylaminomethylacrylate, beta-methylaminoethylacrylate, and dimethylaminomethylmethacrylate.

Hydroxy-containing monomers useful in the present invention include beta-hydroxyethylacrylate, beta-hydroxypropylacrylate, gamma-hydroxypropylacrylate and beta-hydroxyethylmethacrylate.

Suitable cationic monomers are alpha, beta-ethyenically unsaturated compounds which can undergo polymerization and contain primary, secondary, or teriary amino groups, such as, for example, dimethylaminoethyl methacrylate, dimethylaminoneopentyl acrylate, dimethylaminopropyl methacrylate, tert-butylaminoethyl methacrylate and the like, or organic or inorganic salts thereof, and/or alkylammonium compounds, such as, for example, trimethylammonium-ethyl methacrylate chloride, beta-acetamidodiethylaminoethyl acrylate chloride, methacrylamidopropyltrimethylammonium chloride, diallyl-dimethylammonium chloride and the like. These cationic monomers may be used alone or in combination with the aforementioned monomers, provided that such use is compatible with the emulsion polymerization process.

Monomers useful in the present invention may be homopolymerized or copolymerized i.e., one or more different monomers capable of polymerization may be used.

Polymerizable Surface Active Agents

The polymerizable surface active agents utilized in the present invention are amine salts or quaternary nitrogen compounds comprising at least one acid, wherein the acid is a sulfonic acid, a carboxylic acid, or a phosphoric acid, or a mixture thereof, and at least one nitrogenous base, wherein the nitrogenous base contains at least one nitrogen atom and at least one ethylenically unsaturated moiety. Preferably, the polymerizable surface active agents are amine salts. The polymerizable surface active agents are usually present in the mixture in a concentration from about 0.01–100.0 percent by weight based on the total weight of the ethylenically unsaturated monomer. While the polymerizable surface active agents have no particular hydrophilic/lipophilic balance (HLB) value, preferred polymerizable surface active agents have HLB values of less than about 45, and more preferably from about 5–40. The polymerizable surface active agents are generally capable of polymerization with themselves, co-polymerization with the ethylenically unsaturated monomer, or co-polymerization with a partially polymerized polymer.

The polymerizable surface active agents of the present invention may be prepared from readily available, economical raw materials, and generally, their preparation does not require any special handling or equipment. The polymerizable surface active agents may be prepared in a batch mode or a continuous mode. They may be prepared by contacting nitrogenous base with the acid or contacting the acid with the nitrogenous base.

The surface active agents and blends of surface active agents may be prepared in a variety of forms such as, for example, liquids, solutions, solids, powders, flakes, semi-solids, gels, "ringing" gels, G-phase liquids, hexagonal phase solids, or thick pastes. The surface active agents may be spray dried, flaked, extruded, and the like. Although not critical to the present invention, the polymerizable surface active agents may be prepared "neat" or in a conventional solvent such as water, low molecular weight alcohol or hydrocarbon, or a mixture thereof, to produce a solution of the polymerizable surface active agent. The present invention encompasses polymerizable surface active agents as salts in dry form and as aqueous solutions. The polymerizable surface active agents may be isolated by drying a solution of the surface active agents; a solution of polymerizable surface active agents may be prepared by dissolving a solid form of the polymerizable surface active agent (i.e. an amine salt) in water, low molecular weight alcohol or hydrocarbon, or a mixture thereof.

Polymerizable surface active agents of the present invention may be prepared and mixed together to produce a surface active mixture comprising "neat" surface active agents or an aqueous surfactant blend. Additionally, neat or aqueous blends of the polymerizable surface active agents may be prepared by contacting a blend of two or more nitrogenous bases with one acid, or by contacting a blend of two or more nitrogenous bases with a blend of 2 or more acids. Conversely, blends of the polymerizable surface active agents may be prepared by contacting a blend of two or more acids with one nitrogenous base, or by contacting a blend of two or more acids with a blend of two or more nitrogenous bases.

The polymerizable surface active agents utilized in the present invention may be homopolymerized (i.e. polymerized with themselves), or partially homopolymerized, prior to use in the polymerization, to form a homopolymeric surface active agent or a blend of homopolymeric surface active agent(s) and polymerizable surface active agents.

The acids useful in the present invention are generally sulfonic acids, polysulfonic acids, sulfonic acids of oils, paraffin sulfonic acids, lignin sulfonic acids, petroleum sulfonic acids, tall oil acids, olefin sulfonic acids, hydroxyolefin sulfonic acids, polyolefin sulfonic acids, polyhydroxy polyolefin sulfonic acids, carboxylic acids, perfluorinated carboxylic acids, carboxylic acid sulfonates, alkoxylated carboxylic acid sulfonic acids, polycarboxylic acids, polycarboxylic acid polysulfonic acids, alkoxylated polycarboxylic acid polysulfonic acids, phosphoric acids, alkoxylated phosphoric acids, polyphosphoric acids, and alkoxylated polyphosphoric acids, fluorinated phosphoric acids, phosphoric acid esters of oils, phosphinic acids, alkylphosphinic acids, aminophosphinic acids, polyphosphinic acids, vinyl phosphinic acids, phosphonic acids, polyphosphonic acids, phosphonic acid alkyl esters, α-phosphono fatty acids, oragnoamine polymethylphosphonic acids, organoamino dialkylene phosphonic acids, alkanolamine phosphonic acids, trialkyledine phosphonic acids, acylamidomethane phosphonic acids, alkyliminodimethylene diphosphonic acids, polymethylene-bis (nitrilodimethylene)tetra-phosphonic acids, alkyl bis (phosphonoalkylidene) amine oxide acids, esters of substituted aminomethylphosphonic acids, phosphonamidic acids, acylated amino acids (e.g., amino acids reacted with alkyl acyl chlorides, alkyl esters or carboxylic acids to produce N-acylamino acids), N-alkyl acylamino acids, and acylated protein hydrolysates, and mixtures thereof.

Other acids which are useful in the present invention are selected from the group comprising linear or branched alkylbenzene sulfonic acids, alkyl sulfuric acid esters, alkoxylated alkyl sulfuric acid esters, α-sulfonated alkyl ester acids, α-sulfonated ester diacids, alkoxylated α-sulfonated alkyl ester acids, α-sulfonated dialkyl diester acids, di-α-sulfonated dialkyl diester acids, α-sulfonated alkyl acetate acids, primary and secondary alkyl sulfonic acids, perfluorinated alkyl sulfonic acids, sulfosuccinic mono- and diester acids, polysulfosuccinic polyester acids, sulfoitaconic diester acids, sulfosuccinamic acids, sulfosuccinic amide acids, sulfosuccinic imide acids, phthalic acids, sulfophthalic acids, sulfoisophthalic acids, phthalamic acids, sulfophthalamic acids, alkyl ketone sulfonic acids, hydroxyalkane-1-sulfonic acids, lactone sulfonic acids, sulfonic acid amides, sulfonic acid diamides, alkyl phenol sulfuric acid esters, alkoxylated alkyl phenol sulfuric acid esters, alkylated cycloalkyl sulfuric acid esters, alkoxylated alkylated cycloalkyl sulfuric acid esters, dendritic polysulfonic acids, dendritic polycarboxylic acids, dendritic polyphosphoric acids, sarcosinic acids, isethionic acids, and tauric acids, and mixtures thereof.

Still other suitable acids for use in the invention are fluorinated carboxylic acids, fluorinated sulfonic acids, fluorinated sulfate acids, fluorinated phosphonic and phosphinic acids, and mixtures thereof.

Preferred acids for use in the invention are α-sulfonated alkyl ester acids, α-sulfonated ester diacids, alkoxylated alkyl sulfuric acid esters, alkoxylated alkyl aryl sulfuric acid esters, alkyl aryl sulfonic acids, and mixtures thereof.

Due to their inherent hydrolytic instability, the sulfuric acid esters are preferably immediately converted to ethylenically unsaturated amine salts. For example, linear dodecyl alcohol is sulfated with $SO_3$ to produce an intermediate, hydrolytically unstable, dodecyl alcohol sulfate acid as shown in Scheme I below. The intermediate acid is neutralized with an ethylenically unsaturated nitrogenous base, such as allyl amine, to produce a dodecyl sulfate ethylenically unsaturated amine salt.

Scheme I: Formation of Dodecyl Sulfate Ethylenically Unsaturated Amine Salt

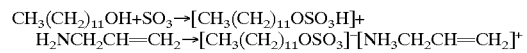

Methyl laurate, for example, may be sulfonated with $SO_3$ to produce an intermediate α-sulfonated lauryl methyl ester acid, as shown in Scheme II below. This acid is then neutralized with an ethylenically unsaturated nitrogenous base, such as allyl amine, to produce an α-sulfonated lauryl methyl ester ethylenically unsaturated amine salt. An α-sulfonated lauryl methyl ester ethylenically unsaturated amine di-salt may be produced as shown below in Scheme III. The α-sulfonated lauryl methyl ester ethylenically unsaturated amine salt and the α-sulfonated lauryl fatty acid ethylenically unsaturated amine di-salt may be formed as a mixture depending on the sulfonation conditions employed. The ratio of unsaturated amine salt to unsaturated amine di-salt is readily controlled by sulfonation conditions well known to those skilled in the art.

Scheme II: Formation of α-Sulfonated Lauryl Methyl Ester Ethylenically Unsaturated Amine Salt

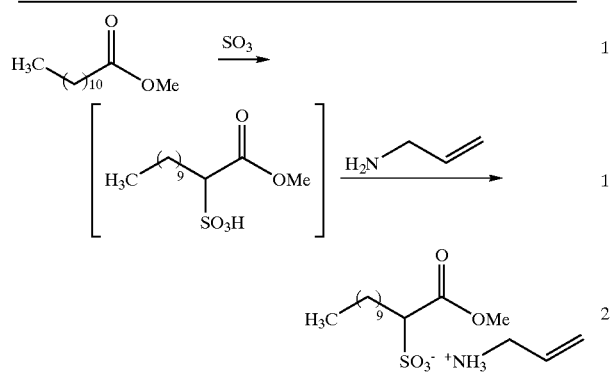

Scheme III: Formation of α-Sulfonated Lauryl Methyl Ester Ethylenically Unsaturated Amine Di-Salt

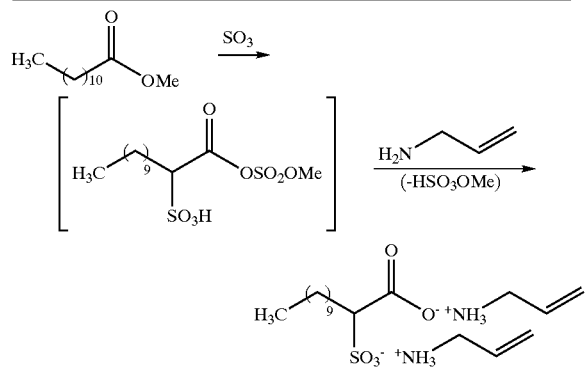

Ethylenically unsaturated amine salts of sulfosucinnate ester acids may be produced by sulfitation of a succinic acid alkyl diester with sodium bisulfite, followed by, for example, ionic exchange with an ethylenically unsaturated nitrogenous base, such as allyl amine, as shown in Scheme IV below.

Sarcosinic acid ethylenically unsaturated amine salts are prepared by the amidation of a fatty acid, a fatty acid alkyl ester or a fatty acid chloride with sarcosine, followed by addition of an ethylenically unsaturated nitrogenous base, such as allyl amine, as shown in Scheme V below. Optionally, and somewhat less preferably, the ethylenically unsaturated nitrogenous base may be combined with sarcosine to produce the corresponding sarcosine salt, which is then be used to amidate the fatty acid, fatty acid alkyl ester or fatty acid chloride.

Scheme V: Formation Of A Fatty Sarcosinate Acid Ethylenically Unsaturated Amine Salt

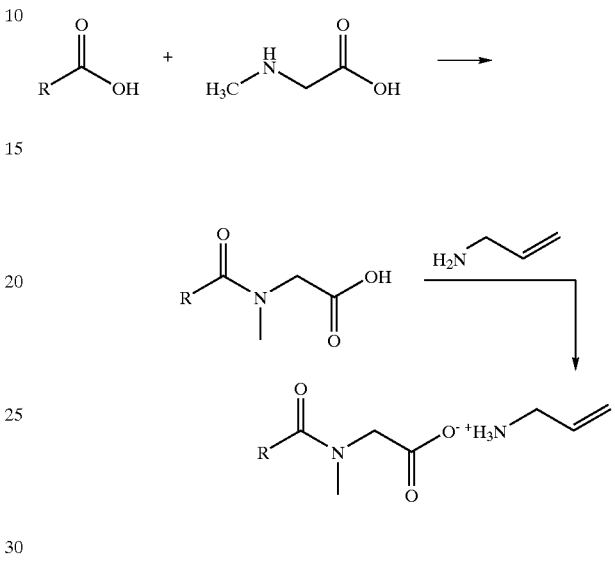

The isethionic acid ethylenically unsaturated amine salts may be prepared by the esterification of a fatty acid, a fatty acid alkyl ester or a fatty acid chloride with isethionic acid, followed by addition of an ethylenically unsaturated nitrogenous base, such as allyl amine, as shown in Scheme VI below. Additionally, isethionic acid ethylenically unsaturated amine salts may be prepared by esterifying a fatty acid, a fatty acid alkyl ester or a fatty acid chloride with the sodium salt of isethionic acid, followed by ion exchange with the ethylenically unsaturated nitrogenous base, such as allyl amine. Optionally, isethionic acid, or its sodium salt, may be combined with the ethylenically unsaturated nitrogenous base, such as allyl amine, to produce the isethionic acid allyl amine salt, which may then be esterified with a fatty acid, a fatty acid alkyl ester or a fatty acid chloride.

Scheme IV: Formation of a Sulfosuccinate Ester Ethylenically Unsaturated Amine Salt

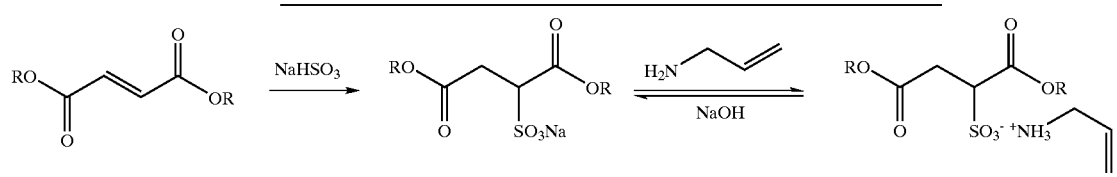

Scheme VI: Formation Of An Isethionic Acid Ethylenically Unsaturated Amine Salt

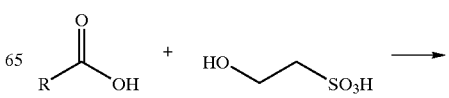

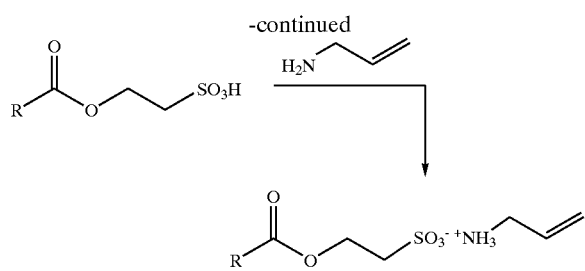

The preferred acids for use in the invention are branched or linear alkylbenzene sulfonic acids, alkyl sulfuric acid esters, alkoxylated alkyl sulfuric acid esters, α-sulfonated alkyl ester acids, fatty carboxylic acids and phosphoric acid esters, and mixtures thereof. The most preferred acids of the present invention are branched or linear alkylbenzene sulfonic acids, alkyl sulfuric acid esters, and alkoxylated alkyl sulfuric acid esters, and mixtures thereof.

Other useful surfactants for use in the invention are sulfonic acid salts of ethylenically unsaturated amines, derived from sultone precursors, such as cyclic alkyl sultones. Examples of these sultone-derived sulfonic acid salts (e.g., allyl amine salts) include 2-acetamidoalkyl-1-sulfonates and amino carboxy acid alkyl sulfonates, as shown in Scheme VII and Scheme VIII below.

Scheme VII: 2-Acetamidoalkyl-1-Sulfonic Acid Allyl Amine Salts

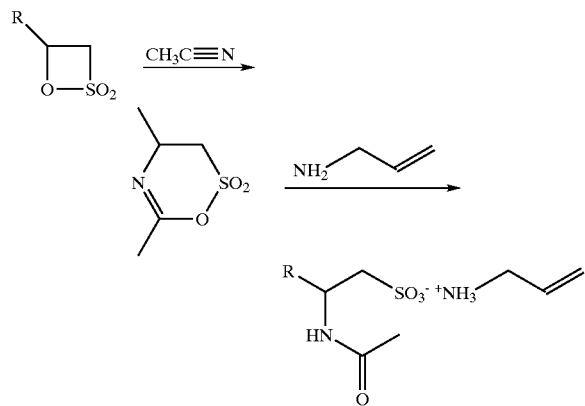

where R is $C_{4-24}$ alkyl.

Scheme VIII: Amino Carboxy Acid Alkyl Sulfonic Acid Allyl Amine Salts

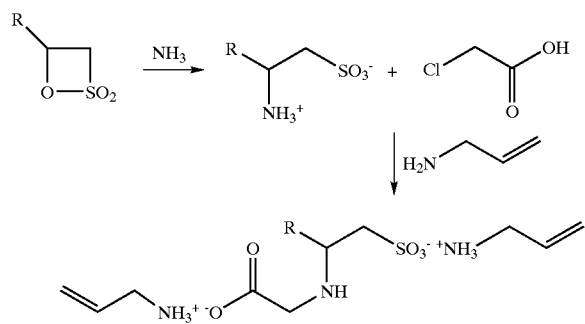

where R is $C_{4-24}$ alkyl.

The above surfactants are representative of the surfactants useful in the invention. Those skilled in the art will recognize other surfactants that can be used to prepare polymerizable surface active agents useful for making CASE materials.

Nitrogenous Base

In general, nitrogenous bases which are useful in the invention are nitrogenous bases which contain an ethylenically unsaturated moiety, including various vinyl amines. Nitrogenous bases useful in the invention are compounds of the formula:

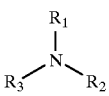

wherein $R_1$, $R_2$ and $R_3$ are independently hydrogen or organic groups containing at least one ethenylene group, provided that at least one of $R_1$–$R_3$ is a straight or branched chain alkyl group containing 1–8 carbon atoms and an ethenylene functionality.

Examples of nitrogenous bases useful in the invention are ethylenically unsaturated amines selected from the group comprising vinyl amine, N-methyl N-allyl amine, $C_1$–$C_{24}$ alkyl allyl amine, $C_1$–$C_{24}$ alkyl ethoxylated and/or propoxylated allyl amine, $C_1$–$C_{24}$ dialkyl allyl amine, ethoxylated and/or propoxylated allyl amine diallyl amine, $C_1$–$C_{24}$ alkyl diallyl amine, ethoxylated and/or propoxylated diallyl amine, triallyl amine, 1,2-diaminoethene, aminocrotonitrile, diaminomaleonitrile, N-allylcyclopentylamine, N-allylaniline, allylcyclohexylamine, [1-(2-allylphenoxy)-3-(isopropylamino)-2-propanol], 3-amino-2-butenethioamide, bis[4-(dimethylamino)-benzylidene]acetone, 1,4-butanediol bis(3-aminocrotonate), 3-amino-1-propanol vinyl ether, 2-(diethylamino)ethanol vinyl ether, 4-(diethylamino)cinnamaldehyde, 4-(diethylamino)cinnamonitrile, 2-(diethylamino)ethyl methacrylate, diethyl (6-methyl-2-pyridylaminomethylene)maleate, 3-(dimethylamino)acrolein, 2-(dimethylamino)ethyl methacrylate, 4-dimethylaminocinnamaldehyde, 2-(dimethylamino)ethyl acrylate, 3-(dimethylamino)-2-methyl-2-propenal, 9-vinylcarbazole, N-vinylcaprolactam, 1-vinylimidazole, 2-vinylpyridine, 4-vinylpyridine, allylcyclohexylamine, N-allylcyclopentylamine, allyl (diisopropylamino)dimethylsilane, 1-allylimidazole, 1-vinyl-2-pyrrolidinone, N-[3-(dimethylamino)propyl]methacrylamide, 4-[4-(dimethylamino)styryl]pyridine, 2-[4-(dimethylamino)styryl]pyridine, 2-[4-(1,2-diphenyl-1-butenyl)phenoxy]-N,N-dimethylethylamine, 2-[4-dimethylamino)styryl]-benzothiozole, 5-[4-(dimethylamino)phenyl]-2,4-pentandienal, (dimethylaminomethylene)malononitrile, 4-dimethylaminocinnamonitrile, 4-(dimethylamino)chalcone, [6-(3,3-dimethylallylamino-purine riboside, 3,7-dimethyl-2,6-octadien-1-ylamine, 2-isopropenylaniline, isopropyl 3-aminocrotonate, S-{2-[3-(hexyloxy)benzoyl]-vinyl}glutathione, methyl 3-aminocrotonate, N-methylallylamine, N-methyl-1-(methylthio)-2-nitroetheneamine, oleylamine, tetrakis(dimethylamino)ethylene, 5-[(6,7,8-trimethoxy-4-quinazolinyl)amino]-1-pentanol nitrate ester, tris(2-methylallyl)amine, N,N,N',N'-tetramethyl-2-butene-1,4-diamine, S-{2-[3-(octyloxy)benzoyl]vinyl}-glutathione, 4,4'-vinylidene-(N,N-dimethylaniline), 2', 5'-dimethoxy-4-stilbenamine, 3-(dimethylamino)propyl acrylate, 3-dimethylaminoacrylonitrile, 4-(dimethylamino)-cinnamic acid, 2-amino-1-propene-1,1,3-tricarbonitrile, 2-amino-4-pentenoic acid, N, N'-diethyl-2-butene-1,4-diamine, 10,11-dihyro-N,N-dimethyl-5-methylene-5H-dibenzo[a,d]-cyclohepene-10-ethanamine maleate, 4-(dicyanomethylene)-2-methyl-6-(4-dimethyl-aminostyryl)-4H-pyran, N-ethyl-2-methylallylamine, ethyl 3-aminocrotonate, ethyl-α-cyano-3-indoleacrylate, ethyl-3-amino-4,4-dicyano-3- butenoate, 1,3-divinyl-1,1,3,3-tetramethyldisilazane, N-(4,5-dihydro-5-oxo-1-phenyl-1H-pyrazol-3-yl)-9-octadecenamide, and N-oleoyl-tryptophan ethyl ester, and mixtures thereof.

Preferred nitrogenous bases of the present invention are allyl amine, diallyl amine, triallyl amine, methylallyl amine, N-allyl-N,N-dimethyl amine, methyl 3-amino crotonate, 3-amino crotononitrile, 3-amino-1-propanol vinyl ether, N-methyl N-allyl amine, 2-(dimethylamino)ethyl acrylate, or 1,4-diamino-2-butene, and mixtures thereof. More preferred nitrogenous bases of the present invention are allyl amine, diallyl amine, triallyl amine, methallyl amine, N-methyl N-allyl amine, and 2-(dimethylamino)ethyl acrylate, and mixtures thereof.

In the methods and compositions of the invention, amine salts are preferred to quaternary ammonium compounds.

Accordingly, the present invention utilizes surface active agents of the formula:

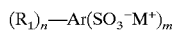

wherein $R_1$ is a saturated or unsaturated hydrocarbon group having from about 1–24 carbon atoms; wherein Ar is a phenyl, polyphenyl, napthyl, polynapthyl, styryl, or polystyryl group, or a mixture thereof; wherein $M^+$ is a conjugate acid of the nitrogenous base; wherein n is an integer of from 1–5 and m is an integer of from 1–8; and wherein the total number of carbon atoms represented by $(R_1)_n$ is at least 5. In a preferred embodiment $R_1$ is a saturated or unsaturated hydrocarbon group having from about 6–24 carbon atoms, Ar is a phenyl, $M^+$ is a conjugate acid of the nitrogenous base, the nitrogenous base selected from the group consisting of allyl amine, diallyl amine, triallyl amine, methallyl amine, N-methyl N-allyl amine or 2-(dimethylamino)ethyl acrylate, and mixtures thereof and n is 1 and m is 1. In another preferred embodiment, the surface active agent is of the formula:

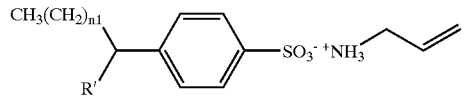

wherein n1=4–18; and wherein R' is hydrogen or saturated or unsaturated hydrocarbon group having from about 1–8 carbon atoms.

The present invention further utilizes surface active agents of the formula

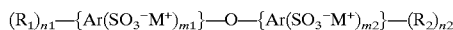

wherein $R_1$ and $R_2$ are independently hydrogen, or saturated or unsaturated hydrocarbon groups having from about 1–24 carbon atoms; wherein Ar is a phenyl, polyphenyl, napthyl, polynapthyl, styryl, or polystyryl group, or a mixture thereof; wherein $M^+$ is a conjugate acid of the nitrogenous base; wherein n1 and n2 are independently 0–5, provided that n1 and n2 are not both equal to zero; and wherein m1 and m2 are independently 0–8, provided that m1 and m2 are not both equal to zero. In a preferred embodiment, $R_1$ is hydrogen and $R_2$ is a saturated or unsaturated hydrocarbon group having from about 6–24 carbon atoms, Ar is phenyl, $M^+$ is a conjugate acid of the nitrogenous base, the nitrogenous base selected from the group consisting of allyl amine, diallyl amine, triallyl amine, methallyl amine, N-methyl N-allyl amine or 2-(dimethylamino)ethyl acrylate, and mixtures thereof, n1=4, n2=1, and m1 and m2 both equal one. In another preferred embodiment, $R_1$ and $R_2$ are independently saturated or unsaturated hydrocarbon groups having from about 6–24 carbon atoms, Ar is phenyl, $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof, n1 and n2 both equal one, and m1 and m2 both equal one. In another preferred embodiment, the surface active agent is of the formula:

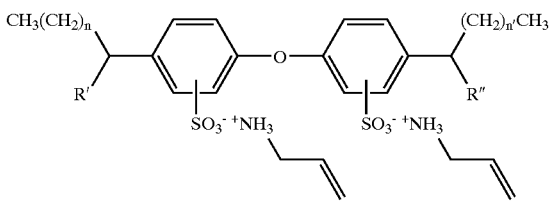

wherein n and n' are independently 4–18; and wherein R' and R" are independently hydrogen, methyl, ethyl or propyl.

The present invention further utilizes surface active agents of the formula:

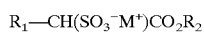

wherein $R_1$ and $R_2$ are independently saturated or unsaturated hydrocarbon groups having from about 1–24 carbon atoms; and wherein $M^+$ is a conjugate acid of the nitrogenous base. In a preferred embodiment, $R_1$ is a saturated or unsaturated hydrocarbon group having from about 6–24 carbon atoms, $R_2$ is methyl, ethyl, or propyl, or a mixture thereof, and $M^+$ is a conjugate acid of the nitrogenous base, the nitrogenous base selected from the group consisting of allyl amine, diallyl amine, triallyl amino-methallyl amine, N-methyl N-allyl amine, or 2-(dimethylamino)ethyl acrylate, and mixtures thereof. In another preferred embodiment, the surface active agent is of the formula:

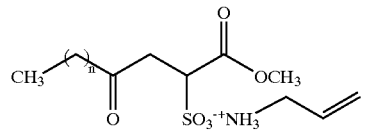

wherein n=3–18.

The present invention further utilizes surface active agents of the formula:

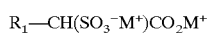

wherein $R_1$ is a saturated or unsaturated hydrocarbon group having from about 3–24 carbon atoms; and wherein $M^+$ is a conjugate acid of the nitrogenous base. In a preferred embodiment, $R_1$ is a saturated or unsaturated hydrocarbon group having from about 6–24 carbon atoms, $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof. In another preferred embodiment, the surface active agent is of the formula:

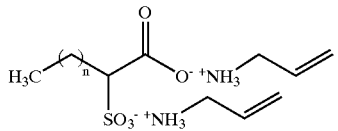

wherein n=3–18.

The present invention further utilizes surface active agents of the formula:

wherein $R_1$ and $R_2$ are independently saturated or unsaturated hydrocarbon groups having from about 1–24 carbon atoms; wherein R' is methyl or hydrogen; wherein n is an integer of from 1–100; and wherein $M^+$ is a conjugate acid of the nitrogenous base. In a preferred embodiment, $R_1$ is a saturated or unsaturated hydrocarbon group having from about 4–24 carbon atoms, R' is methyl or hydrogen, $R_2$ is methyl, ethyl, or propyl, and mixtures thereof, $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof, and n=1–100. In another preferred embodiment, the surface active agent is of the formula:

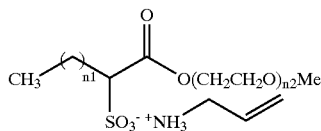

wherein n1=2–18; and wherein n2=1–20.

The present invention further utilizes surface active agents of the formula:

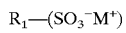

wherein $R_1$ is a saturated or unsaturated hydrocarbon group having from about 6–24 carbon atoms and wherein $M^{+}+$ is a conjugate acid of the nitrogenous base. In a preferred embodiment, $R_1$ is a saturated or unsaturated hydrocarbon group having from about 6–24 carbon atoms, and $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof. In another preferred embodiment, the surface active agent is of the formula:

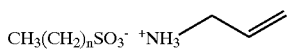

wherein n=5–17.

The present invention further utilizes surface active agents of the formula:

wherein $R_1$ and $R_2$ are independently saturated or unsaturated hydrocarbon groups having from about 1–24 carbon atoms; wherein n is zero or an integer of from 1–10; and wherein $M^+$ is a conjugate acid of the nitrogenous base. In a preferred embodiment, $R_1$ and $R_2$ are independently saturated or unsaturated hydrocarbon groups having from about 1–24 carbon atoms, n=1–6, and $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof. In another preferred embodiment, the surface active agent is of the formula:

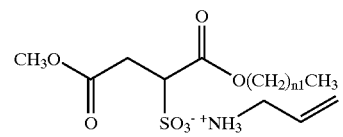

wherein n1 is zero or an integer of from 1–17

The present invention further utilizes surface active agents of the formula:

wherein $R_1$ is a saturated or unsaturated hydrocarbon group having from about 1–24 carbon atoms; wherein n=1–10; and wherein $M^+$ is a conjugate acid of the nitrogenous base. In a preferred embodiment, $R_1$ is a saturated or unsaturated hydrocarbon group having from about 6–24 carbon atoms, n=1–5, and $M^+$ is a conjugate acid of the nitrogenous base, the nitrogenous base selected from the group consisting essentially of allyl amine, diallyl amine, triallyl amine, methallyl amine, N-methyl N-allyl amine, or 2-(dimethylamino)ethyl acrylate, or a mixture thereof. In another preferred embodiment, the surface active agent is of the formula:

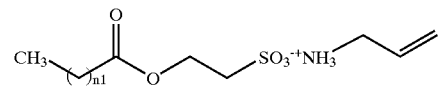

wherein n1=2–18.

The invention further utilizes surface active agents of the formula:

wherein $R_1$ is a saturated or unsaturated hydrocarbon group having from about 1–24 carbon atoms; wherein Ar is a phenyl, polyphenyl, napthyl, polynapthyl, styryl, or polystyryl group, and mixtures thereof; wherein R' is methyl or hydrogen; wherein $M^+$ is a conjugate acid of the nitrogenous base; wherein n=1–5; wherein the total number of carbon atoms represented by $(R_1)_n$ is at least 5; and wherein m is zero or an integer of from 1–100. In a preferred embodiment, $R_1$ is a saturated or unsaturated hydrocarbon group having from about 6–24 carbon atoms, Ar is phenyl; $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof, n=1, and m is zero or an integer of from 1–100. In another preferred embodiment, the surface active agent is of the formula:

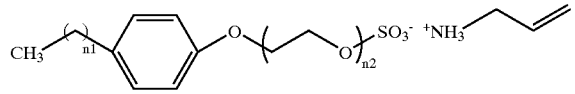

wherein n1=5–18; and wherein n2=0–20.

The invention further utilizes surface active agents of the formula:

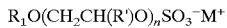
$R_1O(CH_2CH(R')O)_nSO_3^- M^+$ wherein $R_1$ is a saturated or unsaturated hydrocarbon group having from about 1–24 carbon atoms; wherein R' is methyl or hydrogen; wherein n=0–100; and wherein $M^+$ is a conjugate acid of the nitrogenous base. In a preferred embodiment, $R_1$ is a saturated or unsaturated hydrocarbon group having from about 6–24 carbon atoms, R' is methyl or hydrogen, n=0–100, and $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof. In another preferred embodiment, the surface active agent is of the formula:

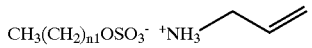

wherein n1=5–18. In another preferred embodiment, the surface active agent is of the formula:

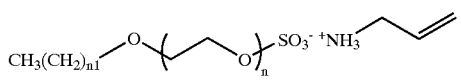

wherein n1=5–18; and wherein n=1–20.

The present invention further utilizes surface active agents of the formula:

$R_1CO_2^- M^+$ wherein $R_1$ is a saturated or unsaturated hydrocarbon group having from about 4–24 carbon atoms; and wherein $M^+$ is a conjugate acid of the nitrogenous base. In a preferred embodiment, $R_1$ is a saturated or unsaturated hydrocarbon group having from about 6–24 carbon atoms, and $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof. In another preferred embodiment, the surface active agent is of the formula:

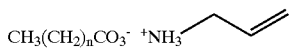

wherein n=5–18.

The invention further utilizes surface active agents of the formula:

$R_1CON(R')(CH_2)_nCO_2^- M^+$ wherein $R_1$ is a saturated or unsaturated hydrocarbon group having from about 1–24 carbon atoms; wherein R' is methyl, ethyl, propyl or hydrogen; wherein $M^+$ is a conjugate acid of the nitrogenous base; and wherein n=1–10. In a preferred embodiment, $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof, R' is methyl, ethyl, propyl or hydrogen, and n=2–5. In another preferred embodiment, the surface active agent is of the formula:

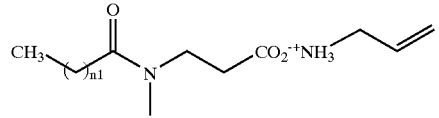

wherein n1=2–18.

The present invention further utilizes surface active agents of the formula:

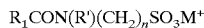
$R_1CON(R')(CH_2)_nSO_3M^+$ wherein $R_1$ is a saturated or unsaturated hydrocarbon group having from about 1–24 carbon atoms; wherein R' is methyl, ethyl, propyl or hydrogen; wherein $M^+$ is a conjugate acid of the nitrogenous base; and wherein n=1–10. In a preferred embodiment, $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof, R' is methyl, ethyl, propyl or hydrogen, and n=2–5. In another preferred embodiment, the surface active agent is of the formula:

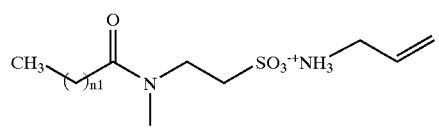

wherein n1=2–18.

The present invention further utilizes surface active agents of the formula:

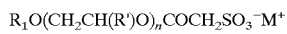
$R_1O(CH_2CH(R')O)_nCOCH_2SO_3^- M^+$ wherein $R_1$ is a saturated or unsaturated hydrocarbon group having from about 1–24 carbon atoms; wherein R' is methyl or hydrogen; wherein n=0–100; wherein $M^+$ is a conjugate acid of the nitrogenous base. In a preferred embodiment, $R_1$ is a saturated or unsaturated hydrocarbon group having from about 6–24 carbon atoms; R' is methyl or hydrogen, $M^+$ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof; and n=0–100. In another preferred embodiment, the surface active agent is of the formula:

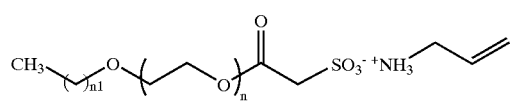

wherein n1=5–17; and wherein n=0–20.

The present invention further utilizes surface active agents of the formula:

$R_1O(PO_3)^{x-}M^+_y$ wherein $R_1$ is a saturated or unsaturated hydrocarbon group having from about 1–24 carbon atoms, phenyl, polyphenyl, napthyl, polynapthyl, styryl, or polystyryl group, an alkyl/alkoxylate substituted phenyl, an alkyl/alkoxylate substituted or poly-substituted polyphenyl, an alkyl/alkoxylate substituted or poly-substituted napthyl, an alkyl/alkoxylate substituted or poly-substituted polynapthyl, an alkyl/ alkoxylate substituted or poly-substituted styryl, or an alkyl/alkoxylate substituted or poly-substituted polystyryl group, and mixtures thereof; wherein M⁺ is a conjugate acid of the nitrogenous base; wherein x=1 or 2; and wherein y=1 or 2.

The present invention further utilizes surface active agents of the formula:

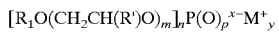

wherein $R_1$ is a saturated or unsaturated hydrocarbon group having from about 1–24 carbon atoms; wherein R' is methyl or hydrogen; wherein M⁺ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof; m=0–100; wherein n=1 or 2; wherein p=2 or 3; wherein x=1 or 2; and wherein y=1 or 2.

The present invention further utilizes surface active agents of the formula:

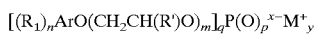

wherein $R_1$ is a saturated or unsaturated hydrocarbon group having from about 1–24 carbon atoms; wherein Ar is phenyl; wherein R' is methyl or hydrogen; wherein M⁺ is a conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof; wherein n=14; wherein m=0–100; wherein q=1 or 2; wherein p=2 or 3; wherein x=1 or 2; and wherein y=1 or 2.

Although less preferred, the present invention may utilize polymerizable surface active agents which are quaternary ammonium salts of the general formula:

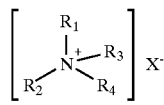

wherein $R_1$, $R_2$, $R_3$, and $R_4$ are independently, substituted or unsubstituted hydrocarbyl groups of from about 1 to about 30 carbon atoms, or hydrocarbyl groups having from about 1 to about 30 carbon atoms and containing one or more aromatic, ether, ester, amido, or amino moieties present as substituents or as linkages in the radical chain, wherein at least one of the $R_1$–$R_4$ groups contains at least one or more ethenylene groups; and wherein X⁻ is an anion group selected from the group consisting of sulfonate, sulfate, sulfinate, sulfenate, phosphate, carboxylate, nitrate, and acetate. Additionally, useful polymerizable surface active agents include those of the above general formula in the form of ring structures formed by covalently linking two of the $R_1$–$R_4$ groups. Examples include unsaturated imidazolines, imidazoliniums, and pyridiniums, and the like. These quaternary ammonium salts may be prepared by a variety of methods known to the art, for example, halide exchange, wherein a halide based quaternary ammonium compound is ion exchanged with X⁻, where X⁻ is defined above.

The present invention encompasses amine oxide-derived polymerizable surface active agents, formed as shown in Scheme IX, wherein $R_1$, $R_2$, $R_3$ are independently, substituted or unsubstituted hydrocarbyl groups of from about 1 to about 30 carbon atoms, or hydrocarbyl groups having from about 1 to about 30 carbon atoms and containing one or more aromatic, ether, ester, amido, or amino moieties present as substituents or as linkages in the radical chain, wherein at least one of the $R_1$–$R_3$ groups contains at least one or more ethenylene groups; and wherein X⁻ is an anion group selected from the group consisting of sulfonate, sulfate, sulfinate, sulfenate, phosphate, carboxylate, nitrate, and acetate. Additionally, useful polymerizable surface active agents include those of the above general formula in the form of ring structures formed by covalently linking two of the $R_1$–$R_4$ groups. Examples include unsaturated imidazolines, imidazoliniums, and pyridiniums, and the like.

Scheme IX: Amine Oxide-Derived Polymerizable Surface Active Agents

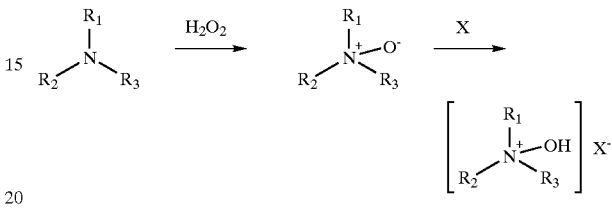

The present invention further encompasses quaternary halide-derived polymerizable surface active agents, formed as shown in Scheme X, wherein $R_1$, $R_2$, $R_3$ are independently, substituted or unsubstituted hydrocarbyl groups of from about 1 to about 30 carbon atoms, or hydrocarbyl groups having from about 1 to about 30 carbon atoms and containing one or more aromatic, ether, ester, amido, or amino moieties present as substituents or as linkages in the radical chain, wherein at least one of the $R_1$–$R_3$ groups contains at least one or more ethenylene groups; and wherein X⁻ is an anion group selected from the group consisting of sulfonate, sulfate, sulfinate, sulfenate, phosphate, carboxylate, nitrate, and acetate. Additionally, useful polymerizable surface active agents include those of the above general formula in the form of ring structures formed by covalently linking two of the $R_1$–$R_4$ groups. Examples include unsaturated imidazolines, imidazoliniums, and pyridiniums, and the like.

The present invention further encompasses polymerizable onium compounds, particularly ammonium salts, sulfonium salts, sulfoxonium salts, oxonium salts, nitronium salts, and phosphonium salts of various anions, including for example, anions group selected from the group consisting of sulfonate, sulfate, sulfinate, sulfenate, phosphate, carboxylate, nitrate, acetate and various halides; wherein the onium compound contains at least one ethenylene functionality.

"Reverse" Polymerizable Surface Active Agents

Although somewhat less preferred, the polymerizable, surface active agents utilized in the invention may be "reverse" polymerizable surface active agents. Reverse polymerizable surface active agents are amine salts or quaternary nitrogen compounds comprising: (1) at least one ethylenically unsaturated acid, wherein the acid contains at least one ethylenically unsaturated moiety and is a sulfonic acid, a carboxylic acid, or a phosphoric acid, or a mixture thereof; and (2) at least one substantially saturated nitrogenous base, wherein the nitrogenous base contains at least one nitrogen atom and a $C_1$–$C_{24}$ alkyl group. By substantially saturated nitrogenous base, it is meant that the nitrogenous base contains less than about 5% unsaturation in the alkyl group(s).

In general, the ethylenically unsaturated acids of the present invention are any sulfonic acids, carboxylic acids, or phosphoric acids that contain at least one unsaturated moiety. More specifically, the ethylenically unsaturated acids useful in the present invention are generally vinyl sulfonic acids, vinyl sulfinic acids, vinyl sulfenic acids, vinyl sulfonic acid esters, vinyl carboxylic acids, vinyl, phosphoric acids, vinyl phosphonic acids, vinyl phosphinic, vinyl phosphenic acids, unsaturated sulfonic acids, unsaturated polysulfonic acids, unsaturated sulfonic acids of oils, unsaturated paraffin sulfonic acids, unsaturated lignin sulfonic acids, unsaturated petroleum sulfonic acids, unsaturated tall oil acids, unsaturated olefin sulfonic acids, unsaturated hydroxyolefin sulfonic acids, unsaturated polyolefin sulfonic acids, unsaturated polyhydroxy polyolefin sulfonic acids, unsaturated carboxylic acids, unsaturated perfluorinated carboxylic acids, unsaturated carboxylic acid sulfonates, unsaturated alkoxylated carboxylic acid sulfonic acids, unsaturated polycarboxylic acids, unsaturated polycarboxylic acid polysulfonic acids, unsaturated alkoxylated polycarboxylic acid polysulfonic acids, unsaturated phosphoric acids, unsaturated alkoxylated phosphoric acids, unsaturated polyphosphoric acids, and unsaturated alkoxylated polyphosphoric acids, unsaturated fluorinated phosphoric acids, unsaturated phosphoric acid esters of oils, unsaturated phosphinic acids, unsaturated alkylphosphinic acids, unsaturated aminophosphinic acids, unsaturated polyphosphinic acids, unsaturated vinyl phosphinic acids, unsaturated phosphonic acids, unsaturated polyphosphonic acids, unsaturated phosphonic acid alkyl esters, unsaturated α-phosphono fatty acids, unsaturated oragnoamine polymethylphosphonic acids, unsaturated organoamino dialkylene phosphonic acids, unsaturated alkanolamine phosphonic acids, unsaturated trialkyledine phosphonic acids, unsaturated acylamidomethane phosphonic acids, unsaturated alkyliminodimethylene diphosphonic acids, unsaturated polymethylene-bis(nitrilodimethylene)tetraphosphonic acids, unsaturated alkyl bis(phosphonoalkylidene) amine oxide acids, unsaturated esters of substituted aminomethylphosphonic acids, unsaturated phosphonamidic acids, unsaturated acylated amino acids (e.g., amino acids reacted with alkyl acyl chlorides, alkyl esters or carboxylic acids to produce N-acylamino acids), unsaturated N-alkyl acylamino acids, and unsaturated acylated protein hydrolysates, and mixtures thereof.

Other ethylenically unsaturated acids which are useful in the present invention are selected from the group comprising unsaturated linear or branched alkylbenzene sulfonic acids, unsaturated alkyl sulfuric acid esters, unsaturated alkoxylated alkyl sulfuric acid esters, unsaturated α-sulfonated alkyl ester acids, unsaturated α-sulfonated ester diacids, unsaturated alkoxylated α-sulfonated alkyl ester acids, unsaturated α-sulfonated dialkyl diester acids, unsaturated di-α-sulfonated dialkyl diester acids, unsaturated α-sulfonated alkyl acetate acids, unsaturated primary and secondary alkyl sulfonic acids, unsaturated perfluorinated alkyl sulfonic acids, unsaturated sulfosuccinic mono- and diester acids, unsaturated polysulfosuccinic polyester acids, unsaturated sulfoitaconic diester acids, unsaturated sulfosuccinamic acids, unsaturated sulfosuccinic amide acids, unsaturated sulfosuccinic imide acids, unsaturated phthalic acids, unsaturated sulfophthalic acids, unsaturated sulfoisophthalic acids, unsaturated phthalamic acids, unsaturated sulfophthalamic acids, unsaturated alkyl ketone sulfonic acids, unsaturated hydroxyalkane-1-sulfonic acids, unsaturated lactone sulfonic acids, unsaturated sulfonic acid amides, unsaturated sulfonic acid diamides, unsaturated alkyl phenol sulfuric acid esters, unsaturated alkoxylated alkyl phenol sulfuric acid esters, unsaturated alkylated cycloalkyl sulfuric acid esters, unsaturated alkoxylated alkylated cycloalkyl sulfuric acid esters, unsaturated dendritic polysulfonic acids, unsaturated dendritic polycarboxylic acids, unsaturated dendritic polyphosphoric acids, unsaturated sarcosinic acids, unsaturated isethionic acids, and unsaturated tauric acids, and mixtures thereof.

Additionally, suitable ethylenically unsaturated acids of the present invention include unsaturated fluorinated carboxylic acids, unsaturated fluorinated sulfonic acids, unsaturated fluorinated sulfate acids, unsaturated fluorinated phosphonic and phosphinic acids, and mixtures thereof.

In general, the substantially saturated nitrogenous bases of the present invention are any bases which contain at least one nitrogen atom, and are capable of forming a salt with the ethylenically unsaturated acid. The saturated nitrogenous bases suitable for use in the present invention include any primary, secondary or tertiary amine, which has at least one $C_1$–$C_{24}$ alkyl group. Preferably, the alkyl groups of such amines have from about 12 to about 22 carbon atoms, and may be substituted or unsubstituted. Such amines, include for example, stearamido propyl dimethyl amine, diethyl amino ethyl stearamide, dimethyl stearamine, dimethyl soyamine, soyamine, myristyl amine, tridecyl amine, ethyl stearylamine, N-tallowpropane diamine, ethoxylated (5 moles E.O.) stearylamine, dihydroxy ethyl stearylamine, and arachidylbehenylamine and mixtures thereof.

Auxiliary Polymerizable Surface Active Agents

The present invention encompasses the use of auxiliary polymerizable surface active agents, i.e. polymerizable surface active agent known to those skilled in the art, in combination with the polymerizable surface active agents, homopolymeric surface active agents, and supplemental surface active agents described herein. Examples of auxiliary polymerizable surface active agents useful in the present invention are shown below in Table I.

TABLE I

Auxillary Polymerizable Surface Active Agents

Diallyl Amine Pluronics - 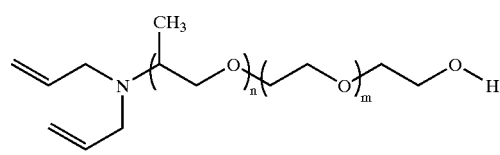

Linoleic Alcohol ICI 

TABLE I-continued

Auxillary Polymerizable Surface Active Agents

Allyl Alkyl Phenol DKS

Acrylate Derivatives -

Allyl Alcohol Alkenyl Anhydride Derivatives - (Japan

Polystep RA Series Derivatives) - Stepan

Maleic Derivatives - Poulen

Trem LF-40 Sulfosuccinate Henke

Additional auxiliary polymerizable surfactants useful herein, for example, are generally disclosed in *Polymerizable Surfactants* Guyot, A. *Current Opinions in Colloid and Surface Science*, 1996, pg. 580–585; Reactive Surfactants in Emulsion Polymerization Guyot, A.; et. al; Advances in Polymer Science, Vol. 11, Springer-Verlag, Berlin, 1994, pg.43–65; and Polymerizable Surfactant, Holmberg, K., Progress in Organic Coatings, 20 (1992) 325–337 (each of which is incorporated herein in its entirety).

Supplemental Surface Active Agents

Due to their migrating nature, generally, it is advantageous to not use conventional, non-polymerizable surface active agents in the present invention. However, if so desired, the polymerizable surface active agents of the present invention may be used in the polymerization in combination with minor amounts of a conventional polymerization surfactants, i.e. supplemental surface active agents, that are not polymerizable. Without being bound by any particular theory, these supplemental surface active agents may allow for the varying of particle size of the resulting discrete, solid, polymeric particles. The supplemental surface active agents are generally anionic, nonionic, cationic or amphoteric surfactants or mixtures thereof, and are typically used as in a concentration of about 0.01 to about 20.0 percent by weight, based on the total weight of surface active agents (i.e. both polymerizable and non-polymerizable). Somewhat more preferably, the supplemental surface active agents are used in a concentration of about 0.01 to about 5.0 percent by weight, based on the total weight of surface active agents (i.e. both polymerizable and non-polymerizable).

Suitable supplemental nonionic surface active agents are generally disclosed in U.S. Pat. No. 3,929,678, Laughlin et al., issued Dec. 30, 1975, at column, 13 line 14 through column 16, line 6, incorporated herein by reference. Generally, the supplemental nonionic surface active agent is selected from the group comprising polyoxyethylenated alkylphenols, polyoxyethyleneated straight chain alcohols, polyoxyethyleneated branched chain alcohols, polyoxyethyleneated polyoxypropylene glycols, polyoxyethyleneated mercaptans, fatty acid esters, glyceryl fatty acid esters, polyglyceryl fatty acid esters, propylene glycol esters, sorbitol esters, polyoxyethyleneated sorbitol esters, polyoxyethylene glycol esters, polyoxyethyleneated fatty acid esters, primary alkanolamides, ethoxylated primary alkanolamides, secondary alkanolamides, ethoxylated secondary alkanolamides, tertiary acetylenic glycols, polyoxyethyleneated silicones, N-alkylpyrrolidones, alkylpolyglycosides, alkylpolylsaccharides, EO-PO block polymers, polyhydroxy fatty acid amides, amine oxides and mixtures thereof. Further, exemplary, non-limiting classes of useful supplemental nonionic surface active agents are listed below:

1. The polyethylene, polypropylene, and polybutylene oxide condensates of alkyl phenols. In general, the polyethylene oxide condensates are preferred. These compounds include the condensation products of alkyl phenols having an alkyl group containing from about 6 to 12 carbon atoms in either a straight or branched chain configuration with the alkylene oxide. In a preferred embodiment, the ethylene oxide is present in an amount equal to from about 1 to about 25 moles of ethylene oxide per mole of alkyl phenol. Commercially available nonionic surfactants of this type include Igepal® CO-630, marketed by Stepan Company, Canada; and Triton® X45, X-114, X-100 and X-102, all marketed by the Union Carbide Company.

2. The condensation products of aliphatic alcohols with from about 1 to about 25 moles of ethylene oxide. The alkyl chain of the aliphatic alcohol can either be straight or branched, primary or secondary, and generally contain from about 8 to about 22 carbon atoms. Particularly preferred are the condensation products of alcohols having an alkyl group containing from about 6 to about 11 carbon atoms with from about 2 to about 10 moles of ethylene oxide per mole of alcohol. Examples of commercially available nonionic surfactants of this type include Tergitol® 15-S-9 (the condensation products of $C_{11}$–$C_{15}$ linear alcohol with 9 moles of ethylene oxide), Tergitol® 24-L-6 NMW (the condensation products of $C_{12}$–$C_{14}$ primary alcohol with 6 moles of ethylene oxide with a narrow molecular weight distribution), both marketed by Union Carbide Corporation; Neodol® 91–8 (the condensation product of $C_9$–$C_{11}$ linear alcohol with 8 moles of ethylene oxide), Neodol® 23–6.5 (the condensation product of $C_{12}$–$C_{13}$ linear alcohol with 6.5 moles of ethylene oxide), Neodol® 45–7 (the condensation product of $C_{14}$–$C_{15}$ linear alcohol with 7 moles of ethylene oxide), Neodol® 91–6 (the condensation product of $C_9$–$C_{11}$, linear alcohol with 6 moles of ethylene oxide), marketed by Shell Chemical Company, and Kyro® EOB (the condensation product of $C_{13}$–$C_{15}$ linear alcohol with 9 moles of ethylene oxide), marketed by the Procter and Gamble Company.

3. The condensation products of ethylene oxide with a hydrophobic base formed by the condensation of propylene oxide with propylene glycol. The hydrophobic portion of these compounds preferably has a molecular weight of from about 1500 to about 1880 and exhibits water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include certain of the commercially available Pluronic® surfactants, marketed by BASF.

4. The condensation products of ethylene oxide with the product resulting from the reaction of propylene oxide and ethylenediamine. The hydrophobic moiety of these products consists of the reaction product of ethylenediamine and excess propylene oxide, and generally has a molecular weight of from about 2500 to about 3000. This hydrophobic moiety is condensed with ethylene oxide to the extent that the condensation product contains from about 40% to about 80% by weight of polyoxyethylene and has a molecular weight of from about 5,000 to about 11,000. Examples of this type of nonionic surfactant include certain of the commercially available Tetronic® compounds, marketed by BASF.

5. Semi-polar nonionic surfactants are a special category of supplemental nonionic surface active agents which include water-soluble amine oxides containing on alkyl moiety of from about 10 to about 18 carbon atoms and 2 moieties selected from the group comprising alkyl groups and hydroxyalkyl groups containing from about 1 to about 3 carbon atoms; and water-soluble sulfoxides containing alkyl moieties of from about 10 to about 18 carbon atoms and a moiety selected from the group comprising alkyl groups and hydroxyalkyl groups of from about 1 to about 3 carbon atoms.

6. Alkylpolysaccharides disclosed in U.S. Pat. No. 4,565,647, Lenado, issued Jan. 21, 1986, incorporated herein by reference, having a hydrophobic group containing from about 6 to about 30 carbon atoms, preferably from about 10 to about 16 carbon atoms and a polysaccharide, e.g., a polyglucoside, hydrophilic group containing from about 1.3 to about 10, preferably from about 1.3 to about 3, most preferably from about 1.3 to about 2.7 saccharide units. Any reducing saccharide containing 5 or 6 carbon atoms can be used, e.g., glucose, galactose and galactosyl moieties can be substituted for the glucosyl moieties. (Optionally, the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

7. An ethyl ester ethoxylate and/or alkoxylate such as those described in U.S. Pat. No. 5,220,046, incorporated herein by reference. These material may be prepared according to the procedure set forth in Japanese Kokai patent application No. HEI 5 [1993]-222396. For example, they may be prepared by a one-step condensation reaction between an alkyl ester and an alkylene oxide in the present of a catalytic amount of magnesium together with another ion selected from the group of $Al^{+3}$, $Ga^{+3}$, $In^{+3}$, $Co^{+3}$, $Sc^{+3}$, $La^{+3}$ and $Mn^{+3}$. Optionally, and less desirably, there can be a polyalkyleneoxide chain joining the hydrophobic moiety and the polysaccharide moiety. The preferred alkyleneoxide is ethylene oxide. Typical hydrophobic groups include alkyl groups, either saturated or unsaturated, branched or unbranched, containing from about 8 to about 18, preferably from about 12 to about 14 carbon atoms. Using the convention of U.S. Pat. No. 5,220,046, n is 2 or 3, preferably 2; t is from about 0 to about 10, preferably 0; and x is from about 1.3 to about 10, preferably from about 1.3 to 3, most preferably from about 1.3 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glucosyl units can then be attached between their 1-position and the preceding glycosyl units 2-, 3-, 4-, and/or 6-position, preferably predominately the 2-position.

Examples of suitable supplemental amphoteric surface active agents are selected from the group comprising alkyl glycinates, propionates, imidazolines, amphoalkylsulfonates sold as "Miranol"® by Rhone Poulenc, N-alkylaminopropionic acids, N-alkyliminodipropionic acids, imidazoline carboxylates, N-alkylbetaines, amido propyl betaines, sarcosinates, cocoamphocarboxyglycinates, amine oxides, sulfobetaines, sultaines and mixtures thereof.

Additional suitable amphoteric surfactants include cocoamphoglycinate, cocoamphocarboxyglycinate, lauramphocarboxyglycinate, cocoamphopropionate, lauramphopropionate, stearamphoglycinate, cocoamphocarboxy-propionate, tallowamphopropionate, tallowamphoglycinate, oleoamphoglycinate, caproamphoglycinate, caprylamphopropionate, caprylamphocarboxyglycinate, cocoyl imidazoline, lauryl imidazoline, stearyl imidazoline, behenyl imidazoline, behenylhydroxyethyl imidazoline, caprylamphopropylsulfonate, cocamphopropylsulfonate, stearamphopropyl-sulfonate, oleoamphopropylsulfonate and the like.

Examples of supplemental amine oxide surface active agents which are generally suitable for use in the present invention are alkylamine and amidoamine oxides. Examples of supplemental betaine and sultaine surface active agents which are suitable for use in the present invention are alkyl betaines and sultaines sold as "Mirataine" ® by Rhone Poulenc, "Lonzaine"® by Lonza, Inc., Fairlawn, N.J. Examples of supplemental betaines and sultaines are cocobetaine, cocoamidoethyl betaine, cocoamidopropyl betaine, lauryl betaine, lauramidopropyl betaine, palmamidopropyl betaine, stearamidopropyl betaine, stearyl betaine, coco-sultaine, lauryl sultaine, tallowamidopropyl hydroxysultaine and the like.

Examples of supplemental cationic surface active agents useful in the present invention are fatty amine salts, fatty diamine salts, polyamine salts, quaternary ammonium compounds, polyoxyethyleneated fatty amines, quaternized polyoxyethyleneated fatty amines, amine oxides and mixtures thereof.

Examples of suitable supplemental cationic surface active agents are disclosed in the following documents, all incorporated by reference herein: M. C. Publishing Co., *McCutcheon's Detergents & Emulsifiers*, (North American Ed., 1993); Schwartz et al., *Surface Active Agents, Their Chemistry and Technology*, New York; Interscience Publisher, 1949; U.S. Pat. No. 3,155,591, Hilfer, issued Nov. 3, 1964; U.S. Pat. No. 3,929,678, Laughlin et al., issued Dec. 30, 1975; U.S. Pat. No. 3,959,461, Bailey et al., issued May 25, 1976; and U.S. Pat. No. 4,387,090, Bolich, Jr., issued Jun. 7, 1983.

Examples of supplemental cationic surface active agents in the form of quaternary ammonium salts include dialkyldiethyl ammonium chlorides and trialkyl methyl ammonium chlorides, wherein the alkyl groups have from about 12 to about 22 carbon atoms and are derived from long-chain fatty acids, such as hydrogenated tallow fatty acid (tallow fatty acids yield quaternary compounds wherein $R_1$ and $R_2$ have predominately from about 16 to about 18 carbon atoms). Examples of supplemental quaternary ammonium salts useful herein include ditallowdimethyl ammonium chloride, ditallowdimethyl ammonium methyl sulfate, dihexadecyl dimethyl ammonium chloride, di-(hydrogenated tallow) dimethyl ammonium chloride, dioctadecyl dimethyl ammonium chloride, dieicosyl dimethyl ammonium chloride, didocosyl dimethyl ammonium chloride, di-(hydrogenated tallow) dimethyl ammonium acetate, dihexadecyl dimethyl ammonium chloride, dihexadecyl dimethyol ammonium acetate, ditallow dipropyl ammonium phosphate, ditallow dimethyl ammonium nitrate, di-(coconutalkyl) dimethyl ammonium chloride, and stearyl dimethyl benzyl ammonium chloride.

Salts of primary, secondary and tertiary fatty amines are also suitable supplemental cationic surface active agents. The alkyl groups of such supplemental amines preferably have from about 12 to about 22 carbon atoms, and may be substituted or unsubstituted. Such amines, useful herein, include stearamido propyl dimethyl amine, diethyl amino ethyl stearamide, dimethyl stearamine, dimethyl soyamine, soyamine, myristyl amine, tridecyl amine, ethyl stearylamine, N-tallowpropane diamine, ethoxylated (5 moles E.O.) stearylamine, dihydroxy ethyl stearylamine, and arachidylbehenylamine. Suitable supplemental amine salts include the halogen, acetate, phosphate, nitrate, citrate, lactate and alkyl sulfate salts. Such supplemental salts include stearylamine hydrogen chloride, soyamine chloride, stearylamine formate, N-tallowpropane diamine dichloride and stearamidopropyl dimethylamine citrate. Supplemental cationic amine surfactants included among those useful in the present invention are also disclosed in U.S. Pat. No. 4,275,055, Nachtigal, et al., issued Jun. 23, 1981, incorporated herein by reference.

Supplemental cationic surface active agents which are especially useful are quaternary ammonium or amino compounds having at least one N-radical containing one or more nonionic hydrophilic moieties selected from the group comprising alkoxy, polyoxyalkylene, alkylamido, hydroxyalkyl, and alkylester moieties, and combinations thereof. The compounds contain at least one hydrophilic moiety within 4, preferably within 3, carbon atoms (inclusive) of the quaternary nitrogen or cationic amino nitrogen. Additionally, carbon atoms that are part of a hydrophilic moiety, e.g., carbon atoms in a hydrophilic polyoxyalkylene (e.g., —$CH_2$—$CH_2$—O—), that are adjacent to other hydrophilic moieties are not counted when determining the number of hydrophilic moieties within 4, or preferably 3, carbon atoms of the cationic nitrogen. In general, the alkyl portion of any hydrophilic moiety is preferably a $C_1$–$C_3$ alkyl. Suitable hydrophile-containing radicals include, for example, ethoxy, propoxy, polyoxyethylene, polyoxypropylene, ethylamido, propylamido, hydroxymethyl, hydroxyethyl, hydroxypropyl, methyl ester, ethyl ester, propyl ester, or mixtures thereof, as nonionic hydrophile moieties.

Among the supplemental cationic surface active agents useful herein are those of the general formula:

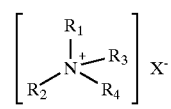

wherein $R_1$, $R_2$, $R_3$, and $R_4$ comprise, independently, substituted or unsubstituted substantially saturated hydrocarbyl chains of from about 1 to about 30 carbon atoms, or a hydrocarbyl having from about 1 to about 30 carbon atoms and containing one or more aromatic, ether, ester, amido, or amino moieties present as substituents or as linkages in the radical chain, wherein at least on of the $R_1$–R4 groups contains one or more hydrophilic moieties selected from the group comprising alkoxy (preferably $C_1$–$C_3$ alkoxy), polyoxyalkylene (preferably $C_1$–$C_3$ polyoxyalkylene), alkylamido, hydroxyalkyl, alkylester and combination thereof. Preferably, the cationic conditioning surfactant contains from about 2 to about 10 nonionic hydrophile moieties located within the about stated ranges. For purposes herein, each hydrophilic amido, alkoxy, hydroxyalkyl, alkylester, alkylamido or other unit is considered to be a distinct nonionic hydrophile moiety. X⁻ is a substantially saturated soluble salt forming anion preferably selected from the group comprising halogens (especially chlorine), acetate, phosphate, nitrate, sulfonate, and alkyl sulfate radicals.

Preferred supplemental cationic surface active agents include polyoxyethylene (2) stearyl methyl ammonium chloride, methyl bis-(hydrogenated tallowamidoethyl) 2-hydroxyethyl ammonium methyl sulfate, polyoxypropylene (9) diethyl methyl ammonium chloride, tripolyoxyethylene (total PEG-10) stearyl ammonium phosphate, bis-(N-hydroxyethyl-2-oleyl imidazolinium chloride) polyethylene glycol (1), and isododecylbenzyl triethanolammonium chloride.

Other supplemental ammonium quaternary and amino surface active agents include those of the above general formula in the form of ring structures formed by covalently linking two of the radicals. Examples include imidazolines, imidazoliniums, and pyridiniums, etc., wherein said compound has at least one nonionic hydrophile-containing radical as set forth above. Specific examples include 2-heptadecyl-4,5-dihydro-1H-imidazol-1-ethanol, 4,5-dihydro-1-(2-hydroxyethyl)-2-isoheptadecyl-1-phenylmethylimidazolium chloride, and 1-[2-oxo-2-[[2-[(1-oxoctadecyl)oxy]ethyl]amino]ethyl] pyridinium chloride.

Salts of primary, secondary and tertiary fatty amines are also preferred supplemental cationic surfactant materials. The alkyl groups of such amines preferably have from about 1 to about 30 carbon atoms and must contain at least one, preferably about 2 to about 10, nonionic hydrophilic moieties selected from the group comprising alkoxy, polyoxyalkylene, alkylamido, hydroxyalkyl, and alkylester groups, and mixtures thereof.

The supplemental anionic surface active agents suitable for use in the present invention are generally the sodium, potassium, calcium, ammonium or alkanolamine salts of any substantially saturated sulfonic acid, carboxylic acid, or phosphoric acid, or a mixture thereof. More specifically, supplemental anionic surface active agents suitable for use in the present invention are generally the sodium, potassium, calcium, ammonium or alkanolamine salts of saturated sulfonic acids, sulfinic acids, sulfenic acids, sulfonic acid esters, carboxylic acids, phosphonic acids, phosphinic, phosphenic acids, polysulfonic acids, sulfonic acids of oils, paraffin sulfonic acids, lignin sulfonic acids, petroleum sulfonic acids, tall oil acids, olefin sulfonic acids, hydroxyolefin sulfonic acids, polyolefin sulfonic acids, polyhydroxy polyolefin sulfonic acids, carboxylic acids, perfluorinated carboxylic acids, carboxylic acid sulfonates, alkoxylated carboxylic acid sulfonic acids, polycarboxylic acids, polycarboxylic acid polysulfonic acids, alkoxylated polycarboxylic acid polysulfonic acids, phosphoric acids, alkoxylated phosphoric acids, polyphosphoric acids, and alkoxylated polyphosphoric acids, fluorinated phosphoric acids, phosphoric acid esters of oils, phosphinic acids, alkylphosphinic acids, aminophosphinic acids, polyphosphinic acids, vinyl phosphinic acids, phosphonic acids, polyphosphonic acids, phosphonic acid alkyl esters, α-phosphono fatty acids, oragnoamine polymethylphosphonic acids, organoamino dialkylene phosphonic acids, alkanolamine phosphonic acids, trialkyledine phosphonic acids, acylamidomethane phosphonic acids, alkyliminodimethylene diphosphonic acids, polymethylene-bis (nitrilodimethylene)tetraphosphonic acids, alkyl bis (phosphonoalkylidene) amine oxide acids, esters of substituted aminomethylphosphonic acids, phosphonamidic acids, acylated amino acids (e.g., amino acids reacted with alkyl acyl chlorides, alkyl esters or carboxylic acids to produce N-acylamino acids), N-alkyl acylamino acids, and acylated protein hydrolysates, and mixtures thereof.

Other supplemental anionic surface active agents suitable for use in the present invention are the sodium, potassium, calcium, ammonium or alkanolamine salts of saturated linear or branched alkylbenzene sulfonic acids, alkyl sulfuric acid esters, alkoxylated alkyl sulfuric acid esters, α-sulfonated alkyl ester acids, α-sulfonated ester diacids, alkoxylated α-sulfonated alkyl ester acids, α-sulfonated dialkyl diester acids, di-α-sulfonated dialkyl diester acids, α-sulfonated alkyl acetate acids, primary and secondary alkyl sulfonic acids, perfluorinated alkyl sulfonic acids, sulfosuccinic mono- and diester acids, polysulfosuccinic polyester acids, sulfoitaconic diester acids, sulfosuccinamic acids, sulfosuccinic amide acids, sulfosuccinic imide acids, phthalic acids, sulfophthalic acids, sulfoisophthalic acids, phthalamic acids, sulfophthalamic acids, alkyl ketone sulfonic acids, hydroxyalkane-1-sulfonic acids, lactone sulfonic acids, sulfonic acid amides, sulfonic acid diamides, alkyl phenol sulfuric acid esters, alkoxylated alkyl phenol sulfuric acid esters, alkylated cycloalkyl sulfuric acid esters, alkoxylated alkylated cycloalkyl sulfuric acid esters, dendritic polysulfonic acids, dendritic polycarboxylic acids, dendritic polyphosphoric acids, sarcosinic acids, isethionic acids, and tauric acids, and mixtures thereof.

Additionally in accordance with the present invention, supplemental anionic surface active agents suitable for use in the present invention are generally the sodium, potassium, calcium, ammonium or alkanolamine salts of saturated fluorinated carboxylic acids, fluorinated sulfonic acids, fluorinated sulfate acids, fluorinated phosphonic and phosphinic acids, and mixtures thereof.

In a preferred embodiment of the present invention, the polymerization process is conducted in the absence of any non-polymerizable, supplemental surfactant, as the polymerizable surface active agents of the present invention display excellent capacity for producing emulsion stability characteristics in an emulsion polymerization.

In another embodiment of the present invention, the polymerizable surface active agents of the present invention may be used as co-monomers with the ethylenically unsaturated monomer(s) to modify the physical properties of the resulting polymer. In this embodiment, supplemental surface active agents also may be used as additives to the polymerization, e.g., in amounts of from about 3 to 6 weight percent, based on the total weight of monomer. Although somewhat less preferred, in a further embodiment of the present invention, any conventional organic solvent, which may be a solvent for both the monomer(s) and/or polymer, or just the monomer(s) may be used.

Initiators and Additives

Organic or inorganic initiators may be used to initiate the polymerization reaction. A sufficient quantity of a polymerization initiator (such as a conventional free radical initiator) is typically introduced into the polymerization medium to cause polymerization of the monomer(s) at the particular temperatures employed. Initiators used in polymerization processes may be of the type which produce free radicals and conveniently are peroxygen compounds, for example: inorganic peroxides such as hydrogen peroxide and inorganic persulfate compounds such as ammonium persulfate, sodium persulfate and potassium persulfate; organic hydroperoxides such as cumene hydroperoxide and tertiary butyl hydroperoxide; organic peroxides such as benzoyl peroxide, acetyl peroxide, lauroyl peroxide, peroxydicarbonate esters such as diisopropyl peroxydicarbonate, peracetic acid and perbenzoic acid, sometimes activated by water-soluble reducing agents such as ferrous compounds, sodium bisulfite or hydroxylamine hydrochloride, and other free radical producing materials such as 2,2'-azobisisobutyronitrile.

A further additive which may be added to the mixture contents is a conventional chain transfer agent, such as an alkyl polyhalide or mercaptan. Examples of suitable chain transfer agents include bromoform, carbon tetrachloride, carbontetrabromide, bromoethane, $C_1$–$C_{12}$ alkyl mercaptans, e.g., dodecylmercaptan, thiophenol, and hydroxyalkyl mercaptans, e.g., mercaptoethanol.

CASE MATERIALS-GENERAL DESCRIPTIONS AND COMPONENTS

Coatings and Paints

Paints are typically liquids which are useful for application to a substrate, such as wood, metal, plastic, glass, ceramics, fiberglass, composite materials, cardboard, corrugated board, paper, textiles, non-woven materials, foam, tape or a combination thereof, in a thin layer. Paints are typically used to protect the surface of the substrate from elemental damage and/or physical damage. Paints are also commonly used for decoration and aesthetic purposes. Paints find very broad commercial use and also find a variety of uses in the home. Paints, their formulations, ingredients, additives and processing conditions are generally those described in Kirk-Othmer-Paint; pg. 1049–1069, Vol. 17; 1996, by Arthur A. Leman, the disclosure of which is incorporated herein in its entirety.

Typically, paints are described as latex, alkyd, or oil-based paints. Additionally, a wide variety of paints are water-based. These designations identify the binder used in the manufacture of the paint and the solvent, if any, which is used. Typical classes of latex paints include gloss, semi-gloss, flat, and satin. These terms describe the shininess of the paint surface after the paint has dried on the substrate. Paints typically contain binders/resins such as latex emulsions. A common latex emulsion employed in paints is based on acrylic and vinyl acetate. Paints often include pigments (organic and inorganic), inorganic extenders, filler pigments, solvents, and additives, such as thickeners, biocides, driers, pigment dispersants, pigment extenders, adhesion promoters, surfactants, and defoamers. When paints are manufactured, surface active agents are used to stabilize the emulsion polymerization and to regulate the resulting polymer particle size.

The aforementioned monomers may be utilized to prepare latexes useful in coatings and paints of the instant invention. Typically the monomers are selected to give an acrylic latex emulsion, for durable exterior paint. These monomers are preferably methyl methacrylate, butyl acrylate, and 2-ethylhexyl acrylate, and mixtures thereof Non-acrylic based monomers are typically used for interior paints, except in the cases of gloss and semi-gloss paints. Among other monomers, vinyl acetate, butyl acrylate, and mixtures thereof, are commonly used in a variety of paint formulations.

Alkyd resins are produced by reaction of a polybasic acid, such as phthalic or maleic anhydride, with a polyhydric alcohol, such as glycerol, pentaerythitol, or glycol, in the presence of an oil or fatty acid. Alkyd resins are described as long-oil, medium-oil, and short-oil alkyds. Such description is based on the amount of oils and/or fatty acids in the resins. Long-oil alkyds generally have an oil content of 60% or more; short-oil alkyds, less than 45%; and medium-oil alkyds have an oil content in between the two. The short- and medium-oil alkyds are based on semidrying and non-drying oils, whereas long-oil alkyds are based on semidrying and drying oils.

Typical pigment extenders used in paints include, for example, titanium dioxide, calcium carbonate, talc, clay, silica, zinc oxide, feldspar, corrosion resistance extenders, mildew resistance extenders, and film-hardening extenders, and mixtures thereof. Solvents typically used in paints included, for example, mineral spirits, glycol ethers (e.g. ethylene glycol and propylene glycol) and the like. In addition to binders, solvents, pigments, and extenders, many paints contain additives. Additives include, for example, thickeners, pigment dispersants, surfactants, defoamers, biocides, mildewcides, preservatives, driers, defoamers, antiskinning agents and pH adjusting agents and mixtures thereof (e.g. acids and bases). Additional additives include hydroxyethylcellulose, hydrophobically modified alkali-soluble emulsions, and hydrophobically modified ethylene oxide urethanes.

Methods and compositions or components suitable for preparing and evaluating paints are disclosed in U.S. Pat. Nos. 5,399,617, 4,075,411, and 5,344,867, the disclosure of each of which is incorporated herein in its entirety.

Adhesives and Sealants

Sealants have been generally described in Kirk-Othmer-Sealants; pg. 650–666; Vol. 21; 1997, by Richard Palmer and Jerome Kloswski, the disclosure of which is incorporated herein in its entirety. A sealant is a material that is installed into a gap or joint to prevent water, wind, dirt, or other contaminants from passing through the joint or gap. Sealants, which can also be defined by how they are tested, are rated by their ability to stretch, twist, bend, and be compressed while maintaining their bulk properties so they do not tear apart under stress. The adhesion required of a sealant is simply the strength to hold the sealant in position as it is stressed and strained. Adhesives are used to transfer loads and are typically designed with much higher tensile and shear strengths than sealants. The most important rating of an adhesive in many applications is the determination of how much load it can handle. Some sealants are used as adhesives and some adhesives as sealants and thus arises the occasional blurring of their roles. If the material's primary function is the exclusion of wind, water, dirt, etc., it is a sealant.

Sealants include high performance sealants, such as for example, silicones, urethanes, and polysulfides, medium performance sealants, such as for example, acrylic sealants, and low performance sealants, such as for example, butyls, putties, and caulks. The measure of the stress of a sealant at a specific strain is referred to as the modulus of elasticity, sometimes called the secant modulus. This important sealant property describes the force exerted by a sealant as it is stressed. Because a primary function of sealants is to adhere to the substrates it is in contact with, the force generated by a joint opening or closing are transmitted by the sealant to the substrate-sealant bond line. A primary factor in sealant durability is its ability to resist decay from environmental elements. For most typical applications this includes extremes of high and low temperature, water, oxidation, and sunlight. Other factors include weatherability and adhesion life. One of the more destructive elements is exposure to sunlight, and specifically to ultraviolet (UV) light. All sealants are affected by weathering but there is much difference in the effect of weathering on different sealants. A second key factor in determining the durability of a sealant is the ability of the sealant to adhere to the substrate through its lifetime. A sealant may have excellent resistance to UV effects, but if it has poor adhesion performance and fails adhesively, it is of little use.

Commercially available silicone sealants are typically one of three curing types: moisture-reactive (curing) sealants, moisture-releasing (latex) sealants, and addition-curing sealants. The formulation of moisture-curing silicones includes a silicone polymer, filler, a moisture-reactive cross linker, and sometimes a catalyst. A newer class of silicone sealants are known as the silicone latex sealants. These sealants are silicone-in-water emulsions that cure by evaporation of the emulsifying water. The silicone latex polymer is prepared by first emulsifying a low molecular weight silicone polymer in water and then polymerizing it to the desired molecular weight. Inherent to emulsion polymerization is the ability to produce high molecular weight polymers at a low emulsion viscosity. Next, a silicone cross-linker is added with a condensation catalyst. The cross-linker, the structure of which is similar to those described previously, must diffuse through the water phase and into the siloxane phase where it can react with the silicone polymer. Addition-curing silicones in general are two-part systems that cure by the platinum-catalyzed reaction of a silicon hydride with typically a vinyl group attached to silicon. The basis for urethane chemistry is the reaction of an isocyanate group with a component containing an active hydrogen. The first step in formulating a urethane sealant is to prepare what is commonly called the prepolymer, typically by reaction of a hydroxy-terminated polyether with a stoichiometric amount of diisocyanate. Polysulfide sealants were the first high performance synthetic elastomeric sealants produced in the United States. The basic polymers are mercaptan-terminated (HS—R—SH), with molecular weights ranging from 1000 to ca 8000.

There are two principal classes of acrylic sealants: latex acrylics and solvent-release acrylics. High molecular weight latex acrylic polymers are prepared by emulsion polymerization of alkyl esters of acrylic acid. Monomer, water, surfactants, and an initiator are mixed and polymerized until the acrylic monomer is depleted. Two types of monomers are used to vary polymer properties. High $T_g$ monomers such as methyl methacrylate and vinyl chloride improve durability and hydrophobicity, whereas polar-functional monomers such as hydroxyethyl acrylate are used to improve adhesion. The maximum level of solids for the latex polymer is approximately 60%. In typical formulations, above this level the viscosity increases rapidly and the emulsion stability is poor. In relatively low solids (high water) content formulations, rather severe shrinkage occurs during cure. This can introduce stress and may be one of the reasons most latex acrylics are of lower performance and lower movement ability. The surfactants used are of special concern to sealant formulation because they can interfere with adhesion if improperly used. One approach to solve this problem is in corporate the surfactant into the polymer backbone during polymerization. This approach, which places the surfactant in an ideal location to stabilize the emulsion, does not allow the surfactant to migrate through the aqueous phase and interfere with adhesion because the surfactant is connected to the backbone. The emulsion polymers are compounded into sealants by adding fillers, plasticizers, freeze-thaw stabilizers, thickeners, and adhesion promoters. As is true of the silicone sealants, the acrylic sealants are easy to apply and clean with water.

Another class of acrylic sealants are the solvent-releasing acrylics. Acrylic monomers are polymerized in a solvent. The molecular weight of the polymer is lower than in the latex acrylics because of the inherently higher viscosity of the medium. However, the percentage of solids is approximately 80% vs. the 60% solids common to latex acrylics. The natural adhesion of most of the solvent-releasing acrylics produces some of the best unprimed adhesion in the sealant industry. However, slow, continual cure generally produces large compression sets and limits their use to low movement application. Also, the relatively high amounts of solvent and traces of acrylic monomer in these functions limits their use to outdoor applications, usually in construction.

A typical one-part pigmented siliconized acrylic latex sealant will contain acrylic latex polymer (polymer and water), and optional ingredients selected from calcium carbonate, plasticizers, mineral spirits, propylene glycol, titanium dioxide, ammonium hydroxide, preservatives, surfactants, inorganic dispersants, organic dispersants, defoamers, associative thickener, and silane adhesion promoters, and mixtures thereof.

A typical one-part clear acrylic latex sealant formulation will contain acrylic latex polymer (polymer and water), and optional ingredients selected from plasticizers, fumed silica, surfactants, amino silanes, ammonium hydroxides, and mixtures thereof. Almost all sealants comprise a mixture of a powdered filler incorporated into a viscous liquid, which results in a viscous sealant having a paste-like consistency.

Adhesives have been generally described in Kirk-Othmer-Adhesives; pg. 445–466; Vol. 1; 1991, by Aldophus Pocius, the disclsoure of which is incorporated herein in its entirety. An adhesive is a material capable of holding together solid materials by means of surface attachment. Adhesion is the physical attraction of the surface of one material for the surface of another. An adherend is the solid material to which the adhesive adheres and the adhesive bond or adhesive joint is the assembly made by joining adherends together by means of an adhesive. Practical adhesion is the physical strength of an adhesive bond. It primarily depends on the forces of the adhesive and the adherend, as well as the engineering of the adhesive bond. The interphase is the volume of materials in which the properties of one substance gradually change into the properties of another. The interphase is useful for describing the properties of an adhesive bond. The interface, contained within the interphase, is the plane of contact between the surface of one material and the surface of another. Except in certain special cases, the interface is imaginary. It is useful in describing surface energetics.

Adhesive properties are often tested using various peel tests. In the simplest peel test, the T-peel test, the adherends are identical in size, shape, and thickness. Adherends are attached at their ends to a tensile testing machine and then separated in a "T" fashion. The temperature of the test, as well as the rate of adherend separation, is specified. The force required to open the adhesive bond is measured and the results are reported in terms of Newtons per meter (pounds per inch, ppi). There are many other peel test configurations, each dependent upon the adhesive application. Such tests are well described in the ASTM literature.

A structural adhesive is a resin system, usually a thermoset, that is used to bond high strength materials in such a way that the bonded joint is able to bear a load in excess of 6.9 MPa (1,000 psi) at room temperature. Structural adhesives are the strongest form of adhesive and are meant to hold loads permanently. They exist in a number of forms. The most common form is the two-part adhesive, widely available as a consumer product. The next most familiar is that which is obtained as a room temperature curing liquid. Less common are primer-liquid adhesive combinations which cure at room temperature.

A pressure-sensitive adhesive, a material which adheres with no more than applied finger pressure, is aggressively and permanently tacky. It requires no activation other than the finger pressure, exerts a strong holding force, and should be removable from a smooth surface without leaving a residue. Pressure-sensitive adhesives are most widely used in the form of adhesive tapes. These tapes are used for an extraordinary number of applications: masking, medical application, electrical insulation, assembly, packaging, and other application. The application governs the choice of tape backing and the adhesive formulation. A transparent backing having relatively weak adhesive is used for paper mending; a filament filled backing having an aggressive adhesive is used for packaging applications. Pressure-sensitive adhesives are also obtainable in aerosol form for use in various graphics.

The general formula for a pressure-sensitive adhesive includes elastomeric polymer, a tackifying resin, any necessary fillers, various antioxidants and stabilizers, if needed, and cross-linking agents. In formulating a pressure-sensitive adhesive, a balance of three physical properties needs to be taken into account: shear strength, peel strength, and tack. The shear strength or shear holding power of the adhesive is typically measured by hanging a weight on the end of a piece of tape and measuring the time of failure. Tack is the technical term applied to quantify the sticky feel of the material. In general, the shear strength and the tack of a pressure-sensitive adhesive increase and then go through a maximum as a function of the amount of tackifying resin added. The peel strength usually increases with the amount of tackifying resin. The shear holding power often depends upon the mode of cross-linking. Thus, a balance of properties appropriate to the application is obtained by controlling the rubber-to-resin ratio as well as the level and type of cross-linking agent.

The most widely used emulsion-based adhesive is that based upon poly(vinyl acetate)-poly(vinyl alcohol) copolymers formed by free-radical polymerization in an emulsion system. Poly(vinyl alcohol) is typically formed by hydrolysis of the poly(vinyl acetate). The properties of the emulsion are derived from the polymer employed in the polymerization as well as from the system used to emulsify the polymer in water. The emulsion is stabilized by a combination of a surfactant plus a colloid protection system. The protective colloids are similar to those used in paint to stabilize latex. For poly(vinyl acetate), the protective colloids are isolated from natural gums and cellulosic resins (carboxymethylcellouse or hydroxyethylcellose). The hydrolyzed polymer may also be used. The physical properties of the poly(vinyl acetate) polymer can be modified by changing the co-monomer used in polymerization. Any material that is free-radically active and participates in an emulsion polymerization can be employed. Plasticizers, tackifiers, humectants, and other materials are often added to the adhesive to meet specifications for the intended application. Because the presence of foam in the bond line could decrease performance of the adhesion joint, agents that control the amount of air entrapped in an adhesive bond must be added. Biocides are also necessary: many of the materials that are used to stabilize poly(vinyl acetate) emulsions are natural products. Poly(vinyl acetate) adhesives known as "white glue" or "carpenter's glue" are available under a variety of trade names. Applications are found mostly in the area of adhesion to paper and wood.

Methods and compositions or components suitable for preparing and evaluating adhesives are disclosed in U.S. Pat. Nos. 5,679,732, and 5,536,811 and European Patent Application 770,655 A2, the disclosure of each of which is incorporated herein in its entirety.

Methods and compositions or components suitable for preparing and evaluating sealants such as caulks are disclosed in U.S. Pat. Nos. 5,124,384 and 5,296,627 and published International Application WO 89/12618, the disclosure of each of which is incorporated herein in its entirety.

Elastomers

Elastomers have been generally described in Kirk-Othmer-Elastomers; pg. 905–1079; Vol. 8; 1993; and Kirk-Othmer-Elastomers; pg. 1–31; Vol. 9; 1994, by various authors, the disclosure of each of which is incorporated herein in its entirety. The term elastomer is the modern word to describe a material that exhibits rubbery properties, i.e., that can recover most of its original dimensions after extension or compression. One key class of elastomers is rubber materials. Rubber materials, e.g., natural, SBR, or polybutadiene, being unsaturated hydrocarbons, are subjected to sulfur vulcanization, and this process requires certain ingredients in the rubber compound, besides the sulfur, e.g., accelerator, zinc oxide, and stearic acid. Accelerators are catalysts that accelerate the cross-linking reaction so that reaction time drops from many hours to perhaps 20–30 min. at about 130° C. In addition to the ingredients that play a role in the actual vulcanization process, there are other components that make up a typical rubber compound.

Softeners and extenders, generally inexpensive petroleum oils, help in the mastication and mixing of the compound. Antioxidants are necessary because the unsaturated rubbers can degrade rapidly unless protected from atmospheric oxygen. They are generally organic compounds of the amine or phenol type. Reinforcing fillers, e.g. carbon black or silica, can help enormously in strengthening the rubber against rupture or abrasion. Nonreinforcing fillers, e.g., clay or chalk, are used only as extenders and stiffeners to reduce cost.

For Styrene-Butadiene Rubber (SBR), the polymerization is carried out in an emulsion system where a mixture of the two monomers is mixed with a soap [or other surface active agent] solution containing the necessary catalysts (initiators). The final product is an emulsion of the copolymer, i.e., a fluid latex.

Inks

The invention also encompasses inks and methods and compositions for preparing inks. Methods and compositions or components methods suitable for preparing and evaluating inks are disclosed in U.S. Pat. Nos. 4,912,157, 5,039, 339, and published International Application WO 97/45495, the disclosure of each of which is incorporated herein in its entirety.

INVENTIVE CASE MATERIALS

The present invention embodies CASE materials which comprise polymer particles or a polymer latex (derived from the aforementioned polymers formed from the use of polymerizable surface active agents). These CASE materials may additionally contain standard ingredients, including those previously mentioned, as used by those of ordinary skill in the art to prepare such CASE materials. The CASE materials of the present invention may be formulated for the chosen end use. The CASE materials are prepared by conventional techniques that are known in the art. The CASE materials may be applied to various substrates by methods known in the art, such as for example, air-assisted spray, airless spray, brush, direct coat or transfer coat, roller, caulk-gun, and the like. Adhesives, sealants and elastomers may be applied by a wide variety of application devices typically used for such a purpose.

As mentioned, the CASE materials may contain optional ingredients, such as for example, silane adhesion promoters and fumed silica Sealants and/or adhesives may be in various forms, including for example, clear, transparent, translucent or opaque caulks. Typical formulations are found in U.S. Pat. No. 4,626,567, which discloses an acrylic copolymer latex sealant composition containing an acrylic copolymer. Sealants and adhesives may also include, if desired, plasticizers, freeze-thaw stabilizers, colorants or pigments, pigment dispersants, anti-bacterial and/or anti-fungal materials, biocides, mildewcides, preservatives, mineral oils, pH adjusting agents (mineral and organic acids/bases), solvents (e.g. ethylene glycol, propylene glycol), adhesion promoters, e.g., epoxysilanes, and agents for improving rheological properties such as thickeners and anti-slump agents. Plasticizers are generally used in an amount of up to about 25% by weight and the other additives, when present, will typically be present in a ratio of about 4:1 filler to latex. Plasticizers are often desirable to reduce the tack of the copolymer so that the sealant can have the desired tack-free time of less than 72 hours.

Typical polymer latex sealant compositions have a viscosity of 80,000–400,000 cps. The polymer latex can be an exclusively acrylic-based polymer latex, a vinyl acetate-ethylene (VAE) copolymer latex, or any of the polymer latexes typically used in the art for making sealant compositions, especially caulks.

The plasticizer used may be a diester of phthalic acid or an N-alkyl arylsulfonamide, or mixtures of the two. Suitable diesters of phthalic acid include $C_1$–$C_8$ alkyl arylphthalates such as butyl benzylphthalate, ethyl benzylphthalate, hexyl phenylphthalate, and ethylhexyl phenylphthalate. Suitable N-alkyl arylsulfonamides include N—($C_1$–$C_8$)alkyl arylsulfonamides such as N-n-butyl benzenesulfonamide, N-n-butyl toluenesulfonamide, N-ethyl benzenesulfonamide, and N-iso-butyl benzylsulfonamide.

Other optional ingredients include silane adhesion promoters, which can be any of those well known in the art, including gamma-mercaptopropyltrimethoxysilane, gamma-glycidoxypropyltrimethoxysilane, gamma-aminopropyltriethoxysilane and mixtures thereof. Suitable silanes also include the organo-amino silanes disclosed in U.S. Pat. No. 4,340,524.

As an optional filler, silica may be a hydrophilic fumed silica or it may be a hydrophobic fumed silica derivative in which some of the hydroxyl groups on the surface of the fumed silica have been replaced by trimethylsiloxyl groups. Such hydrophobic silicas are known as silica silylates and are commercially available. Suitable thickeners which may be used include poly(ox-1,2-ethanediyl)-alpha-hydro-omega-hydroxy polymer with oxy-1,2-ethanediyl-alpha-hydro-omega-hydroxy-nonyl-phenoxyglycidyl ether oligomers and 5-isocyanato-1-(iso-cyanatomethyl)-1,3,3-trimethylcyclohexane or hydroxyethyl cellulose or polyacrylic acid polymers and copolymers or a base such as sodium hydroxide to raise the pH if sufficient carboxylate is present in the system.

The sealants and adhesives may contain residual, un-polymerized, polymerizable surface active agent; additional polymerized or unpolymerized polymerizable surface active agent; or, less preferably, optional traditional anionic, nonionic or amphoteric surfactants, or mixtures thereof, may also be present in the finished sealant or adhesive. Suitable traditional surfactants include those mentioned herein. Fillers may be optionally employed in the present invention, such as any conventional inorganic filler, e.g. carbonates, oxides and sulphates. Suitable fillers include calcium carbonate, calcium oxide, magnesium carbonate, barium sulfate and the like. When present, the filler may be about 10 to about 30 wt %, based on total weight of the composition. The sealant composition may also include if desired a freeze-thaw stabilizer, a biocide, fillers and a tooling aide well known in the art. The sealant composition may be readily prepared using a conventional mixer, followed by deairing. Mixing and deairing procedures are well known in the art.

All documents, e.g., patents and journal articles, cited above or below are hereby incorporated by reference in their entirety. As used in the Examples appearing below, the following designations, symbols, terms and abbreviations have the indicated meanings:

| Material | Definition |
| --- | --- |
| Polystep ® A-13 | Linear dodecylbenzene sulfonic acid (commercially available from Stepan Company, Northfield Illinois) |
| Polystep ® A-16 | Branched dodecylbenzene sulfonic acid, sodium salt (commercially available from Stepan Company, Northfield Illinois) |
| Polystep ® A-17 | Branched dodecylbenzene sulfonic acid (commercially available from Stepan Company, Northfield Illinois) |
| Polystep ® B-330A | Ammonium laureth-3-sulfate (commercially available from Stepan Company, Northfield Illinois) |
| Polystep ® AU-7 | Allylammonium laureth-3-sulfate (commercially available from Stepan Company, Northfield Illinois) |
| Cedephos ® CP-610 | Nonyl Phenol 9-EO Phosphoric Acid Ester (commercially available from Stepan Company, Northfield Illinois) |

The amount of agglomerated polymers, or "coagulum", in the resulting lattices at the conclusion of the polymerization is determined by collecting the agglomerated polymers using a mesh screen that has openings sufficiently large enough to allow the discrete un-agglomerated polymers to pass, rinsing the collected agglomerated polymers with water, and weighting the remaining agglomerated polymers trapped on the screen. The percent coagulum is calculated by dividing the weight of the coagulum by the theoretical weight of the entire latex based upon the weights of the ingredients used for the polymerization reaction.

The viscosity of the resulting lattices following polymerization is determined by using a RV Brookfield synchrolechtric viscometer equipped with a No. 3 spindle. During such determinations 950 ml of each latex is placed in a 1000 ml beaker and the viscometer operated at 25° C. and 60 rpm.

The mechanical stability of the lattices following exposure to mechanical stress is evaluated to determine the extent to which there is a change in the viscosity and/or the visual presence of coagulum. More specifically, a cups of each latex is placed in a stainless steel Hamilton Beach blender, and the blender operated at medium speed until the latex coagulates. Failure of the latex is the point at which coagulum separation can be visually observed; a longer time of blending at medium speed without coagulum separation, i.e. a longer time before failure, is a highly desirable characteristic of a latex.

Solids of lattices were determined by concentrating the latex at 120° C. in an oven to remove all volitiles, and subsequently weighing the residue. The pH of each solution was measured using an Orion 210 pH meter. Particle size was measured using a Nicomp 370, [submicron analyzer, (up to 2 microns)].

The particle size of the resulting lattices is determined with a NICOMP 370C Auto-dilution particle size analyzer using standard methods and procedures for operation of such equipment and such data recorded for 50% volume in units of nanometers.

The water sensitivity, e.g. hydrophobicity, of the resulting lattices was determined by ASTM D724-45.

All $^1$H NMR spectra were recorded using a 270 MHz JEOL Delta NMR Fourier Transform Spectrometer. Chemical shifts (δ) are reported in parts per million (ppm) down field from tetramethylsilane (TMS) using internal TMS or residual non-deuterated solvent as a reference. NMR data for all samples was acquired by dissolving the solid sample in $CD_3OD$.

The allylamine and propyl amine may be obtained from Aldrich Chemical Company (USA).

In the following examples, all amounts are stated in percent by weight of active material unless indicated otherwise. One skilled in the art will recognize that modifications may be made in the present invention without deviating from the spirit or scope of the invention. The invention is illustrated further by the following examples, which are not to be construed as limiting the invention or scope of the specific procedures or compositions described herein.

Emulsion Polymerization and Latex Formation

EXAMPLE 1

A methylmethacrylate/butylacrylate/methacrylic acid (MMA/BA/MMA) co-polymer (in a weight ratio of about 48:49:3), in combination with the allylamine salt of dodecylbenzenesulfonic acid (ADDBS), is prepared as follows. About 254 g of deionized water and about 10.6 g of ADDBS (as a 22% active aqueous solution), are placed in a reactor suitable for emulsion polymerization, equipped with agitation means, heating means and cooling means. With agitation, the reactor is purged with nitrogen (99% pure), and heated to about 80–82° C. The temperature of the reactor contents is adjusted to about 77–79° C., and about 75 g of the monomer mixture (20% of a total of 374 g of the MMA/BA/MMA monomer mixture in the ratio above) is added to the reactor. After 10 minutes, 16.9 g of a solution of ammonium persulfate (20% of the total solution of 1.9 g of ammonium persulfate dissolved in 82.5 g of water) is added to the reactor over a period of about 7 minutes with continued agitation, during which time there is an exotherm of about 7–10° C. After the exotherm is complete, about 299 g of the monomer mixture (the remaining 80% MMA/BA/MMA monomer mixture), 64.5 g of the ammonium persulfate solution (the remaining 80%), and 15.55 g of ADDBS (as the 22% active aqueous solution) are simultaneously charged to the reactor over a period of 2 hours with continued agitation, while keeping the reactor contents at a temperature of about 78–81° C. The reactor temperature is then elevated to about 82–84° C. with continued agitation, for about 15 minutes. After this 15-minute period, the reactor is cooled to about 30° C. The resulting latex product is completely removed from the reactor and gravity filtered using a first 20-mesh screen and then a second 250-mesh screen. The total latex coagulum (i.e. solids) from both mesh screens is collected, combined and weighed. Various physiochemical properties of the latex are reported in Table II.

EXAMPLE 2 (COMPARATIVE EXAMPLE)

A methylmethacrylate/butylacrylate/methacrylic acid (MMA/BA/MMA) co-polymer (in a weight ratio of about 48:49:3), in combination with the propylamine salt of dodecylbenzenesulfonic acid (PDDBS), is prepared as follows. About 330 g of deionized water and about 25 g of PDDBS (as a 20% active aqueous solution) are placed in a reactor suitable for emulsion polymerization, equipped with agitation means, heating means and cooling means. With agitation, the reactor is purged with nitrogen (99% pure), and heated to about 80–82° C. The temperature of the reactor contents is adjusted to about 77–79° C., and about 75 g of the monomer mixture (20% of a total of 374 g of the MMA/BA/MMA monomer mixture in the ratio above) is added to the reactor. After 10 minutes, 15.5 g of a solution of ammonium persulfate (20% of the total solution of 1.9 g of ammonium persulfate dissolved in 75.6 g of water), is added to the reactor over a period of about 5 minutes with continued agitation, during which time there is an exotherm of about 3–5° C. After the exotherm is complete, about 299 g of the monomer mixture (the remaining 80%) and 62 g of the ammonium persulfate solution (the remaining 80%) are simultaneously charged tot he reactor over a period of 2 hours with continued agitation, while keeping the reactor contents at a temperature of about 78–82° C. The reactor temperature is then elevated to about 82–84° C. with continued agitation, for about 15 minutes. After this 15-minute period, the reactor is cooled to about 30° C. The resulting latex product is completely removed from the reactor and gravity filtered using a first 20-mesh screen and then a second 250-mesh screen. The total latex coagulum (i.e. solids) from both mesh screens is collected, combined and weighed. Various physiochemical properties of the latex are reported in Table II.

EXAMPLE 3

A methylmethacrylate/butylacrylate/methacrylic acid (MMA/BA/MMA) co-polymer (in a weight ratio of about 46.1:50.8:3.1) in combination with the allylamine salt of nonyl phenol 9-EO phosphate acid ester (Cedephos CP-610) is prepared as follows. About 249 g of deionized water and about 11.0 g of the allyl amine salt of Cedephos CP-610 (as a 20% active aqueous solution), are placed in a reactor suitable for emulsion polymerization, equipped with agitation means, heating means and cooling means. With agitation, the reactor is purged with nitrogen (99% pure), and heated to about 75 77° C. The temperature of the reactor contents is adjusted to about 71–74° C., and about 74 g of the monomer mixture (20% of a total of 371 g of the MMA/MMA monomer mixture in the ratio above) is added to the reactor. After 10 minutes, 15 g of a solution of ammonium persulfate (20% of the total solution of 1.9 g of ammonium persulfate dissolved in 74.0 g of water) is added to the reactor over a period of about 10 minutes with continued agitation, during which time there is an exotherm of about 5–8° C. After the exotherm is complete, about 299 g of the monomer mixture (the remaining 80% MMA/BA/MMA monomer mixture), 60.7 g of the ammonium persulfate solution (the remaining 80%), and 15.3 g of the allyl amine salt of Cedephos CP-610 (as a 20% active aqueous solution) are simultaneously charged to the reactor over a period of 2 hours with continued agitation, while keeping the reactor contents at a temperature of about 78–81° C. The reactor temperature is then elevated to about 82–84° C. with continued agitation, for about 15 minutes. After this 15-minute period, the reactor is cooled to about 30° C. The resulting latex product is completely removed from the reactor and gravity filtered using a first 20-mesh screen and then a second 250-mesh screen. The total latex coagulum (i.e. solids) from both mesh screens is collected, combined and weighed. Various physiochemical properties of the latex are reported in Table II.

EXAMPLE 4 (COMPARATIVE EXAMPLE )

A methylmethacrylate/butylacrylate/methacrylic acid (MMA/BA/MMA) co-polymer (in a weight ratio of about 46:51:3), in combination with the propylamine salt of nonyl phenol 9-EO phosphate acid ester (Cedephos CP-610) is prepared as follows. About 251 g of deionized water and about 10.2 g of propylamine salt of Cedephos CP-610 (as a 20% active aqueous solution), are placed in a reactor suitable for emulsion polymerization, equipped with agitation means, heating means and cooling means. With agitation, the reactor is purged with nitrogen (99% pure), and heated to about 75 77° C. The temperature of the reactor contents is adjusted to about 71–74° C., and about 75 g of the monomer mixture (20% of a total of 375 g of the MMA/BA/MMA monomer mixture in the ratio above) is added to the reactor. After 10 minutes, 15 g of a solution of ammonium persulfate (20% of the total solution of 1.9 g of ammonium persulfate dissolved in 75.0 g of water) is added to the reactor over a period of about 10 minutes with continued agitation, during which time there is an exotherm of about 8–10° C. After the exotherm is complete, about 300 g of the monomer mixture (the remaining 80% MMA/BA/MMA monomer mixture), 61.5 g of the ammonium persulfate solution (the remaining 80%), and 15.3 g of the propylamine salt of Cedephos CP-610 (as a 20% active aqueous solution) are simultaneously charged to the reactor over a period of 2 hours with continued agitation, while keeping the reactor contents at a temperature of about 78–80° C. The reactor temperature is then elevated to about 82–84° C. with continued agitation, for about 15 minutes. After this 15-minute period, the reactor is cooled to about 30° C. The resulting latex product is completely removed from the reactor and gravity filtered using a first 20-mesh screen and then a second 250-mesh screen. The total latex coagulum (i.e. solids) from both mesh screens is collected, combined and weighed. Various physiochemical properties of the latex are reported in Table II.

EXAMPLE 5

A methylmethacrylate/butylacrylate/methacrylic acid (MMA/BA/MMA) co-polymer (in a weight ratio of about (48:49:3), in combination with the allylamine salt of lauric acid (ALA) is prepared as follows. About 205 g of deionized water and about 1.6 g of ALA (as a 20% active aqueous solution), are placed in a reactor suitable for emulsion polymerization, equipped with agitation means, heating means and cooling means. With agitation, the reactor is purged with nitrogen (99% pure), and heated to about 70–73° C. The temperature of the reactor contents is adjusted to about 71–73° C., and about 75 g of the monomer mixture (20% of a total of 374 g of the MMA/BA/MMA monomer mixture in the ratio above) is added to the reactor. After 10 minutes, 15 g of a solution of ammonium persulfate (20% of the total solution of 1.8 g of ammonium persulfate dissolved in 75.0 g of water) is added to the reactor over a period of about 10 minutes with continued agitation, during which time there is an exotherm of about 2–3° C. After the exotherm is complete, about 299 g of the monomer mixture (the remaining 80% MMA/BA/MMA monomer mixture), 61.5 g of the ammonium persulfate solution (the remaining 80%), and 29.2 g of the ALA (as a 20% active aqueous solution) are simultaneously charged to the reactor over a period of 2 hours with continued agitation, while keeping the reactor contents at a temperature of about 78–81° C. The reactor temperature is then elevated to about 83–85° C. with continued agitation, for about 15 minutes. After this 15-minute period, the reactor is cooled to about 30° C. The resulting latex product is completely removed from the reactor and gravity filtered using a first 20-mesh screen and then a second 250-mesh screen. The total latex coagulum (i.e. solids) from both mesh screens is collected, combined and weighed. Various physiochemical properties of the latex are reported in Table II.

EXAMPLE 6 (COMPARATIVE EXAMPLE)

A methylmethacrylate/butylacrylate/methacrylic acid (MMA/BA/MMA) co-polymer (in a weight ratio of about (48:49:3), in combination with the propylamine salt of lauric acid (PLA) is prepared as follows. About 206 g of deionized water and about 1.6 g of PLA (as a 20% active aqueous solution), are placed in a reactor suitable for emulsion polymerization, equipped with agitation means, heating means and cooling means. With agitation, the reactor is purged with nitrogen (99% pure), and heated to about 75–77° C. The temperature of the reactor contents is adjusted to about 71–73° C., and about 7 g of the monomer mixture (2% of a total of 373 g of the MMA/BA/MMA monomer mixture in the ratio above) is added to the reactor. After 10 minutes, 15 g of a solution of ammonium persulfate (20% of the total solution of 1.8 g of ammonium persulfate dissolved in 75.0 g of water) is added to the reactor over a period of about 10 minutes with continued agitation, during which time there is an exotherm of about 2–3° C. After the exotherm is complete, about 366 g of the monomer mixture (the remaining 98% MMA/BA/MMA monomer mixture), 61.5 g of the ammonium persulfate solution (the remaining 80%), and 28.4 g of the PLA (as a 20% active aqueous solution) are simultaneously charged to the reactor over a period of 2 hours with continued agitation, while keeping the reactor contents at a temperature of about 79–82° C. The reactor temperature is then elevated to about 83–85° C. with continued agitation, for about 15 minutes. After this 15-minute period, the reactor is cooled to about 30° C. The resulting latex product is completely removed from the reactor and gravity filtered using a first 20-mesh screen and then a second 250-mesh screen. The total latex coagulum (i.e. solids) from both mesh screens is collected, combined and weighed. Various physiochemical properties of the latex are reported in Table II.

TABLE II

| | Latexes of Methylmethacrylate/Butylacrylate/Methacrylic Acid | | | | | | | |
|---|---|---|---|---|---|---|---|---|
| Surfactant | Coagulum (%) | Viscosity (CPS) | Mechanical Stability (min) | Particle Size (microns) | Contact Angle (deg.) | pH | Solids (%) | Method of Initiation |
| Polymerizable Surfactant ADDBS (Ex. 1) | <0.2 | 11 | 8 | 120.5 | 125 | 2.43 | 46.9 | Thermal |
| Non-Polymerizable Surfactant PDDBS (Compartive Ex. 2) | <0.03 | 220 | 5 | 122.5 | 98 | 2.23 | 44 | Thermal |

TABLE II-continued

Latexes of Methylmethacrylate/Butylacrylate/Methacrylic Acid

| Surfactant | Coagulum (%) | Viscosity (CPS) | Mechanical Stability (min) | Particle Size (microns) | Contact Angle (deg.) | pH | Solids (%) | Method of Initiation |
|---|---|---|---|---|---|---|---|---|
| Polymerizable Surfactant Allylamine-Cedephos (Ex. 3) | <0.67 | 90 | ND | 135 | 126 | 3.25 | 46.6 | Thermal |
| Non-Polymerizable Surfactant PDDBS (Compartive Ex. 4) | <0.52 | 115 | ND | 149 | 104 | 2.92 | 47.7 | Thermal |
| Polymerizable Surfactant ALA (Ex. 5) | <0.67 | 50 | >15 | 1191 | ND | 5.7 | 49.7 | Thermal |
| Non-Polymerizable Surfactant PLA (Comparative Ex. 6) | <0.52 | 50 | >15 | 1197.7 | ND | 6.1 | 48.8 | Thermal |

EXAMPLE 7

A vinylacetate/butyl acrylate (VA/BA) co-polymer (in a weight ratio of about 78.9:21.1), in combination with the allylamine salt of dodecylbenzenesulfonic acid (ADDBS) and propylamine salt of dodecylbenzenesulfonic (PDDBS) is prepared as follows. About 245 g of deionized water and about 1.5 g of ADDBS (as a 20% active aqueous solution), 1.5 g of PDDBS (as a 23% active aqueous solution), and 1.0 g of sodium sulfate are placed in a reactor suitable for emulsion polymerization, equipped with agitation means, heating means and cooling means. With agitation, the reactor is purged with nitrogen (99% pure), and heated to about 65–68° C. The temperature of the reactor contents is adjusted to about 63–65° C., and about 73.7 g of the monomer mixture (20% of a total of 369 g of the VA/BA monomer mixture in the ratio above) is added to the reactor. After 10 minutes, 15 g of a solution of ammonium persulfate (20% of the total solution of 1.8 g of ammonium persulfate dissolved in 75.0 g of water) is added to the reactor over a period of about 5 minutes with continued agitation. The temperature of the reactor is increased to about 82–84° C. Evidence of polymerization is observed by the appearance of blue tint in the reaction contents and a slight exotherm of 1–2° C. The temperature of the reaction contents is adjusted to about 76–78° C. and about 294g of the BA/VA monomer mixture (the remaining 80%), 61.5 g of the ammonium persulfate solution (the remaining 80%), 27.46 g ADDBS (as a 20% active aqueous solution), and 8.59 g PDDBS (as a 23% active aqueous solution) are simultaneously charged to the reactor over a period of 4 hours with continued agitation, while keeping the reactor contents at a temperature of about 78–82° C. The reactor temperature is then elevated to about 82–84° C. with continued agitation, for about 15 minutes. After this 15-minute period, the reactor is cooled to about 30° C. The resulting latex product is completely removed from the reactor and gravity filtered using a first 20-mesh screen and then a second 250-mesh screen. The total latex coagulum (i.e. solids) from both mesh screens is collected, combined and weighed. Various physiochemical properties of the latex are reported in Table III.

EXAMPLE 8 (COMPARATIVE EXAMPLE)

A vinylacetate/butyl acrylate (VA/BA) co-polymer (in a weight ratio of about 79.1:20.9), in combination with the propyl amine salt of dodecylbenzenesulfonic acid (PDDBS) is prepared as follows. About 162 g of deionized water and about 5.4 g of PDDBS (as a 23% active aqueous solution) are placed in a reactor suitable for emulsion polymerization, equipped with agitation means, heating means and cooling means. With agitation, the reactor is purged with nitrogen (99% pure), and heated to about 65–68° C. The temperature of the reactor contents is adjusted to about 62° C., and about 5.0 g of the monomer mixture (2% of a total of 245 g of the VA/BA monomer mixture in the ratio above) is added to the reactor. After 10 minutes, 10.1 g of a solution of ammonium persulfate (20% of the total solution of 1.8 g of ammonium persulfate dissolved in 75.0 g of water) is added to the reactor over a period of about 15 minutes with continued agitation. The temperature of the reactor is increased to about 82–84° C. Evidence of polymerization is observed by the appearance of blue tint in the reaction contents and a slight exotherm of 2–4° C. The temperature of the reaction contents is adjusted to about 76–78° C. and about 240 g of the BA/VA monomer mixture (the remaining 80%), 40.7 g of the ammonium persulfate solution (the remaining 80%), 16.8 g PDDBS (as a 23% active aqueous solution) are simultaneously charged to the reactor over a period of 4 hours with continued agitation, while keeping the reactor contents at a temperature of about 78–80° C. The reactor temperature is then elevated to about 82–84° C. with continued agitation, for about 15 minutes. After this 15-minute period, the reactor is cooled to about 30° C. The resulting latex product is completely removed from the reactor and gravity filtered using a first 20-mesh screen and then a second 250-mesh screen. The total latex coagulum (i.e. solids) from both mesh screens is collected, combined and weighed. Various physiochemical properties of the latex are reported in Table III.

EXAMPLE 9

A vinylacetate/butyl acrylate (VA/BA) co-polymer (in a weight ratio of about 78.9:21.1), in combination with the allylamine salt of dodecylbenzenesulfonic acid (ADDBS) and the ammonium salt of lauryl ether sulphate with 30 EO groups (ALSE) is prepared as follows. About 245 g of deionized water and about 1.5 g of ADDBS (as a 19% active aqueous solution) and 1.0 g of sodium sulfate are placed in a reactor suitable for emulsion polymerization, equipped with agitation means, heating means and cooling means. With agitation, the reactor is purged with nitrogen (99% pure), and heated to about 65–68° C. The temperature of the reactor contents is adjusted to about 60–63° C., and about 73.7 g of the monomer mixture (20% of a total of 369 g of the VA/BA monomer mixture in the ratio above) is added to the reactor. After 10 minutes, 15 g of a solution of ammonium persulfate (20% of the total solution of 1.8 g of ammonium persulfate dissolved in 75.0 g of water) is added to the reactor over a period of about 5 minutes with continued agitation. The temperature of the reactor is increased to about 82–84° C. Evidence of polymerization is observed by the appearance of blue tint in the reaction contents and a slight exotherm of 1–2° C. The temperature of the reaction contents is adjusted to about 78–81° C. and about 294g of the BA/VA monomer mixture (the remaining 80%), 61.4 g of the ammonium persulfate solution (the remaining 80%), 27.8 g ADDBS (as a 20% active aqueous solution), and 6.3 g ALSE (as a 30% active aqueous solution) are simultaneously charged to the reactor over a period of 4 hours with continued agitation, while keeping the reactor contents at a temperature of about 78–82° C. The reactor temperature is then elevated to about 82–84° C. with continued agitation, for about 15 minutes. After this 15-minute period, the reactor is cooled to about 30° C. The resulting latex product is completely removed from the reactor and gravity filtered using a first 20-mesh screen and then a second 250-mesh screen. The total latex coagulum (i.e. solids) from both mesh screens is collected, combined and weighed. Various physiochemical properties of the latex are reported in Table III.

of 0.83 g of sodium metabisulfite dissolved in 67.8 g of water) is added to the reactor over a period of about 5 minutes with continued agitation. Evidence of polymerization is observed by the appearance of blue tint in the reaction contents and a slight exotherm of 1–2° C. The temperature of the reaction contents is adjusted to about 68–72° C., and 54.9 g of the sodium metabisulphite solution (the remaining 80%), 54.8 g of the ammonium persulfate solution (the remaining 80%), 503 g of the BA/VA monomer mixture (the remaining 98%), 29.3 g of ADDBS (as a 19% active aqueous solution), and 10.3 g of PDDBS (as a 23% active aqueous solution) are simultaneously added over a period of three hours with continued agitation, while keeping the reactor contents at a temperature of about 68–72° C. The reactor temperature is then elevated to about 75–78° C. with continued agitation, for about 15 minutes. After this 15-minute period, the reactor is cooled to about 30° C. The resulting latex product is completely removed from the reactor and gravity filtered using a first 20-mesh screen and then a second 250-mesh screen. The total latex coagulum (i.e. solids) from both mesh screens is collected, combined and weighed. Various physiochemical properties of the latex are reported in Table III.

TABLE III

Latexes of Vinylacetate/Butylacrylate

| Surfactant | Coagulum (%) | Viscosity (CPS) | Mechanical Stability (min) | Particle Size (microns) | Contact Angle (deg.) | pH | Solids (%) | Method of Initiation |
|---|---|---|---|---|---|---|---|---|
| Polymerizable/Non-Polymerizable Surfactants ADDBS & PDDBS (Ex. 7) | <0.09 | 220 | >13 | 266/767 | 86 | 2.23 | 45.1 | Thermal |
| Non-Polymerizable Surfactant PDDBS (Compartive Ex. 8) | <0.05 | 50 | 6 | 98.3 | 104 | 2.48 | 41.2 | Thermal |
| Polymerizable/Non-Polymerizable Surfactants ADDBS & ALSE (Ex. 9) | <0.03 | 50 | ND | 1599 | ND | 2.63 | 45.3 | Thermal |
| Polymerizable/Non-Polymerizable Surfactants ADDBS & PDDBS (Ex. 10) | <0.06 | 220 | ND | 410 | ND | 5.23 | 46.6 | Redox |

EXAMPLE 10

A vinylacetate/butyl acrylate (VA/BA) co-polymer (in a weight ratio of about 78.9:21.1), in combination with the allylamine salt of dodecylbenzenesulfonic acid (ADDBS) and propylamine salt of dodecylbenzenesulfonic (PDDBS) is prepared, using redox couple as initiators, as follows. About 251 g of deionized water and about 1.5 g of ADDBS (as a 19% active aqueous solution), 0.9 g of PDDBS (as a 23% active aqueous solution), and 0.3 g of sodium hydrogen carbonate are placed in a reactor suitable for emulsion polymerization, equipped with agitation means, heating means and cooling means. With agitation, the reactor is purged with nitrogen (99% pure), and heated to about 65–68° C. The temperature of the reactor contents is adjusted to about 63–65° C., and about 10.3 g of the monomer mixture (2% of a total of 513 g of the VA/BA monomer mixture in the ratio above) is added to the reactor. After 15 minutes, 13.7 g of a solution of ammonium persulfate (20% of the total solution of 2.0 g of ammonium persulfate dissolved in 66.5 g of water) and 13.7 g of a solution of sodium metabisulfite (20% of the total solution

EXAMPLE 11

A methylmethacrylate/butylacrylate/methacrylic acid (MMA/BA/MMA) co-polymer (in a weight ratio of about 48:49:3), in combination with the allylamine salt of laureth-3EO-sulfate (AES-3), is prepared as follows. About 205 g of deionized water and about 1.6 g of AAES-3 (as a 25.5% active aqueous solution), are placed in a reactor suitable for emulsion polymerization, equipped with agitation means, heating means and cooling means. With agitation, the reactor is purged with nitrogen (99% pure), and heated to about 77–79° C. Next, about 75 g of the monomer mixture (20% of a total of 376 g of the MMA/BA/MMA monomer mixture in the ratio above) is added to the reactor. After 10 minutes, 15.0 g of a solution of ammonium persulfate (20% of the total solution of 1.9 g of ammonium persulfate dissolved in 72.9 g of water) is added to the reactor over a period of about 4 minutes with continued agitation, during which time there is an exotherm of about 12–14° C. After the exotherm is complete, about 301 g of the monomer mixture (the remaining 80% MMA/BA/MMA monomer mixture), 59.8 g of the ammonium persulfate solution (the remaining 80%), and 22.0 g of AAES-3 (as the 22% active aqueous solution) are charged to the reactor over a period of 2 hours with continued agitation, while keeping the reactor contents at a temperature of about 78–82° C. The reactor temperature is then elevated to about 82–84° C. with continued agitation, for about 15 minutes. After this 15-minute period, the reactor is cooled to about 30° C. The resulting latex product is completely removed from the reactor and gravity filtered using a first 20-mesh screen and then a second 250-mesh screen. The total latex coagulum (i.e. solids) from both mesh screens is collected, combined and weighed. The resulting latex has the following charatistics:

| | |
|---|---|
| Solids | 48.41% |
| Particle size (nm) Vol (50%) | 95 nm. |
| pH | 2.43 |
| Visc. (3/60) | 140.00 (centipoise) |
| Coagulum | 0.36 g (<0.05% on total batch weight). |

EXAMPLE 12

A methylmethacrylate/butylacrylate/methacrylic acid (MMA/BA/MMA) co-polymer (in a weight ratio of about 48:49:3), in combination with the allylamine salt of lauryl sulfate (AS), is prepared as follows. About 222 g of deionized water and about 2.3 g of AS (as a 17.2% active aqueous solution), are placed in a reactor suitable for emulsion polymerization, equipped with agitation means, heating means and cooling means. With agitation, the reactor is purged with nitrogen (99% pure), and heated to about 77–79° C. Next, about 77 g of the monomer mixture (20% of a total of 378 g of the MMA/BA/MMA monomer mixture in the ratio above) is added to the reactor. After 10 minutes, 15.4 g of a solution of ammonium persulfate (20% of the total solution of 1.9 g of ammonium persulfate dissolved in 75.0 g of water) is added to the reactor over a period of about 4 minutes with continued agitation, during which time there is an exotherm of about 7–8° C. After the exotherm is complete, about 301 g of the monomer mixture (the remaining 80% MMA/BA/MMA monomer mixture), 61.6 g of the ammonium persulfate solution (the remaining 80%), and 33.7 g of AS (as the 17.2% active aqueous solution) are charged to the reactor over a period of 2 hours with continued agitation, while keeping the reactor contents at a temperature of about 78–82° C. The reactor temperature is then elevated to about 82–84° C. with continued agitation, for about 15 minutes. After this 15-minute period, the reactor is cooled to about 30° C. The resulting latex product is completely removed from the reactor and gravity filtered using a first 20 mesh screen and then a second 250 mesh screen. The total latex coagulum (i.e. solids) from both mesh screens is collected, combined and weighed.
The resulting latex has the following charatistics:

| | |
|---|---|
| Solids | 48.41% |
| Particle size (nm) Vol (50%) | 95 nm. |
| pH | 2.43 |
| Visc. (3/60) | 140.00 (centipoise) |
| Coagulum | 0.36 g (<0.05% on total batch weight) |

EXAMPLE 13

The hydrophobicity of a latex prepared using a typical non-polymerizable surfactant was compared to that of a latex prepared using a representative polymerizable surfactant of the present invention. Using ASTM D724-45, it has been discovered that the latex prepared in Example 1 (using ADDBS) possesses remarkable hydrophobicity, as compared to the latex prepared according to Example 1 (using the ammonium salt of dodecylbenzene sulfonic acid, AmDDBS). The change in contact angle as a function of time for a water droplet at each of the latex film surfaces was measured, and the results are shown below.

| | | Time (Seconds) | | | |
|---|---|---|---|---|---|
| Latex Surfactant | | 5 | 20 | 40 | 60 |
| AmDDBS (non-polymerizable) | (Contact Angle) | 98° | 74° | 51° | 27° |
| ADDBS (polymerizable) | (Contact Angle) | 125° | 125° | 125° | 125° |

Without being bound by any particular theory, a rapidly decreasing contact angle as observed from a latex film indicates that the water droplet is penetrating the film due to surfactant related imperfections of the film. A constant water droplet contact angle, as in the case of the ADDBS derived latex, indicates the desirable result whereby water is unable to penetrate the hydrophobic film.

In a test similar to the contact angle measurements, the hydrophobicity of a latex prepared using a typical non-polymerizable surfactant was compared to that of a latex prepared using a representative polymerizable surfactant of the present invention, where the different latex films were coated and heat cured onto porous filter paper and treated with water. As shown in the results below, with the latex derived from the ADDBS surfactnat, water readily and undesirably penetrated through the film and absorbed into the paper in a few seconds. However, with the latex film derived from the ADDBS surfactant, water did not penetrate or absorb, and the water droplet maintained its original shape on the latex film until influenced by evaporation effects (at least thirty minutes).

| | | Time (Seconds) | | | |
|---|---|---|---|---|---|
| Latex Surfactant | | 5 | 20 | 40 | 60 |
| AmDDBS (non-polymerizable) | (penetration/absorption) | slight | total | total | total |
| ADDBS (polymerizable) | (penetration/absorption) | none | none | none | none |

EXAMPLE 14

The adhesion properties of a latex prepared using a typical non-polymerizable surfactant were compared to that of a latex prepared using a representative polymerizable surfactant of the present invention. It has been discovered that the latex prepared in Example 1 (using ADDBS) possess a vastly superior adhesion profile, as compared to the latex prepared according to Example 1 (using the ammonium salt of dodecylbenzene sulfonic acid, AmDDBS). Adhesion data were collected for each latex acrylic lattice using ASTM method D897. This test method is a standard test for adhesion called "block pull"; results from the test are indicated in pounds per square inch (p.s.i.), wherein higher p.s.i. indicates better adhesion properties of the latex. Adhesive failure is defined as the point at which the latex, upon application of a pulling force, no longer adheres to the surface of the substrate. Cohesive failure is defined as the point at which the latex itself fails, i.e. where the latex splits into two or more portions, but remains bound to the substrate. The adhesion tests were conducted using an Instron Model 1123, with a 5000 pound load cell, a sample size of 0.5 g of latex, and a surface area of 4 in$^2$, where the treated sample blocks were allowed to dry at room temperature (i.e. 25° C.) for three days under 0.25 p.s.i. external pressure. Aluminum and steel blocks were prepared by sanding with extra fine 220 grit paper until smooth to the touch. A weighed amount of each latex (0.5 g) was placed on one surface of one block and another block place on top for three days. Failure was determined by visual inspection, with the results indicated below.

| Latex Surfactant | Adhesive Failure (p.s.i.) |
|---|---|
| AmDDBS (non-polymerizable) | 65 |
| ADDBS (polymerizable) | 170 |

EXAMPLE 15

The latex film yellowing properties of a latex prepared using a typical non-polymerizable surfactant were compared to that of a latex prepared using a representative polymerizable surfactant of the present invention. It has been discovered that the latex prepared in Example 1 (using ADDBS) possess a greatly improved film yellowing profile, as compared to the latex prepared according to Example 1 (using the ammonium salt of dodecylbenzene sulfonic acid, AmDDBS). Latex film yellowing was compared after aging the films six months at room temperature, at approximately standard atmospheric conditions. It is highly desirable, as known by one skilled in the art, to produce a latex film that does not yellow upon application to a surface, with the passage of time. After a period of 6 months, the ADDBS-derived latex was plainly observed to be significantly lighter color than the AmDDBS-derived latex. Absorbence measurements were taken for each latex at 350 nm and 420 nm; the lower the absorbance at a given wave length, the lighter the latex (i.e. the less yellow the latex). Results of the measurements for the two latexes are shown below.

| Latex Surfactant | Latex Absorbance | |
|---|---|---|
| | 350 nm | 420 nm |
| AmDDBS (non-polymerizable) | 16.9 | 5.3 |
| ADDBS (polymerizable) | 10.0 | 2.5 |

EXAMPLE 16

The scrub resistance properties of a latex prepared using a typical non-polymerizable surfactant were compared to that of a latex prepared using a representative polymerizable surfactant of the present invention. It has been discovered that the latex prepared in Example 1 (using ADDBS) possess improved scrubability characteristics, as compared to the latex prepared according to Example 1 (using the ammonium salt of dodecylbenzene sulfonic acid, AmDDBS). Scrubability of the latexes was evaluated using ASTM scrub test D2486. Seven Star Acrylic Flat House Paint, 103A100 White, from Ace Hardware was utilized in the testing. The ADBBS- and AmDDBS-derived latexes were individually added to the paint in a latex:paint ratio of 2:1.

FTIR comparisons were conducted by casting onto glass latex films derived from both ADDBS and AmDDBS. The films were dried at room temperature for several days, removed from the glass, and aged at room temperature under ambient conditions for six months. The films were individually placed on ZnSe plates and the FTIR spectra recorded. Peak heights were measured on the absorbance peak located at 1035 cm$^{-1}$ (i.e. the S=O stretch peak) for each film. It has been discovered that the latex prepared in Example 1 (using ADDBS) possess a much lower peak height absorbance in the FTIR spectrum, as compared to the latex prepared according to Example 1 (using the ammonium salt of dodecylbenzene sulfonic acid, AmDDBS). Without being bound by any particular theory, a lower peak height absorbance indicates a desirable characteristic of the latex, where the individual surfactant molecules are not present at the surface of the latex film, i.e. they have not migrated to the surface of the film.

| Latex Surfactant | Latex FTIR Absorbance ($\times 10^{-4}$) |
|---|---|
| AmDDBS (non-polymerizable) | 73 |
| ADDBS (polymerizable) | 29 |

EXAMPLE 17

Coatings: High-Gloss, Semi-Gloss and Flat Paints Formulated Paints Incorporating Traditional or Non-Migrating Surfactants: Adhesion and Water-Spot Analysis Several high-gloss paints, based on either non-migrating surfactants (NMS) or traditional surfactants (TS) were prepared and tested.

Preparation of Latex

Latexes L1 and L2 were formulated using the components listed in Table IV in the amounts indicated according to the procedures described below.

TABLE IV

| | Latex Formulation | |
|---|---|---|
| | L1 | L2 |
| 1. Deionized water | 251.2 g | 251.2 g |
| 2. Surfactant | | |
| A. POLYSTEP ® AU-7 | 12.0 g | |
| B. POLYSTEP ® B-330A | | 12.0 g |
| 3. Methyl Methacrylate | 191.0 g | 191.0 g |
| 4. Butyl Acrylate | 183.0 g | 183.0 g |
| 5. Acrylic Acid | 3.5 g | 3.5 g |
| 6. Deionized water | 79.5 g | 79.5 g |
| 7. Ammonium Persulfate | 1.9 g | 1.9 g |
| 8. Deionized Water | 72.4 g | 72.4 g |
| 9. Surfactant | | |
| A. POLYSTEP ® AU-7 | 17.9 g | |
| B. POLYSTEP ® B-330A | | 17.9 g |
| Total formulation Weight (g) | 812.4 g | 812.4 g |
| Properties | | |
| Solids | 45.8% | 45.5% |
| pH | 2.4 | 2.4 |
| Viscosity | 120 cps | 55 cps |
| Scrap (Coagulum and Kettle Skin) | 0.15% | 0.1% |
| Particle Size (Volume Average) | 117 | 113 |

PROCEDURE

A. Charge the surfactant solution (1–2) to a reactor and heat to 80° C. under nitrogen.

B. Add 20% of the monomer mix (3–5) to the reactor.

C. Add 20% of the initiator solution (6–7) at a rate of 2.5 mL/min.

D. When the exotherm subsides, begin adding the remaining monomer mix, initiator solution, and surfactant solution (8–9) concurrently over two hours.

E. Maintain the temperature around 82–83° C. during the reaction and for 30 min after completion of the feeds.

F. Cool to room temperature and discharge the latex.

Preparation of Paints

High-gloss paints LP1 and LP2 were prepared using the components and amounts (mass basis) thereof shown in Table V. All paints were white. Paint incorporating the latex prepared with non-migrating surfactant according to the invention is denoted LP1 herein, and paint prepared incorporating the latex made with traditional surfactant is denoted LP2 herein.

TABLE V

High-Gloss Latex Paint Formulation
(Pigment Volume Concentration ~21%)

| Material | Parts |
| --- | --- |
| Propylene Glycol | 6.82 |
| Dispersant (Tamol 731 DP, Rohm & Haas) | 0.44 |
| Methyl Carbitol | 0.97 |
| Rheology Modifier (Acrysol RM-2020 NPR, (Rohm & Haas) | 3.09 |
| Titanium Dioxide (Ti-Pure R-700, DuPont) | 26.20 |
| Water | 9.37 |
| Latex (prepared with traditional (L2) or non-migrating (L1) surfactant) | 52.80 |
| Defoamer (Dow Corning 65 or equivalent) | ≦0.25 |

Viscosity & Gloss Values

| Paint | Viscosity (Brookfield) | 20° Gloss |
| --- | --- | --- |
| LP1 (Non-Migrating Surfactant): | 3440 cps | 60 |
| LP2 (Traditional Surfactant): | 3580 cps | 61 |

Evaluation of Adhesion to Aged Alkyd

Substrates were prepared by the application of black alkyd paint films (Benjamin Moore "Impervo" High-Gloss Metal & Wood Enamel), 0.007" in wet thickness, onto plastic Leneta panels. These substrates were aged at 22° C. and 50% relative humidity (RH) for a minimum of six weeks. Latex paint films 0.003" in wet thickness were then drawn on these substrates and were aged for five days at 22° C. and 50% relative humidity. Samples were immersed in water for 16–18 hours and removed immediately before evaluation. The appearance of the paint films was assessed and the films were then subjected to adhesion testing. Adhesion of the latex films to the alkyd substrates was tested by cutting an "x" in the paint film, placing Permacel® tape #99 on the cut area, waiting approximately 60 to 75 s, and then removing the tape and determining the extent to which the paint was removed (ASTM D-3359 A). A separate, more qualitative test involved using a razor to cut short lines (approximately 1.5–2 cm in length) in the paint films and then attempting to cause delamination of the paint films by rubbing across the cut with a standard pencil eraser. A summary of the results is presented in the table below. More detailed descriptions of the results follow the table.

Results

| Paint | Appearance | X-Cut/Tape Peel | Eraser Scrub |
| --- | --- | --- | --- |
| Non-Migrating Surfactant: | Same as before immersion | Peeling only under tape/within X | No delamination |
| Traditional Surfactant: | Severely blistered | Peeling beyond tape/beyond X | Significant delamination |

Assessment of the Appearance of Paint Samples Following Water Immersion

Non-Migrating Surfactant: Looked approximately the same as before the test (maintained its original smooth and glossy appearance).

Traditional Surfactant: Severely blistered (blisters approximately 1 mm in diameter, spaced 2–5 mm apart. Ratings according to ASTM D-714: 5M-6M). As the paint film equilibrated under ambient conditions, the blisters flattened into craters.

X-cut Adhesion Test (ASTM Method D-3359 A)

Non-Migrating Surfactant: Essentially no paint was removed outside of the area contacted directly by the tape. Nearly all of the paint removed was within the boundaries of the x-cut (i.e., an imaginary rectangular box enclosing the x).

Traditional Surfactant: Significant amounts of paint were removed, including paint well outside the area contacted by the tape and well beyond the boundaries of the x-cut.

Eraser-scrub Adhesion Test

Non-Migrating Surfactant: When the cuts were scrubbed with the eraser, no paint delaminated; rather, the edges of the cut were smoothed down and the cuts became less prominent.

Traditional Surfactant: Paint readily delaminated, leaving wide strips of the substrate exposed (~2 to 5 cm). Underneath the delaminated paint, the alkyd paint was wet.

These data indicate that the properties of adhesion and lack of blistering of the polymerizable surface active agent-based paint are signficantly better than a similar paint formulation prepared using a traditional surfactant.

Adhesion to Aluminum (ASTM D-3359. Method B)

Aluminum test panels were obtained from P. N. Gardner Co. and were scrubbed with detergent, rinsed with de-ionized water, and dried with a jet of air or with an absorbent tissue before use. Paint films of 0.003" thickness were drawn on clean panels in the laboratory and were allowed to dry for 5 days at either 22° C. and 50% RH or at laboratory ambient temperature and 84% RH. Cross-hatch tests of adhesion to aluminum were performed as follows. Cross-hatch patterns at a density of approximately 11 cuts per centimeter (3–4 areas on each of two test panels) were cut using a razor blade. Adhesion was tested by applying Permacel® tape #99 to the cross-hatched areas and peeling the tape off after approximately 60–75 s. The percentage of the paint within the test areas that delaminated was quantified visually, and the corresponding ASTM-specified ratings were assigned. Results are presented in Table VI below.

TABLE VI

| | Conditions: | |
| --- | --- | --- |
| Paint | 50% RH | 84% RH |
| Paint LP1 (Non-Migrating Surfactant): | 3B–4B[a] | 2B–3B |
| Paint LP2 (Traditional Surfactant) | 0B–2B | 0B–1B |

[a] 5B = no damage,
0B = greater than 65% of film removed

These tests indicate that paint containing a non-migrating surfactant according to the invention exhibited significantly better adhesion to a substrate than did a paint manufactured using a traditional surfactant, even when allowed to dry at relatively high humidity.

Water-Spot Damage (Surfactant Blooming)

Paint films of 0.003" thickness were drawn on plastic panels and allowed to dry for 24 h at 22° C. and 50% relative humidity. A second film of the same paint and same thickness was drawn over the first; samples were allowed to dry for an additional 4 days at 22° C. and 50% relative humidity. Three large water droplets (~6 mm in diameter) and three small water droplets (~2.5 mm in diameter) were applied to each sample and allowed to evaporate under ambient conditions. The relative extent of blooming was assessed visually. Blooming was characterized by the appearance of a ring within which gloss was reduced due to the deposition of water-soluble materials upon the paint surfaces. The residue from one large drop on each sample was removed with a tissue saturated with de-ionized water, and any lingering damage to the paint films was assessed visually. The results are summarized below.

Results

| Paint | Extent of Blooming | Extent of Damage |
|---|---|---|
| LP1 (Non-migrating surfactant) | very slight blooming | no apparent damage |
| LP2 (Traditional surfactant) | moderate patchy blooming | very slight damage |

The above data indicate that paint LP1, formulated with non-migrating surfactant, performed significantly better than paint LP2, formulated with traditional surfactant. Damage attributable to surfactant blooming was reduced significantly by the use of non-migrating surfactant.

Blocking Resistance (ASTM D-4946. Modified)

Paint films of 0.003" thickness were drawn on sealed paper and aged five days at 22° C. and 50% RH. Squares 1.5" on a side were cut from these samples and placed in contact with each other (paint-to-paint) under a load of 1.6 psi at room temperature for 1.5 h. The relative degree of tack was assessed by noting the ease with which the panels separated, and also by listening to the different panels as they were peeled apart. A rating of 10 indicates that the samples peeled apart effortlessly and silently, whereas a rating of 5 indicates that slight effort was required and some noise ("crackling") was noted. None of the paints transferred from one substrate to the other under the testing conditions.

Results

| Paint | Rating |
|---|---|
| LP1 | 5–7 |
| LP2 | 4–5 |

Because a higher rating indicates a lesser extent of blocking, these results demonstrate that paint LP1, formulated with non-migrating surfactant, performed significantly better than paint LP2, formulated with traditional surfactant.

Scrub-Resistance (ASTM D-2486)

Paint films of 0.007" thickness were drawn on plastic Leneta panels and aged 7 days at 22° C. and 50% RH. Samples were placed over a shim 0.5" wide and 0.010" in thickness in a scrub tester equipped with an ASTM-compliant brush and ASTM-compliant scrub medium. Results are reported as cycles to failure. Failure is defined as the point at which the black plastic panel is visible in one uninterrupted strip through the paint film over the shim.

Results

| Paint | Cycles to failure |
|---|---|
| LP1 | 1253 ± 221 |
| LP2 | 1230 ± 38 |

The non-migrating surfactant-based paint according to the invention and the traditional surfactant-based paint performed approximately equally.

Paint Re-wetting and Intercoat Adhesion

Samples were prepared as for tests of water-spot damage (surfactant blooming), detailed above. Observations were made during the application of the second coat of latex paint, and also after the second coat dried. Cross-hatch patterns at a spacing of 11 cuts/cm were cut using a razor blade (3–4 areas on each of two test panels). Permacel® tape #99 was applied to the cross-hatched areas, and was peeled off after approximately 60–75 s.

No delamination of any paint was observed during cross-hatch adhesion tests. Furthermore, even though it contained less or no mobile surfactant, the paint formulated with non-migrating surfactant exhibited excellent re-wetting. And as was true with paint formulated with traditional surfactant, no crawling or de-wetting of the second coat of paint formulated with non-migrating surfactant was observed.

Stain-Resistance

Paint films of 0.003" thickness were drawn down side by side on a black plastic Leneta panel. The panel was aged four days at 50% RH and 22° C. Strips of commercially prepared mustard, ketchup, and mayonnaise, each approximately 1 cm in width, were applied to each paint sample and allowed to remain undisturbed for 3 h. At that time, the foods were wiped off, and the paint samples were sprayed with Fantastik™ and wiped clean.

Results

| Paint | Mustard | Ketchup | Mayonnaise |
|---|---|---|---|
| LP1 | Slightly stained | No effect | No effect |
| LP2 | Slightly stained | No effect | No effect |

Paint formulated with non-migrating surfactant performed approximately equally in this test compared to paint formulated with traditional surfactant

EXAMPLE 18

Adhesives and Sealants: Opaque and Clear Latex Caulks

Summary of Results

Caulks prepared with non-migrating and traditional surfactants were comparable to each other in appearance and were stable in the presence of various formulation ingredients, including calcium carbonate. Following extended immersion in water, caulks which had been formulated with a non-migrating surfactant exhibited much stronger adhesion to tile than caulks which had been formulated with an analogous traditional surfactant. Caulks which were formulated with both non-migrating surfactant and an adhesion promoter exhibited adhesion to tile that was far stronger than that exhibited by caulks formulated with only one of the two, or with neither.

Preparation of Latex and Formulation of Caulks

Latexes were prepared containing the materials listed in Table VII. Using those latexes, clear and opaque caulks were prepared containing the components shown in the formulations listed in Tables VIIIa and VIIIb. Clear caulks were prepared essentially according to the procedures set forth in U.S. Pat. No. 5,124,384. Opaque caulks were prepared essentially according to the procedures described by Palmer, R. A. and Klosowski, J. M. in *Kirk-Othmer Encyclopedia of Chemical Technology* (Kroschwitz, J. I.; Howe-Grant, M., Eds.) 4th ed., Vol. 21, pp 650–666. Proportions of ingredients in these tables are given on a mass basis.

TABLE VII

Latex Formulation and Properties

| Material | Parts |
|---|---|
| DI Water | 45.5 |
| Surfactant* | 0.8 |
| Ammonium Persulfate | 0.3 |
| Butyl Acrylate | 38.0 |
| Methyl Methacrylate | 14.4 |
| Methacrylic Acid | 1.0 |

Properties

Solids: 54%
Scrap (Coagulum, Grit, and Kettle Skin): 0.13%
Volume-Average Particle Size, nm (Multimodal):

| | |
|---|---|
| Non-migrating surfactant: | 167 ± 22 (39%), 561 ± 68 (61%) |
| Traditional Surfactant: | 157 ± 22 (40%), 492 ± 41 (39%), 854 ± 56 (20.8%). |

*POLYSTEP B-330 A (ammonium laureth-3-sulfate) was used as the "traditional" surfactant, and POLYSTEP AU-7 (allylammonium laureth-3-sulfate) was used as the "non-migrating" surfactant.

TABLE VIIIa

Clear Caulk Formulation

| Material | Parts |
|---|---|
| Latex | 89.7 |
| Dioctyl Phthalate (plasticizer) | 5.9 |
| Light Mineral Oil | 0.7 |
| Propylene Glycol | 1.2 |
| Acrysol SCT 275 (thickener, Rohm & Haas) | 1.8 |
| Amorphous Fumed Silica M-5 (Cab-O-Sil) | 0.6 |

TABLE VIIIb

Opaque Caulk Formulation

| Material | Parts |
|---|---|
| Acrysol SCT 275 (thickener, Rohm & Haas) | 2.9 |
| Tamol 731 (pigment dispersant, Rohm & Haas) | 0.3 |
| Propylene Glycol | 7.2 |
| Dioctyl Phthalate (plasticizer) | 2.9 |
| Latex (prepared with non-migrating or traditional surfactant) | 43.3 |
| Snowflake White (calcium carbonate, ECC) | 43.3 |
| Mercaptopropyl trimethoxysilane (MPS), silane adhesion promoter, Aldrich, optional) | 0.1 |

Evaluation of Adhesion to Ceramic Tile (Underwater Immersion)

Caulks prepared with adhesion promoter showed better performance than caulks prepared without adhesion promoter. The non-migrating surfactant based caulk prepared with both adhesion promoter and non-migrating surfactant displayed superior performance, as compared to all other caulks evaluated.

Four caulks were prepared according to the formulation given in Table VIIIb, using latexes based either on traditional surfactant (TS) or on non-migrating surfactant (NMS), and formulated either with or without adhesion promoter. Beads of these caulks, approximately 0.5 cm×2.5 cm, were formed on glossy ceramic tile. All caulks were allowed to dry for various periods of time at 22° C. and 50% relative humidity. The caulk samples were then immersed in de-ionized water for 18–24 hours. Adhesion was assessed qualitatively, by determining the level of effort required to dislodge the caulk beads by edge-on pushing and/or by peeling. The results of these measurements are tabulated in Tables IX, X, and XI.

TABLE IX

Drying time: 5 days
Immersion time: Overnight

| Caulk | NMS? | MPS? | Observations |
|---|---|---|---|
| 2135-73A | ✓ | X | Gentle edge-on push dislodged entire caulk bead |
| 2135-73B | ✓ | ✓ | Strong edge-on push failed to dislodge caulk; peeling required minimal effort |
| 2135-73C | X | X | Gentle edge-on push dislodged entire caulk bead |
| 2135-73D | X | ✓ | Gentle edge-on push dislodged entire caulk bead |

✓ = present
X = not present

TABLE X

Drying time: 10 days
Immersion time: 24 hours

| Caulk | NMS? | MPS? | Observations |
|---|---|---|---|
| 2135-73A | ✓ | X | Moderate edge-on push dislodged entire caulk bead |
| 2135-73B | ✓ | ✓ | Strong edge-on push failed to dislodge caulk; peeling required significant effort |
| 2135-73C | X | X | Moderate edge-on push dislodged entire caulk bead |
| 2135-73D | X | ✓ | Strong edge-on push failed to dislodge caulk; peeling required minimal effort |

✓ = present
X = not present

TABLE XI

Drying time: 32 days
Immersion time: Overnight

| Caulk | NMS? | MPS? | Observations* |
|---|---|---|---|
| 2135-73A | ✓ | X | Moderate edge-on push dislodged caulk; peeling required minimal effort |
| 2135-73B | ✓ | ✓ | Strong edge-on push failed to dislodge caulk; peeling required significant effort and resulted in cohesive failure of the caulk bead. |
| 2135-73C | X | X | Moderate edge-on push dislodged caulk; peeling required minimal effort |
| 2135-73D | X | ✓ | Strong edge-on push failed to dislodge caulk; peeling required minimal effort |

✓ = present
X = not present
*In previous tests (those involving 5- and 10-day drying times), shear adhesion (i.e., edge-on pushing) was evaluated first, and if any bead could thus be easily removed, peel adhesion was not evaluated. In the set of tests in Table XI, however, an effort was made to ensure that both shear adhesion and peel adhesion were evaluated for all samples.

The results shown in Tables IX, X, and XI indicate that for many of the caulk beads, adhesive strength increased with drying time. The beads formulated with MPS out-performed those formulated without MPS. Significantly, the caulk beads formulated with both MPS and non-migrating surfactant offered significant resistance to being peeled from tile. While not wishing to be bound by any particular theory, these results suggest a strong synergistic effect between these two materials. These caulks developed a level of adhesion within the first five days of drying which was not realized in the other caulk samples even after 32 days.

Cross-Hatch Adhesion Testing of Caulks

Four caulks were prepared according to the formulation given in Table VIIIb, using latexes based either on traditional surfactant (TS) or on non-migrating surfactant (NMS), and formulated either with or without adhesion promoter. The caulks were drawn down on glass slides to form films of 1.5 mm thickness. These films were allowed to dry for one day under ambient conditions and were then equilibrated for 29 days at 22° C. and 50% relative humidity. Four sets of cross-hatch patterns were cut into each film with a razor blade (6 cuts each direction at a spacing of approximately 2 mm, in accordance with ASTM test method D-3359B). The films were soaked for 17 h in de-ionized water, and were then allowed to dry under ambient conditions for 3 h. Permacel #99 tape was smoothed over the cross-hatched areas, allowed to remain for 60±30 s, and then peeled back in a smooth motion at an angle of 135°. The test areas on the film of caulk prepared using the non-migrating surfactant exhibited no delamination (0%), whereas the caulk prepared using the traditional surfactant, delaminated completely (100%). Test areas on the same films which were cut with a cross-hatch pattern after the films had been soaked overnight in water gave identical results (i.e., no delamination for the NMS-based caulk and complete delamination for the traditional-surfactant-based caulk).

EXAMPLE 19

Pressure Senstive Adhesive (PSA)

Preparation of Latexes and Formulation of Pressure Sensitive Adhesive (PSA).

Latexes were prepared according to the formulation presented in Table XII. Amounts of the materials in this table are given on a mass basis. To form PSAs, the latexes were neutralized with ammonia or AMP 95™ (aminomethylpropanol, Angus Chemical Company, Buffalo Grove, Ill. 60089) to a pH of 6.0. Wetting aids (i.e., post-added surfactants) were not used in this study.

TABLE XII

Latex Formulation and Properties

| Material | Parts |
| --- | --- |
| DI Water | 45.5 |
| Surfactant* | 0.8 |
| Ammonium Persulfate | 0.3 |
| Butyl Acrylate | 52.4 |
| Methacrylic Acid | 1.0 |

*Traditional Surfactant: POLYSTEP ® B-330 A (ammonium laureth-3-sulfate)
Non-migrating Surfactant: POLYSTEP ® AU-7 (allylammonium laureth-3-sulfate)

Each latex formulation had the following properties:

Solids: 54%
Scrap (Coagulum, Grit, and Kettle Skin): 0.06%
Volume-Average Particle Size, nm (Bimodal):

| | |
| --- | --- |
| Non-Migrating Surfactant: | 115 ± 14 (35%), 385 ± 45 (65%) |
| Traditional Surfactant: | 223 ± 120 (51%), 1161 ± 92 (49%) |

Evaluation of Clouding During Immersion in Water

This test evaluates the ability of a PSA to resist clouding when immersed in water. Thin PSA films are drawn down on glass and, following aging, are immersed in water in a cuvette inside an ultraviolet/visible spectrophotometer. The percentage of light transmitted through the films is monitored as a function of the length of time the PSA has been immersed. As the films become cloudy, transmittance decreases. Without exception, samples prepared with the non-migrating surfactant according to the invention outperform those prepared with the traditional surfactant.

Conditions

PSA films of 0.003" wet thickness were prepared as described above and drawn down on clean glass microscope slides that had been cut to a width of 1.9 cm. Samples were prepared in duplicate, dried at 65° C. for 10 min, allowed to sit overnight under ambient conditions, and then equilibrated for four days at 22° C. and 50% RH. Individual samples were placed in a cuvette full of water inside an ultraviolet/visible spectrophotometer (Milton Roy Spectronic 21D). Immediately upon immersion, percent transmittance (% T) at 500 nm was set to 100% for each sample. Subsequent decreases in % T, attributable to clouding of the film resulting from water uptake, were monitored as a function of time.

Results

The following Table XIII shows the values of % T that were measured for the six classes of PSA samples after various periods of immersion. As noted earlier, the latexes either were used as-is (unneutralized), or were neutralized with ammonia or AMP 95 (aminomethylpropanol) to a pH of 6.0. The values in Table XIII are averages.

TABLE XIII

Average Values of % T as a Function of Time of Immersion for Various PSA Films

| Time (min) | NMS[1] As-Is | TS[2] As-Is | NMS Ammonia | TS Ammonia | NMS AMP 95 | TS AMP 95 |
| --- | --- | --- | --- | --- | --- | --- |
| 0 | 100.0 | 100.0 | 100.0 | 100.0 | 100.0 | 100.0 |
| 2 | 97.8 | 83.6 | 99.7 | 83.0 | 98.6 | 91.3 |
| 4 | 95.0 | 74.3 | 97.8 | 74.7 | 96.2 | 86.0 |
| 7 | 90.5 | 64.0 | 94.8 | 66.2 | 92.1 | 76.8 |
| 10 | 86.9 | 56.3 | 91.1 | 60.3 | 88.1 | 69.3 |
| 15 | 81.4 | 48.3 | 85.3 | 53.5 | 82.9 | 59.5 |

[1]Non-Migrating Surfactant
[2]Traditional surfactant

As shown in Table XIII, PSA films formulated with a non-migrating surfactant exhibited a significant improvement in clouding resistance as compared to PSA films formulated with a traditional surfactant. The improvement was realized independent of whether the latexes were neutralized, and, when neutralizer was used, regardless of the identity of neutralizing agent. Without wishing to be bound by any particular theory, this difference in performance results from the elimination of surfactant migration in the non-migrating surfactant-based PSA films.

From the foregoing, it will be appreciated that although specific embodiments of the invention have been described herein for purposes of illustration, various modifications may be made without deviating from the spirit or scope of the invention.

What is claimed is:

1. A coating adhesive, sealant or elastomeric material comprising a polymer latex comprising:

a) at least one monomer unit; and b) at least one anionic surface active agent unit;

wherein the monomer unit is derived from an ethylenically unsaturated monomer;

the surface active agent is derived from a polymerizable surface active agent in the form of an amine salt comprising:
i) at least one acid, wherein the acid is a fatty phosphate acid ester; and
ii) at least one nitrogenous base having the formula:

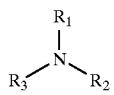

wherein $R_1$, $R_2$ and $R_3$ are independently hydrogen or organic groups containing an ethenylene group, provided that at least one of the $R_1$–$R_3$ groups is a straight or branched chain alkyl group containing 1–8 carbon atoms and an ethenylene functionality; and the ethylenically unsaturated monomer and the polymerizable surface active agent have polymerized to form the polymer.

2. A coating, adhesive, sealant or elastomeric material according to claim 1, additionally comprising pigment.

3. A coating, adhesive, sealant or elastomeric material according to claim 1, additionally comprising thickener, plasticizer, and pigment.

4. A coating, adhesive, sealant or elastomeric material according to claim 3, additionally comprising a silane adhesion promoter.

5. A coating, adhesive, sealant or elastomeric material according to claim 1, wherein the nitrogenous base is allyl amine, diallyl amine, triallyl amine, methallyl amine, N-methyl N-allyl amine, N-allyl-N,N-dimethyl amine, methyl 3-amino crotonate, 3-amino crotononitrile, 3-amino-1-propanol vinyl ether, 2-(dimethylamino)ethyl acrylate, or 1,4-diamino-2-butene or a mixture thereof.

6. A coating, adhesive, sealant or elastomeric material according to claim 5, wherein the nitrogenous base is allyl amine, diallyl amine, triallyl amine, methallyl amine, N-methyl N-allyl amine or 2-(dimethylamino)ethyl acrylate, or a mixture thereof.

7. A coating, adhesive, sealant or elastomeric material according to claim 1, wherein the polymerizable, surface active agent is of the formula:

wherein $R_1$ is a saturated or unsaturated hydrocarbon group having from about 6–24 carbon atoms, phenyl, polyphenyl, napthyl, polynapthyl, styryl, or polystyryl group, an alkyl/alkozylate substituted phenyl, an alkyl/alkoxylate substituted or poly-substituted polyphenyl, an alkyl/alkoxylate substituted or poly-substituted napthyl, an alkyl/alkoxylate substituted or poly-substituted polynapthyl, an alkyl/alkoxylate substituted or poly-substituted styryl, or an alkyl/alkoxylate substituted or poly-substituted polystyryl group, and mixtures thereof; wherein $M^+$ is a conjugate acid of the nitrogenous base; wherein x is 1 or 2; and wherein y is 1 or 2.

8. A coating, adhesive, sealant or elastomeric material according to claim 1, wherein the polymerizable, surface active agent is of the formula:

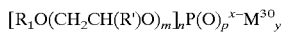

wherein $R_1$ is a saturated or unsaturated hydrocarbon group having from about 1–24 carbon atoms; wherein R' is methyl or hydrogen; wherein $M^+$ is a conjugate acid of the nitrogenous base, the nirtogenous base selected from the group consisting of allyl amine, diallyl amine, triallyl amine, methallyl amine, N-methyl N-allyl amine or 2-(dimethylamino)ethyl acrylate, and mixtures thereof; m is zero or an integer of from 1–100; wherein n is 1 or 2; wherein p is 2 or 3; wherein x is 1 or 2; and wherein y is 1 or 2.

9. A coating, adhesive, sealant or elastomeric material according to claim 1, wherein the polymerizable, surface active agent is of the formula:

wherein $R_1$ is a saturated or unsaturated hydrocarbon group having from about 1–24 carbon atoms; wherein Ar is phenyl; wherein R' is methyl or hydrogen; wherein $M^+$ is α conjugate acid of the nitrogenous base, the nitrogenous base selected from the group consisting of allyl amine, diallyl amine, triallyl amine, methallyl amine, N-methyl N-allyl amine, or 2-(dimethylamino)ethyl acrylate, and mixtures thereof; wherein n is an integer of from 1–4; wherein m is zero or an integer of from 1–100; wherein q is 1 or 2; wherein p is 2 or 3 wherein x is 1 or 2; and wherein y is 1 or 2.

10. A coating, adhesive, sealant or elastomeric material according to claim 1, wherein at least one of the ethylenically unsaturated monomers is styrene and is reacted with at least one acrylic monomer.

11. A coating, adhesive, sealant or elastomeric material according to claim 2, wherein at least one of the ethylenically unsaturated monomers is at least one non-aromatic vinyl compound.

12. A coating, adhesive, sealant or elastomeric material according to claim 1, wherein at least one of the ethylenically unsaturated monomers is vinyl acetate and is reacted with at least one acrylic monomer.

13. A coating, adhesive, sealant or elastomeric material according to claim 1, wherein at least one of the ethylenically unsaturated monomers is at least one acrylic monomer.

14. A coating, adhesive, sealant or elastomeric material according to claim 1, wherein the polymerizable surface active agent and the ethylenically unsaturated monomer are in a ratio of about 0.01:1 to about 3:1 on a weight basis, prior to polymerization.

15. A coating, adhesive, sealant or elastomeric material according to claim 1, wherein the polymerizable surface active agent comprises about 0.1–10 weight percent of the polymer, based on the total weight of the ethylenically unsaturated monomer present prior to polymerization.

16. A coating, adhesive, sealant or elastomeric material to claim 15, wherein the polymerizable surface active agent comprises about 0.5–3.0 weight percent of the polymer, based on the total weight of the ethylenically unsaturated monomer present prior to polymerization.

17. A coating, adhesive, sealant or elastomeric material according to claim 1, wherein the polymer is substantially free of non-polymerizable surface active agents.

* * * * *

UNITED STATES PATENT AND TRADEMARK OFFICE
CERTIFICATE OF CORRECTION

PATENT NO. : 6,900,265 B2
DATED : May 31, 2005
INVENTOR(S) : Schultz et al.

It is certified that error appears in the above-identified patent and that said Letters Patent is hereby corrected as shown below:

Title page,
Item [54], Title, please delete "ANTIMICROBIAL POLYMER LATEXES DERIVED FROM UNSATURATED QUATERNARY AMMONIUM COMPOUNDS AND ANTIMICROBIAL COATINGS, SEALANTS, ADHESIVES AND ELASTOMERS PRODUCED FROM SUCH LATEXES"
and insert
-- IMPROVED COATINGS, SEALANTS, ADHESIVES AND ELASTOMERS UTILIZING POLYMER LATEXES DERIVED FROM UNSATURATED AMINE SALTS --

Signed and Sealed this

Ninth Day of August, 2005

JON W. DUDAS
*Director of the United States Patent and Trademark Office*